(12) United States Patent
Kitano

(10) Patent No.: US 6,178,100 B1
(45) Date of Patent: Jan. 23, 2001

(54) SWITCHING POWER SOURCE

(75) Inventor: Saburou Kitano, Sakai (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/256,979

(22) Filed: Feb. 24, 1999

(30) Foreign Application Priority Data

| Feb. 24, 1998 | (JP) | 10-042654 |
| Dec. 11, 1998 | (JP) | 10-353547 |
| Dec. 11, 1998 | (JP) | 10-353549 |
| Jan. 28, 1999 | (JP) | 11-020739 |

(51) Int. Cl.[7] .................................................. H02M 3/335
(52) U.S. Cl. ................................ 363/19; 363/97; 363/49
(58) Field of Search ........................ 363/16, 18, 19, 363/89, 95, 97, 49, 56; 323/901, 908

(56) References Cited

U.S. PATENT DOCUMENTS 5,012,399 * 4/1991 Takemura et al. ..................... 363/18
5,943,222 * 8/1999 Ogawa .................................. 363/19

FOREIGN PATENT DOCUMENTS 05260747   10/1993   (JP) .
9-47023    2/1997    (JP) .
11-215827  8/1999    (JP) .

* cited by examiner

*Primary Examiner*—Jessica Han
(74) *Attorney, Agent, or Firm*—Dike, Bronstein, Roberts & Cushman, LLP; David G. Conlin; William J. Daley, Jr.

(57) ABSTRACT

In a switching power source of the RCC system in which excited energy, accumulated in a transformer during an on-period of a main switching element, is outputted to the secondary side during an off-period, and a ringing pulse, which appears in a control coil of the transformer upon completion of the output, is fed back to the gate of the main switching element through a capacitor used for cutting a dc so that the main switching element is on-driven, a bias resistor is interpolated between the capacitor and the gate, and during the stand-by state, a control transistor is turned on, with the connecting point between them being connected to a main power-source line in a low level through a series circuit consisting of a diode, Zener diode and a resistor. Thus, a higher charge is allowed to accumulate in the capacitor, and the ringing pulse is reversely biased by the charge so as not to cause the re-starting. It becomes possible to reduce the switching frequency during the stand-by state in light load, and consequently to improve the power-conversion efficiency by using a simple construction.

11 Claims, 30 Drawing Sheets

SWITCHING POWER SOURCE

FIELD OF THE INVENTION

The present invention relates to a switching power source which is desirably applied as so-called AC-DC converters and DC-DC converters and other devices.

BACKGROUND OF THE INVENTION

A switching power source, which is used in portable small-size electronic apparatuses and which switches a dc obtained by rectifying and smoothing a commercial ac or a dc from a battery by using a high frequency of, for example, approximately several hundreds kHz so as to convert it to a desired voltage efficiently by using a small-size transformer, has been widely used.

As a typical construction of such a switching power source, a switching power source of a pulse-width modulation (PWM) system has been widely used, in which the secondary-side output voltage is detected by a voltage detection circuit, and a control circuit controls the switching pulse width of the main switching element in accordance with the results of detection so as to obtain a desired secondary-side output voltage.

Moreover, as another typical construction of the switching power source, a switching power source of a ringing choke converter (RCC) system has been widely used, in which excited energy, which has been accumulated in a transformer during the on-period of the main switching element, is outputted to a secondary-side circuit during the off-period, and upon completion of the output, a ringing pulse generated in the control coil of the transformer is fed back to the control terminal of the main switching element through a dc-cut capacitor so that the main switching element is again activated.

In the above-mentioned switching power source of the RCC system, as the load becomes higher, the above-mentioned off-period and on-period are automatically lengthened, that is, the switching frequency is reduced, so that the secondary-side output voltage is maintained at a predetermined constant voltage; therefore, a complex control circuit, such as required for the switching power source of the PWM system, is not necessary, and a power-source circuit for generating a voltage forming the basis for the pulse width also is not necessary, both contributing to achieve a low-cost power source.

FIG. 27 shows an electric circuit diagram of a typical prior-art switching power source 1 of the RCC system. A dc, obtained by rectifying a commercial ac by a main power-source circuit not shown, is inputted between input terminals p1 and p2. This dc is smoothed by smoothing capacitor c11, and a main power-source voltage is outputted between a main power-source line 2 on the high-level side and a main power-source line 3 on the low-level side from smoothing capacitor c11.

A series circuit consisting of the primary coil nil of a transformer n and a main switching element q is connected between the above-mentioned power-source lines 2 and 3. The above-mentioned main switching element q is realized by, for example, a bipolar transistor and a field-effect transistor, and FIG. 27 shows a case in which a field-effect transistor is used. A starter circuit 4, which consists of voltage-dividing resistors r3 and r5, is connected between the main power-source lines 2 and 3.

Upon application of power, that is, when a power-source voltage is applied between input terminals p1 and p2, the output voltage of smoothing capacitor c11, that is, the main power-source voltage, increases, and when the voltage-divided value due to voltage-dividing resistors r3 and r5 becomes not less than the threshold voltage of the main switching element q, for example, not less than 3 V, the main switching element q is turned off; thus, a voltage in the upward direction in FIG. 27 is applied to the primary coil n11 so that excited energy is accumulated therein. When the main switching element q is turned off in a manner as described later, a voltage in the upward direction is induced in the secondary coil n21 by the above-mentioned excited energy. Moreover, vibration, generated by leakage inductance between the primary coil n11 and the other coils n21 and n12 at the time of turning off, is absorbed and eliminated by a snubber circuit 5 that consists of a series circuit of resistor r11 and capacitor c12 and that is parallel-connected between the drain and source of the main switching element q.

The dc, induced in the above-mentioned secondary coil n21, is given to smoothing capacitor c13 through diode d12, and after having been smoothed by smoothing capacitor c13, it is outputted to a load circuit, not shown, from output terminals p3 and p4 through the output power-source lines 6 and 7. A voltage detection circuit 8 is interpolated between the above-mentioned output power-source lines 6 and 7. The voltage detection circuit 8 is constituted by voltage-dividing resistors, photo-coupler pc1, etc., and light-emitting diode d13 of the photo-coupler pc1 is driven so as to light up with a luminance corresponding to the output voltage, and the value of the output voltage is fed back to the primary side.

Upon turning the main switching element q on, a voltage is induced in the control coil n12 in the same upward direction as that in the primary coil n11, and its induced current is given to the gate of the main switching element q through capacitor c1 for cutting dc and bias resistor r2; thus, the gate potential of the main switching element q is further raised so that the main switching element q is maintained in the ON state.

Moreover, the current induced in the control coil n12 upon turning the main switching element q on is given to one of the terminals of capacitor c14 from capacitor c1 and bias resistor r2 through photo-transistor tr11 of the above-mentioned photo-coupler pc1. The other terminal of capacitor c14 is connected to the aforementioned main power-source line 3 in the low level; therefore, the higher the secondary-side output voltage becomes, the greater the charging current, thereby allowing the terminal voltage of capacitor c14 to increase rapidly. The charging voltage of capacitor c14 is supplied to the base of control transistor tr12 that is interpolated between the gate and source of the main switching element q, and when the output voltage goes beyond the threshold voltage of control transistor tr12, for example, not less than 0.6 V, control transistor tr12 is allowed to conduct, making the gate voltage of the main switching element q drop abruptly, with the result that the main switching element q is off-driven.

Therefore, the higher the secondary-side output voltage becomes, that is, the lighter the load, the quicker the charging voltage of capacitor c14 increases, with the result that the main switching element q is off-driven more quickly. Moreover, the current induced in the control coil n12 is supplied to capacitor c14 through resistor r12. The series circuit of these resistor r12 and capacitor c14 is connected in parallel with control coin n12 so as to form an overcurrent protection circuit. With this overcurrent protection circuit, even if the output voltage of smoothing capacitor c13 on the secondary side is low due to shortcircuiting between output terminals p3 and p4, etc., the on-time of the main switching element q is limited to a predetermined period, thereby making it possible to protect the main switching element q.

Here, supposing that the numbers of coil of the control coil n12 and the secondary coil n21 are represented by the same numbers as the reference numerals and the output voltage on the secondary side is vo, the voltage (n12/ n21) vo is induced in the control coil n12 in the downward direction of FIG. 27 upon turning the main switching element q off; thus, since the induced current is allowed to flow resistor r12, the charge of capacitor c14 is drawn, and a resetting operation for the next on-operation of the main switching element q is carried out.

When, after turning the main switching element q off, the excited energy, accumulated in the primary main coil n11, has been outputted to the secondary side, ringing occurs between a parasitic capacity c15 mainly possessed by the control coil n12 and the control coil n12, the electrostatic energy, accumulated in the parasitic capacity c15 with the voltage (n12/ n21) vo, is discharged, this is converted to excited energy of the control coil n12 after a ¼ period of vibration, and then an electro motive voltage with the voltage (n12/ n21) vo in the upward direction is generated in the control coil n12 so as to again charge the parasitic capacity c15. The electro motive voltage, which is a ringing pulse, is set to be not less than the threshold voltage Vth of the main switching element q; thus, the main switching element q is again turned on by the electro motive voltage. In this manner, the main switching element q is continuously on/off-driven based upon the switching frequency corresponding to the load automatically, thereby making it possible to provide a desired secondary-side output voltage.

In the switching power source, most of losses are caused by power required to draw electric charge accumulated in the parasitic capacity between the drain and source of the main switching element and core losses in the transformer, and these losses generally increase as the switching frequency becomes higher. Therefore, as described above, in the switching power source 1, since the switching frequency becomes higher as the load becomes lighter, the ratio of losses with respect to converted power increases as the load becomes lighter, resulting in a problem of reduction in power conversion efficiency.

As other conventional techniques for solving the above-mentioned problem, for example, Japanese Laid-Open Patent Publication No. 47023/1997 (Tokukaihei 9-47023) and Japanese Examined Utility Model Publication No. 3039391 are listed. The conventional technique described in Japanese Laid-Open Patent Publication No. 47023/1997 has a construction in which: another control transistor is installed in parallel with the control transistor for turning off the main switching element; in the case of light load, an induced voltage, generated in the control coil upon turning off the main switching element, is instantaneously taken in a capacitor through the transistor that is turned off in response to the main switching element; and the other control transistor is turned on by the capacitor so that the off state of the main switching element is maintained so as to reduce the switching frequency.

Therefore, a complex construction is required for reducing power consumption, resulting in high costs as well as failing to utilize advantages of the RCC system; consequently, the charging process for capacitors becomes dependent on the storage time of the transistors, resulting in great dispersions between the devices and difficulties in designing.

Moreover, the conventional technique described in Japanese Examined Utility Model Publication No. 3039391 has an arrangement in which a delay capacitor for rounding a ringing pulse is interpolated in parallel with the control transistor at the time of light load.

Therefore, as described on column 0025, lines 7–8 in the above-mentioned official gazette, the switching cycle is extended only for the period in which ringing is occurring, with the result that it is not possible to greatly reduce the switching frequency at the time of light load, as compared with the switching frequency at the time of heavy load.

Moreover, even if the switching frequency at the time of light load is reduced to a great degree as compared with the switching frequency at the time of heavy load (at the time of normal operation) by using the conventional technique described in the above-mentioned Laid-Open Patent Publication No. 47023/1997 (Tokukaihei 9-47023), etc., since the rating of each constituent part of the switching power source has been selected based upon high-load operation, the following disadvantage might be raised.

FIG. 28 is a block diagram which schematically shows a conventional switching power source 1a which is disclosed in the above-mentioned Laid-Open Patent Publication No. 47023/1997 (Tokukaihei 9-47023) and which can reduce the switching frequency at the time of light load to a great degree as compared with the switching frequency at the time of heavy load. Here, since the above-mentioned disadvantage is raised regardless of constructions that reduce the switching frequency, FIG. 28 typically shows a control circuit 9 as a construction which reduces the switching frequency under conditions, such as a voltage reduction and light load. The control circuit 9 is connected between the main power-source lines 2 and 3 through starting resistor r3.

Moreover, the switching power source 1a is provided with the following construction so as to reduce the switching frequency in a stand-by state, that is, at the time of light load, of an apparatus in which the switching power source 1a is installed. A control signal is given to control terminal p5 from the above-mentioned apparatus side, a series circuit consisting of light-emitting diode d14 of photo-coupler pc2 and resistor r13 is connected between the above-mentioned control terminal p5 and an output power-source line 7 on the low-level side. Therefore, when the control signal goes high at the time of heavy load, that is, in a non-stand-by state, light-emitting diode d14 lights on, thereby informing the primary side of the heavy load state.

On the primary side, photo-transistor tr13 of the aforementioned photo-coupler pc2 is installed in the control circuit 9, and at the time of the heavy load, photo-transistor tr13 is turned on so that the oscillation frequency restricting operation of the control circuit 9 is suspended, the ringing pulse is supplied to the main switching element q, with the result that the aforementioned normal RCC operation is carried out. In contrast, at the time of the light load, the control signal to control terminal p5 goes low, light-emitting diode d14 goes out, and control transistor tr12 is turned on; thus, an oscillation frequency restriction operation is carried out, control transistor tr12 is kept on so that the ringing pulse is bypassed, and after a lapse of a predetermined time, control transistor tr12 is turned off so that the main switching element q is turned on by a divided voltage value inside the control circuit 9 derived from the aforementioned starting resistor r3.

In this manner, the oscillation frequency at the time of light load is reduced, and power consumption, required for drawing an electric charge that has accumulated in a parasitic capacity between the drain and source of the main switching element q, and core losses in the transformer n can be reduced; thus, it is possible to improve the efficiency of power conversion.

Additionally, in the construction of Japanese Laid-Open Patent Application No. 47023/1997 (Tokukaihei 9-47023), the portion of the above-mentioned resistor r12 is constituted by a series circuit of a resistor and a Zener diode, and a resistor that is placed in parallel with the series circuit; thus, the higher the main power-source voltage, that is, the output voltage of smoothing capacitor c11, the greater the current flowing into the Zener diode, thereby compensating for changes in the output voltage. Therefore, in the present specification, for simplifying explanation, the main power-source voltage is made constant, and such a construction is replaced by resistor r12.

In the switching power source 1a having the above-mentioned construction, the on-period of the main switching element q is determined by the time during which the accumulated charge having a polarity reversed to that of FIG. 28 has been discharged and is again charged to 0.6 V having the polarity shown in FIG. 28.

However, at the time of heavy load, the above-mentioned charging time is a relatively long period of time during which, after the main switching element has been turned on, the accumulated charge having the reversed polarity is drawn and charging is made to provide the positive polarity.

In contrast, at the time of light load, the time during which, after control transistor tr12, which has bypassed the ringing pulse, has been turned off, the divided voltage value inside the control circuit 9 derived from starting resistor r3 increases so that the main switching element q is again on-driven is very long, that is, an operation suspension time for decreasing the oscillation frequency is provided; therefore, the accumulated charge having the reversed polarity inside the above-mentioned capacitor c14 is consumed by resistor r12 and a control coil n12 during the operation suspension time so that the above-mentioned charging time becomes shorter as compared with that at the time of heavy load.

Therefore, at the time of light load, the current limitation value of the overcurrent protection circuit becomes smaller as compared with that at the time of heavy load, with the result that energy to be accumulated inside the transformer n becomes smaller; this fails to lower the switching frequency sufficiently so as to supply an amount of power required to the secondary side.

In this respect, it is possible to reduce the switching frequency as has been initially aimed by using parts having high current ratings as the respective constituent parts so as to raise the current limitation values in the two light-load and high-load operation modes as a whole; however, this is not preferable from the view point of costs.

Additionally, in FIG. 28, the explanation has been given by exemplifying a case in which, with respect to the load, the load of the switching power source 1a itself gives a control signal for indicating whether or not it is in a light load state to the switching power source 1a; however, the switching power source may be designed to judge whether the load is light or heavy.

FIG. 29 is an electric circuit diagram showing a switching power source 1b of this case. In this switching power source 1b, detection resistor rs, diode d21, capacitor c21, comparator a21 and reference voltage source e21 are installed on the secondary side, and the output of comparator a21 is given to a control circuit 9b from light-emitting diode d14 of photo-coupler pc2 through photo-transistor tr13. This detection resistor rs carries out a current-voltage conversion on a load current flowing through the output power-source line 7, and gives its terminal voltage to comparator a21 through diode d21 and capacitor c21. Here, comparator a21 monitors the load current by comparing the terminal voltage with the reference voltage vref derived from reference voltage source e21.

When the load current becomes greater, the terminal voltage of detection resistor rs becomes higher than the reference voltage vref so that comparator a21 outputs a high-load signal to the control circuit 9b through photo-coupler pc2, thereby allowing the control circuit 9b to carry out the normal RCC operation. In contrast, when the load current becomes smaller, the terminal voltage of detection resistor rs becomes lower than the reference voltage vref so that comparator a21 outputs a light-load signal to the control circuit 9b, thereby allowing the control circuit 9b to reduce the switching frequency. In this manner, even at the time of an excessive light load beyond the load variations in the normal operation, such as a stand-by state, the switching frequency is reduced so that it is possible to improve the power conversion efficiency.

In another conventional switching power source 1c, a circuit used for detecting the load condition is installed on the primary side as illustrated in FIG. 30. Specifically, the detection-use source current of the main switching element q is current-voltage converted by detection resistor rs that is series connected with the main switching element q, and the terminal voltage is given to comparator a21 through diode d21 and capacitor c21, and compared with the reference voltage vref from reference voltage source e21 so as to be monitored. Thus, when the source current of the main switching element becomes smaller due to a light-load state, comparator a21 is allowed to output a light-load signal to the control circuit 9c.

The switching power sources 1b and ic having the above-mentioned construction have a problem in which a comparatively large current flows through detection-use resistor rs with the result that there is a great power loss. Moreover, it is necessary to completely insulate the primary-side circuit and the secondary-side circuit in order to satisfy requirements on the safety standard; therefore, in the switching power source 1b, the construction for detecting the load condition, such as the aforementioned detection-use resistor rs, is installed on the secondary side, and photo-coupler pc2 is used to transmit the result of detection to the control circuit 4; this results in a problem of high costs.

SUMMARY OF THE INVENTION

The first objective of the present invention is to provide a switching power source which can enhance the power conversion efficiency by using a simple construction. The second objective of the present invention is to provide a switching power source which can sufficiently reduce the switching frequency at the time of light load by using an inexpensive construction without the need for parts having unnecessarily high rated values. Moreover, the third objective of the present invention is to provide a switching power source which is designed to vary the switching frequency depending on the level of load and which is further improved so that the level of the load can be judged easily with only a small loss.

In order to achieve the above-mentioned objective, the switching power source of the present invention, which is a switching power source of the ringing choke converter system, is provided with: a transformer for accumulating excited energy during an on-period of a main switching element; an output circuit for outputting the excited energy thus accumulated during an off-period of the main switching element, the output circuit being placed on the secondary side of the transformer; a first capacitor which is placed between a control coil of the transformer and the control terminal of the main switching element, and which feeds back a ringing pulse that occurs in the control coil upon completion of the output of the excited energy to the control terminal after cutting its dc component so that the main switching element is on-driven; a series circuit which is constituted by a reverse-bias voltage setting resistor and a control switching element for reducing the switching frequency and which is connected to the output side of the first capacitor; and a bias resistor that is interpolated between the first capacitor and the main switching element, wherein: the control switching element for reducing the switching frequency is on-driven at the time of light load; during the on-period of the main switching element at the time of light load, a charge is accumulated in the first capacitor by a voltage induced in the control coil; and at the time of occurrence of the ringing pulse, a reverse bias is generated by the accumulated charge in the first capacitor so as to prevent the main switching element from being on-driven.

With the above-mentioned construction, the switching power source, which is a switching power source of the ringing choke converter system, is operated as follows: at the time of heavy load, the ringing pulse is supplied to the control terminal of the main switching element through the first capacitor and the bias resistor so that the normal switching operation for on-driving the main switching element is carried out; in contrast, at the time of light load, a charge is accumulated in the first capacitor by a voltage induced in the control coil during the on-period of the main switching element, and when a ringing pulse is generated after the main switching element has been turned off and the excited energy has been discharged, the ringing pulse is reversely biased by a value corresponding to the charging voltage of the first capacitor, thereby making it possible to block the on-driving of the main switching element.

Therefore, at the time of light load, the re-starting of the main switching element using the ringing pulse, which is carried out at the time of heavy load, is stopped, and once the main switching element carries out a switching operation at the time of light load, the next switching operation is carried out smoothly in the same manner as that carried out upon application of power, thereby making it possible to reduce the switching frequency at the time of light load. Thus, it becomes possible to reduce losses that increase in proportion to the switching frequency, such as power required to draw a charge accumulated in the floating capacity between the drain and source in the main switching element, and consequently to obtain a higher power-conversion efficiency even at the time of light load.

Here, such a reduction in the switching frequency at the time of light load can be achieved by using a simple, inexpensive construction which is constituted by a bias resistor for providing a high impedance for charging between the first capacitor and the main switching element and a series circuit that consists of a reverse bias voltage setting resistor and a control switching element for reducing the switching element and that connects the connecting point between the first capacitor and the bias resistor to the main power-source line.

Additionally, various constructions are proposed as the switching power source of the ringing choke converter system; for example, in the case of the sub power-source circuit constituted by a rectifying diode for drawing an output from one of the terminals of the control coil of the transformer, a choke coil to which the output of the rectifying diode is supplied, a smoothing capacitor for smoothing a current passing through the choke coil and a fly-wheel diode for connecting the connecting point between the rectifying diode and the choke coil to the other terminal of the control coil, it is possible to control the control switching element for reducing the switching frequency by using the charging voltage of the smoothing capacitor of the sub power-source circuit.

In this case, since the smoothing capacitor of the sub power-source circuit is charged by an impedance element such as the choke coil and since its charging voltage corresponds to the value of the secondary-side output current, the level of the load can be judged from the charging voltage so as to control the control switching element for reducing the switching frequency.

Therefore, it is possible to eliminate the need for installing a specific construction for detecting the operation mode of installed equipment, and also to control the control switching element for reducing the switching frequency automatically by making a judgement as to the level of the load only by the use of the primary side, thereby allowing cost reduction.

Moreover, in order to solve the first objective, the switching power source of the present invention is provided with a voltage detection circuit for detecting a secondary-side output voltage of a transformer, a main switching element for switching the primary current of the transformer in response to the result of detection so as to obtain a secondary current having a desired constant voltage, a timing-control switching element that is placed between the secondary-side output lines in series with the voltage detection circuit, and a bias circuit for supplying the output of a secondary sub coil of the transformer to a control terminal of the timing-control switching element.

In the above-mentioned construction, the timing-control switching element is interpolated between the secondary-side output lines in series with the voltage detection circuit, and when an output voltage is induced on the secondary side, a bias voltage is supplied to the control terminal of the switching element from the secondary sub coil of the transformer through the bias circuit so that the voltage detection circuit is connected between the secondary-side output lines.

Therefore, the voltage detection circuit is made operative only for a minimum period required for the detection of the secondary-side output voltage; therefore, it is possible to reduce power consumption in the voltage detection circuit provided with light-emitting diodes of the photo-coupler and voltage-dividing resistors, and consequently to improve the power-conversion efficiency.

In order to achieve the second objective, the switching power source of the present invention, which is a switching power source of the ringing choke converter system, is provided with: a transformer for accumulating excited energy during an on-period of a main switching element; an output circuit for outputting the excited energy thus accumulated during an off-period of the main switching element, the output circuit being placed on the secondary side of the transformer; a first capacitor which is placed between a control coil of the transformer and the control terminal of the main switching element, and which feeds back a ringing pulse that occurs in the control coil upon completion of the output of the excited energy to the control terminal after cutting its dc component so that the main switching element is again on-driven; a second capacitor that is charged by a current obtained from a voltage induced in the control coil of the transformer through a constant resistor and a feed-back current from the secondary side; an off-driving control switching element for off-driving the control terminal of the main switching element when the charging voltage of the second capacitor has become a predetermined voltage; a switching frequency switching means for reducing the switching frequency of the main switching element at the time of light load as compared with the time of heavy load; and a charge-compensating means for compensating for a reduction in the accumulated charge of the second capacitor due to the reduction in the switching frequency at the time of light load with respect to an overcurrent protection circuit, the overcurrent protection circuit being constituted by a series circuit of the constant resistor and the second capacitor that is connected in parallel with the control coil.

In the switching power source of the ringing choke converter system in which: the second capacitor is charged by a current obtained through the constant resistor from a voltage induced in the control coil of the transformer upon turning on the main switching element and a feed-back current from the secondary side, and when the charging voltage has become a predetermined voltage, the control terminal of the main switching element is off-driven through the off-driving control switching element, and the resulting ringing pulse is used to again on-drive the main switching element, the above-mentioned construction is designed so that, in an attempt to reduce the switching frequency of the main switching element at the time of light load as compared with the time of heavy load, although the charge with the reverse polarity, which has been accumulated in the second capacitor by the reverse electro motive voltage generated in the control coil during the off-time of the main switching element, is discharged and reduced during the operation suspension period at the time of light load, the charge-compensating means compensates for the reduction with respect to the overcurrent protection circuit that is constituted by a series circuit of the constant resistor and the second capacitor and that is connected in parallel with the control coil.

Therefore, the time period required for the second capacitor being charged by the voltage with the positive polarity induced in the control coil upon turning the main switching element on to have the predetermined voltage with the positive polarity that is large enough to on-drive the off-driving control switching element is set virtually the same even at the time of light load as that at the time of heavy load; thus, it is possible to make the overcurrent limitation values of the main switching element at the time of light load and at the time of heavy load virtually equal to each other, and also to make the switching frequency at the time of light load sufficiently low without the need for parts having unnecessarily high rated values.

Here, not limited to the switching power source of the ringing choke system, the construction for making a judgement as to the level of load based upon the charging voltage of the smoothing capacitor in the above-mentioned sub power-source circuit using the choke coil may be widely applied to any switching power source, as long as it is a switching power source that varies the switching frequency depending on the level of load. More specifically, in order to achieve the third objective, the switching power source of the present invention, which varies the switching frequency depending on the level of load, is characterized by comprising: a detection coil installed in a transformer, a smoothing capacitor, a rectifying means for rectifying the induced voltage in the detection coil so as to supply the resulting current to the smoothing capacitor, an impedance element that is interpolated between the rectifying means and the smoothing capacitor, and a decision means for making a judgement as to the level of the load based upon the output voltage of the smoothing capacitor.

With the above-mentioned construction, in the switching power source which is designed to vary the switching frequency depending on the level of load so as to reduce losses that increase in proportion to the switching frequency and so as to obtain a higher power-conversion efficiency even at the time of light load, when an impedance element is inserted in a circuit for rectifying the induced voltage in the detection coil in the transformer and for charging the smoothing capacitor, it is possible to utilize the fact that the output voltage of the smoothing capacitor is allowed to correspond to the output current value on the secondary side, in an attempt to make a judgement as to the level of the load.

Therefore, the construction for making a judgement as to the level of load can be provided by installing a simple construction only on the primary side with a small loss.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) shows the drain-source voltage of a main switching element; FIG. 2(b) shows the electric potential of the connecting point between a bias resistor and a capacitor interpolated between the main switching element and a control coil; and FIG. 2(c) shows the gate-source voltage of the main switching element.

FIG. 3(a) shows the drain-source voltage of the main switching element; FIG. 3(b) shows the electric potential of the connecting point between the bias resistor and the capacitor interpolated between the main switching element and the control coil; and FIG. 3(c) shows the gate-source voltage of the main switching element.

FIG. 6(a) shows a switching operation in each switching power source in a state with a relatively light load; FIG. 6(b) shows a switching operation in each switching power source shown in FIG. 1 and FIG. 4 in a state with a relatively heavy load; and FIG. 6(c) shows a switching operation in the switching power source shown in FIG. 5 in a state with a relatively heavy load.

DESCRIPTION OF THE EMBODIMENTS

Referring to FIG. 1 through FIG. 3(c), the following description will discuss the first embodiment of the present invention.

Figure 1:
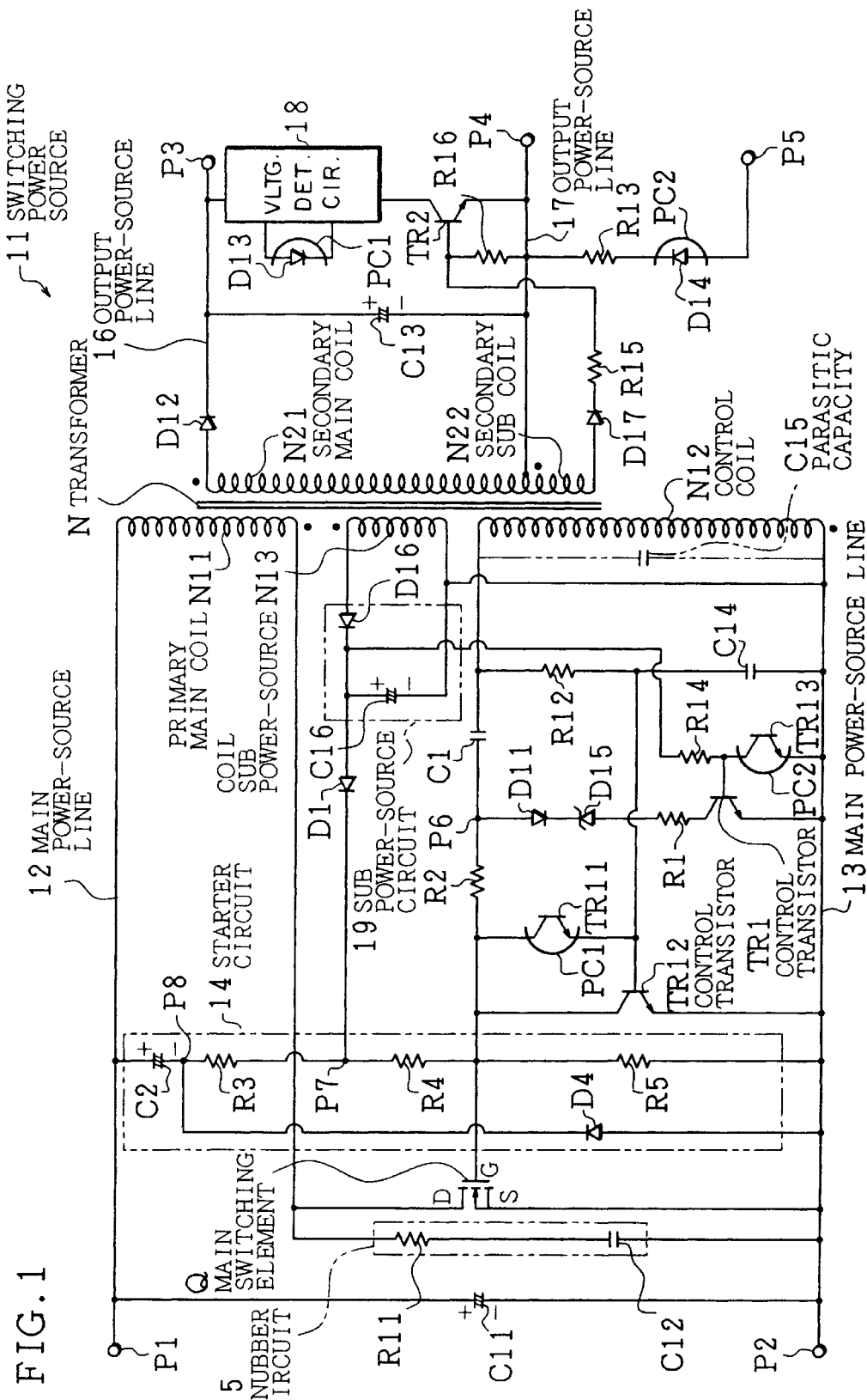
FIG. 1 is a circuit diagram of a switching power source of an RCC system in accordance with the first embodiment of the present invention.

FIG. 1 is an electric circuit diagram of a switching power source 11 of the RCC system of the first embodiment of the present invention. A dc, which has been obtained by rectifying a commercial ac by using a main power source circuit, not shown, is inputted between input terminals P1 and P2. The dc is smoothed by smoothing capacitor C11, and a main power source voltage is outputted between a main power source line 12 on the high-level side and a main power source line 13 on the low-level side from smoothing capacitor C11.

A series circuit of a primary main coil N11 of a transformer N and a main switching element Q is connected between the main power source lines 12 and 13. The main switching element Q is realized by using, for example, a bipolar transistor or an electric-field effect type transistor, and in the example of FIG. 1, the electric-field effect type transistor is adopted. Moreover, a starter circuit 14, constituted by capacitor C2, voltage-dividing resistors R3 through R5 and diode D4, is connected between the main power source lines 12 and 13. Here, in the starter circuit 14, a series circuit consisting of capacitor C2 and voltage-dividing resistors R3 through R5 is interpolated between the above-mentioned main power-source lines 12 and 13.

Upon application of power, that is, upon applying a source voltage between input terminals P1 and P2, the output voltage of smoothing capacitor C11, that is, the main source voltage, increases, and when the voltage-divided value between voltage-dividing resistors R4 and R5 of the starter circuit 14 reaches the threshold voltage Vth of the main switching element Q, for example, not less than 3, the main switching element Q is turned on so that a voltage in the upward direction in FIG. 1 is applied to the primary main coil N11 and excited energy is accumulated therein. When the main switching element Q is turned off in a manner as will be described later, a voltage having the upward direction is induced in the secondary main coil N21 by the excited energy. Further, vibration, generated by leakage inductance between the primary main coil N11 and the other coils (in the transformer N in FIG. 1, N12, N13, N21 and N22, which will be described later) at the time of turning off, is absorbed and eliminated by a snubber circuit 15 that consists of a series circuit of resistor R11 and capacitor C12 and that is parallel-connected between the drain and source of the main switching element Q.

The dc, induced in the above-mentioned secondary main coil N21, is given to smoothing capacitor C13 through diode D12, and after having been smoothed by smoothing capacitor C13, it is outputted to a load circuit, not shown, from output terminals P3 and P4 through the output power-source lines 16 and 17. A voltage detection circuit 18 is interpolated between the above-mentioned output power-source lines 16 and 17. The voltage detection circuit 18 is constituted by voltage-dividing resistors, photo-coupler PC1, etc., and light-emitting diode D13 of the photo-coupler PC1 is driven so as to light up with a luminance corresponding to the output voltage, and the value of the output voltage is fed back to the primary side.

Upon turning the main switching element Q on, a voltage is induced in the control coil N12 in the same upward direction as that in the primary main coil N11, and its induced current is given to the gate of the main switching element Q through capacitor C1 for cutting dc and bias resistor R2; thus, the gate potential of the main switching element Q is further raised so that the main switching element Q is maintained in the ON state.

Moreover, the current induced in the control coil N12 upon turning the main switching element Q on is given to one of the terminals of capacitor C14 from capacitor C1 and bias resistor R2 through photo-transistor TR11 of the above-mentioned photo-coupler PC1. The other terminal of capacitor C14 is connected to the aforementioned main power-source line 13 in the low level; therefore, the higher the secondary-side output voltage becomes beyond a predetermined setting voltage, the greater the charging current, thereby allowing the terminal voltage of capacitor C14 to increase rapidly. The charging voltage of capacitor C14 is supplied to the base of control transistor TR12 that is interpolated between the gate and source of the main switching element Q, and when the output voltage goes beyond the threshold voltage of control transistor TR12, for example, not less than 0.6 V, control transistor TR12 is allowed to conduct, making the gate voltage of the main switching element Q drop abruptly, with the result that the main switching element Q is off-driven.

Therefore, the higher the secondary-side output voltage becomes beyond the above-mentioned setting voltage, that is, the lighter the load, the quicker the charging voltage of capacitor C14 increases, with the result that the main switching element Q is off-driven more quickly. The lower the secondary-side output voltage becomes below the above-mentioned setting voltage, that is, the heavier the load, the charging time of capacitor C14 becomes longer, with the result that the on-time of the main switching element Q becomes longer. Moreover, the current induced in the control coil N12 is supplied to capacitor C14 through resistor R12. With this arrangement, even if the output voltage of smoothing capacitor C13 on the secondary side is low due to shortcircuiting between output terminals P3 and P4, etc., the on-time of the main switching element Q is limited to a predetermined period, thereby making it possible to protect the main switching element Q.

Here, supposing that the numbers of coil of the control coil N12 and the secondary main coil N21 are represented by the same numbers as the reference numerals and the output voltage on the secondary side is Vo, the voltage (N12/N21) Vo is induced in the control coil N12 in the downward direction of FIG. 1 upon turning the main switching element Q off; thus, the charge of capacitor C14 is drawn, and a resetting operation for the next on-operation of the main switching element Q is carried out.

When, after turning the main switching element Q off, the excited energy, accumulated in the primary main coil N11, has been outputted to the secondary side, ringing occurs between parasitic capacity C15 mainly possessed by the control coil N12 and the control coil N12, the electrostatic energy, accumulated in parasitic capacity C15 with the voltage (N12/N21) Vo, is discharged, this is converted to excited energy of the control coil N12 after a ¼ period of vibration, and then an electro motive voltage with the voltage (N12/N21) Vo in the upward direction is generated in the control coil N12 so as to again charge the parasitic capacity C15. The electro motive voltage, which is a ringing pulse, is set to be not less than the threshold voltage Vth of the main switching element Q; thus, the main switching element Q is again turned on by the electro motive voltage. In this manner, the main switching element Q is continuously on/off-driven based upon the switching frequency corresponding to the load automatically, thereby making it possible to provide a desired secondary-side output voltage.

In the switching power source 11 of the present embodiment, upon heavy load of an apparatus having the switching power source 11, that is, in a non-stand-by state of such an apparatus, the above-mentioned normal RCC operation is carried out, and upon low load of the apparatus having the switching power source 11, that is, in a stand-by state thereof, in order to reduce the switching frequency, an arrangement is provided in which: a control signal is supplied from the apparatus to control terminal P5, a series circuit consisting of light-emitting diode D14 of photo-coupler PC2 and resistor R13 is connected between control terminal P5 and the output power-source line 17 on the low-level side, and when the control signal goes high in the non-stand-by state, light-emitting diode D14 lights up, thereby informing the primary side of the heavy load state through the output.

On the primary side, a series circuit consisting of diode D11 for preventing reverse flows, Zener diode D15, resistor R1 and control transistor TR1 is connected between connecting point P6 between capacitor C1 and bias resistor R2 and the main power-source line 13 on the low-level side. The collector of photo-transistor TR13 of the above-mentioned photo-coupler PC2 is connected to the base of the above-mentioned control transistor TR1. Further, a source voltage from a sub power-source circuit 19 which will be described later is voltage-divided by resistor R14 and the above-mentioned photo-transistor TR13, and the divided source voltage is applied to the base of the above-mentioned control transistor TR1.

Therefore, in the above-mentioned non-stand-by state, photo-transistor TR13 is turned on and control transistor TR1 is turned off so that the above-mentioned normal RCC operation is carried out without having any adverse effect from the above-mentioned series circuit.

In contrast, in the stand-by state of the above-mentioned device, the control signal to control terminal P5 goes low so that light-emitting diode D14 is turned off, photo-transistor TR13 is turned off and control transistor TR1 is turned on, thereby connecting the series circuit between the aforementioned connecting point P6 and the main power-source line 13. The aforementioned bias resistor R2 is selected, for example, at 680 Ω, and resistor R1 is selected, for example, at 150 Ω. Therefore, upon on-time of the main switching element Q, much current flows through the series circuit while the on-state of the main switching element Q is maintained; consequently, charge is accumulated in capacitor C1 with the control coil N12 side serving as a positive side.

Therefore, even if the ringing pulse occurs during the stand-by time, the ringing pulse is reversely biased by a value corresponding to the terminal-to-terminal voltage of capacitor C1, and applied to the main switching element Q. Consequently, the ON-actuation of the main switching element Q is intervened, and as will be described later, a re-activation is carried out by the starter circuit 14.

With this arrangement, as compared with the aforementioned conventional switching power source 1 in which the switching frequency, which is maintained, for example, at approximately 80 kHz during the non-stand-by state, increases to, for example, 400 to 500 kHz, namely approximately several hundreds kHz, during the stand-by state, the switching power source 11 of the present embodiment makes it possible to decrease the value to approximately several kHz, and consequently to enhance the power conversion efficiency during the stand-by state to a great degree merely by adding a simple construction of resistor R1 and control transistor TR1.

Moreover, in the present embodiment, the sub power-source coil N13 is installed in the aforementioned transformer N. In the above-mentioned sub power-source coil N13, in the same manner as the aforementioned secondary main coil N21, a voltage is induced in the upward direction during the off-time of the main switching element Q, and the voltage is smoothed by the aforementioned sub power-source circuit consisting of diode D16 and smoothing capacitor C16, and then is outputted for use in driving control transistor TR1 via the aforementioned resistor R14, and also outputted to connecting point P7 between voltage-dividing resistors R3 and R4 of the aforementioned starter circuit 14 through diode D1 used for preventing reverse current. Accordingly, the aforementioned capacitor C2 is installed in the starter circuit 14.

Therefore, upon application of power at which the terminal-to-terminal voltage of the aforementioned capacitor C2 is virtually zero, a voltage, which has been voltage-divided by voltage-dividing resistors R3 to R5 of the main source voltage and which reaches, for example, as much as several hundred V, is applied to the gate of the main switching element Q.

After a lapse of a predetermined time from the application of power, capacitor C16 is charged to a predetermined source voltage, for example, approximately 10 V, and capacitor C2 is charged to a voltage that corresponds to the difference between the aforementioned source voltage and the output voltage of the sub source circuit 19. Therefore, even if the actuation of the main switching element Q is not carried out due to the ringing pulse during the stand-by state and a voltage for the actuation is outputted from the starter circuit 14, the current flow from the main power-source side to the voltage-dividing resistors R3 through R5 can be blocked, thereby making it possible to drive the main switching element Q by using a comparatively low voltage-divided voltage of the output voltage from the sub source circuit 19. Thus, it becomes possible to cut power consumption due to voltage-dividing resistors R3 through R5, and consequently to achieve the high efficiency.

Here, between connecting point P8 of the aforementioned capacitor C2 and voltage-dividing resistor R3 and the main source line 13 on the low-level side, discharging diode D4 is installed in parallel with voltage-dividing resistors R3 through R5 in a reverse-bias direction. Therefore, when the main source voltage drops, the following discharging paths for capacitor C2 are formed: a path from smoothing capacitor C11—the main power-source line 13—voltage-dividing resistors R5 to R3—capacitor C2—the main power-source line 12 to smoothing capacitor C11 and a path from smoothing capacitor C11—the main power-source line 13—diode D4—capacitor C2—the main power-source line 12 to smoothing capacitor C11. Thus, even if the time from the cutoff of the power source to the re-application thereof is short, capacitor C2 is positively allowed to discharge so that the potential of connecting point P8 is increased so as to be virtually equal to the main source voltage, thereby making it possible to positively actuate the main switching element Q.

Moreover, in the present embodiment, the above-mentioned transformer N is provided with a secondary sub coil N22. With respect to the secondary sub coil N22, control transistor TR2 is interpolated between the output power-source lines 16 and 17 in series with the aforementioned voltage detection circuit 18. In the same manner as the control coil N12, a voltage is induced in the secondary sub coil N22 upon on-time of the main switching element Q, and the voltage is supplied to the base of the aforementioned control transistor TR2 through the bias circuit of diode D17 and resistor R15. The base of control transistor TR2 is also connected to the output power-source line 17 on the low-level side through resistor R16.

Therefore, during the on-period of the main switching element Q, that is, only during the period requiring detection data for controlling, the voltage detection circuit 18 is activated, thereby making it possible to cut power consumption in the voltage-dividing resistors and light-emitting diode D13 of the photo-coupler PC1 and also to further enhance the power conversion efficiency.

Figure 2:
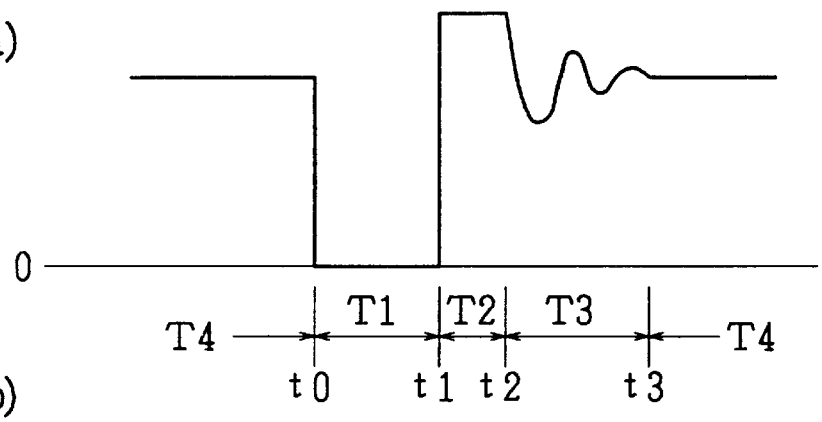
FIGS. 2(a) through 2(c) are waveform diagrams that explain the operation in a stand-by state of the switching power source shown in FIG. 1.
Figure 2:
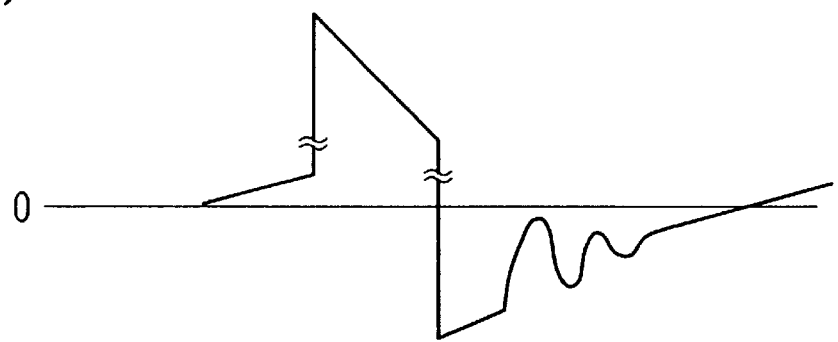
Figure 2:
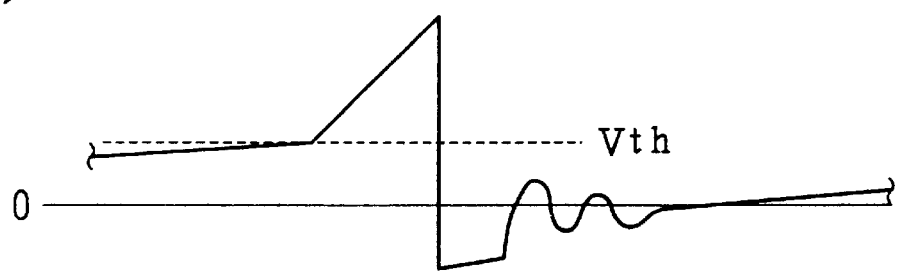
Figure 3:
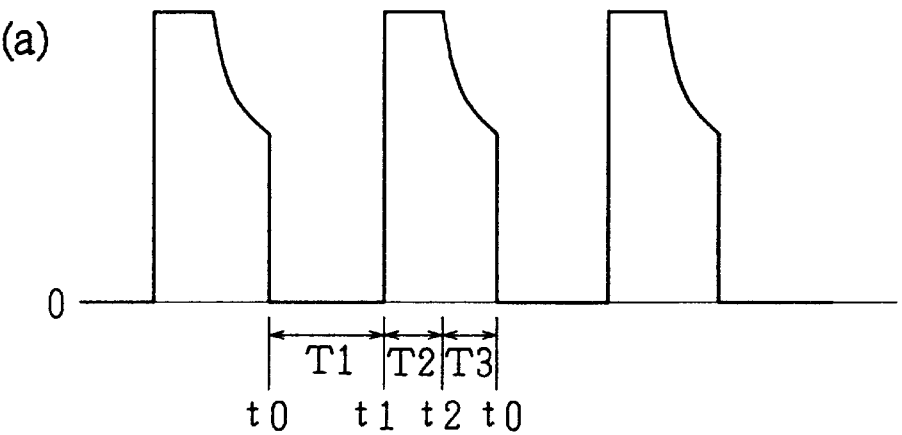
FIGS. 3(a) through 3(c) are waveform diagrams that explain the operation in a non-stand-by state of the switching power source shown in FIG. 1.
Figure 3:
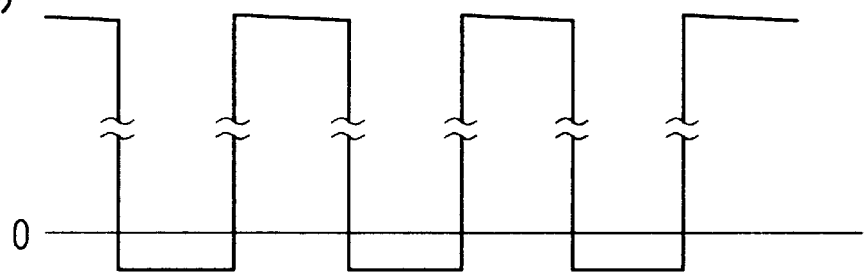
Figure 3:
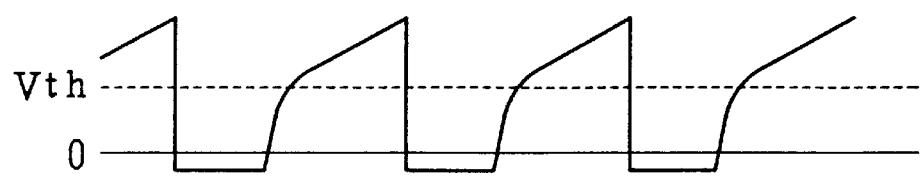

FIGS. 2(*a*) through 3(*c*) are waveform diagrams that explain the operation of the switching power source 11 having the above-mentioned arrangement. FIGS. 2(*a*) through 2(*c*) show the stand-by state, and FIGS. 3(*a*) through 3(*c*) show the non-stand-by state. FIG. 2(*a*) and FIG. 3(*a*) represent the drain-source voltage of the main switching element Q, FIG. 2(*b*) and FIG. 3(*b*) represent the potential at connecting point P6 between resistor R2 and capacitor C1, and FIG. 2(*c*) and FIG. 3(*c*) represent the gate-source voltage of the main switching element Q.

In FIGS. 2(*a*) through 2(*c*), when the gate-source voltage of the main switching element Q reaches the above-mentioned threshold voltage Vth at time t0, the main switching element Q is turned on. Thus, the drain-source voltage of the main switching element Q becomes zero. Moreover, since a current is inputted to the gate of the main switching element Q from the control coil N12 through capacitor C1 and bias resistor R2, the gate voltage of the main switching element Q is allowed to increase based upon the integral of the gate current by the floating capacitance possessed by the main switching element Q and bias resistor R2. Furthermore, a current also flows from connecting point P6 toward the control transistor TR1 side; thus, capacitor C1 is charged with a greater charging current so that the terminal-to-terminal voltage becomes greater, with the result that the potential at the above-mentioned connecting point P6 rises abruptly at the above-mentioned time t0, and then drops.

When the above-mentioned control transistor TR12 is turned on at time t1, the gate voltage of the main switching element Q abruptly drops so that the main switching element Q is turned off. At this time, the potential of the above-mentioned connecting point P6 is represented by the sum of the induced voltage in the negative direction due to the control coil N12 and the charged voltage of the above-mentioned capacitor C1, thereby reducing to a great degree as compared with the heavy load state. Thereafter, while the discharge of excited energy is carried out during period T2, the electric charge of capacitor C1 is gradually discharged through voltage-dividing resistor R5 having a high resistivity, and the potential of connecting point P6 gradually increases.

Upon completion of the discharge of the excited energy at time t2, ringing occurs during period T3 until time t3. However, because of the reversed bias by the above-mentioned capacitor C1, even the peak value of the ringing pulse does not reach the threshold voltage Vth, thereby bringing the operation to a standstill during period T4 following time t3.

After the above-mentioned time t2, a discharge and a charge in the reversed direction are carried out in capacitor C1 through the following paths: a path from capacitor C1—control coil N12—main power source line 13—voltage-dividing resistor R5—bias resistor R2 to capacitor C1 and a path from capacitor C1—control coil N12—smoothing capacitor C16—diode D1—voltage-dividing resistor R4—bias resistor R2 to capacitor C1. However, since voltage-dividing resistors R4 and R5 have high resistivities, these charging and discharging processes proceed gradually, thereby allowing the gate voltage of the main switching element Q and the potential of connecting point P6 to increase gradually. Thereafter, at time t0, when the gate voltage again reaches the threshold voltage Vth, the main switching element Q is turned on, with the result that the same operation as described above is carried out.

In the non-stand-by state as shown in FIGS. 3(a) through 3(c), the main switching element Q has on-period T1 during time t0 to time t1, discharging period T2 for excited energy during time t1 to time t2, and ringing generation period T3 during time t2, to time t0. Therefore, the main switching element Q is on-driven by the ringing pulse.

As described above, the charging voltage of capacitor C1 during the on-time of the main switching element Q, that is, the reversely biased voltage, can be varied by varying the resistivity of resistor R1. Further, the charging and discharging currents through the above-mentioned two paths can be varied by varying the resistivities of voltage-dividing resistors R4 and R5; thus, the gate voltage of the main switching element Q and the gradient of a potential increase at connecting point P6 can be varied, thereby making it possible to vary the switching frequency.

For example, in the case of high power required for the stand-by state, the resistivities of voltage-dividing resistors R4 and R5 are reduced and the time constant of charging and discharging during the standstill periods T3 and T4 is reduced; this allows the gate-source voltage of the main switching element Q to quickly reach the threshold voltage Vth, thereby making it possible to shorten the switching frequency, and consequently to increase the switching frequency. In contrast, in the case of low required power, the switching frequency is reduced by increasing the resistivities of voltage-dividing resistors R4 and R5. Moreover, in the case when the standstill period is so long that the switching frequency overlaps the audio-frequency range, the capacity value of capacitor C14 is reduced, or the resistivity of resistor R12 is reduced; thus, the charging voltage of capacitor C14 is raised quickly and the on-period of the main switching element Q is shortened so that it becomes possible to minimize the excited energy that is accumulated in the transformer N for each switching operation, and consequently to make the switching noise to be not more than the audible level.

In this case, the resistivities of the aforementioned voltage-dividing resistors R3 through R5 can be determined as follows: Assuming that the input voltage to input terminals P1 and P2 is Vin, the charging voltage $E_0$ of smoothing capacitor C16, that is, the output voltage of the sub source circuit 19, is Vs and the resistivities of voltage-dividing resistors R3 through R5 are the same as the respective reference numerals, at the time of starting the operation upon application of power, the following inequality holds:

$$\text{Vin} \times [R5/(R3+R4+R5)] > \text{Vth} \tag{1},$$

and at the time of steady operation in the stand-by state, the following inequality holds:

$$\text{Vs} \times [R5/(R4+R5)] > \text{Vth} \tag{2}.$$

In this case, when control transistor TR1 is turned on during the stand-by state, the resistivity of voltage-dividing resistor R5 becomes the same value as the parallel circuit between the series circuit consisting of bias resistor R2 and resistor R1 and the above-mentioned voltage-dividing resistor R5, thereby failing to satisfy these inequalities 1 and 2. Thus, the aforementioned Zener diode D15 is installed as a compensating Zener diode so as to prevent this disadvantage. Therefore, the Zener voltage is set to a value that is not less than the aforementioned threshold value Vth and also not more than the induced voltage in the control coil N12 upon turning the main switching element Q on. However, in the case when the above-mentioned inequalities are satisfied by appropriate designing specifications even in the stand-by state, Zener diode may be omitted, that is, short-circuiting is made between diode D11 and resistor R1.

Moreover, diode D11 for preventing reverse flows is installed so as to prevent a current from flowing to connecting point P6 through a path from control transistor TR1 through resistor R1 to Zener diode D15 during the off-time of the main switching element Q in the stand-by state, that is, during the period T2 to T4 in FIGS. 2(a) through 2(c), and releasing the negative bias to the main switching element Q.

Therefore, in the case when it is possible to positively prevent the current flow through the above-mentioned path during the off-period T2 to T4 by applying to the base current supplying circuit, for example, such a device as to stop the supply of the base current to control transistor TR1 except for the on-period T1 of the main switching element Q and to draw the base current during the remaining off-period T2 through T4, the above-mentioned diode D11 for preventing reverse flows may be omitted.

Figure 4:
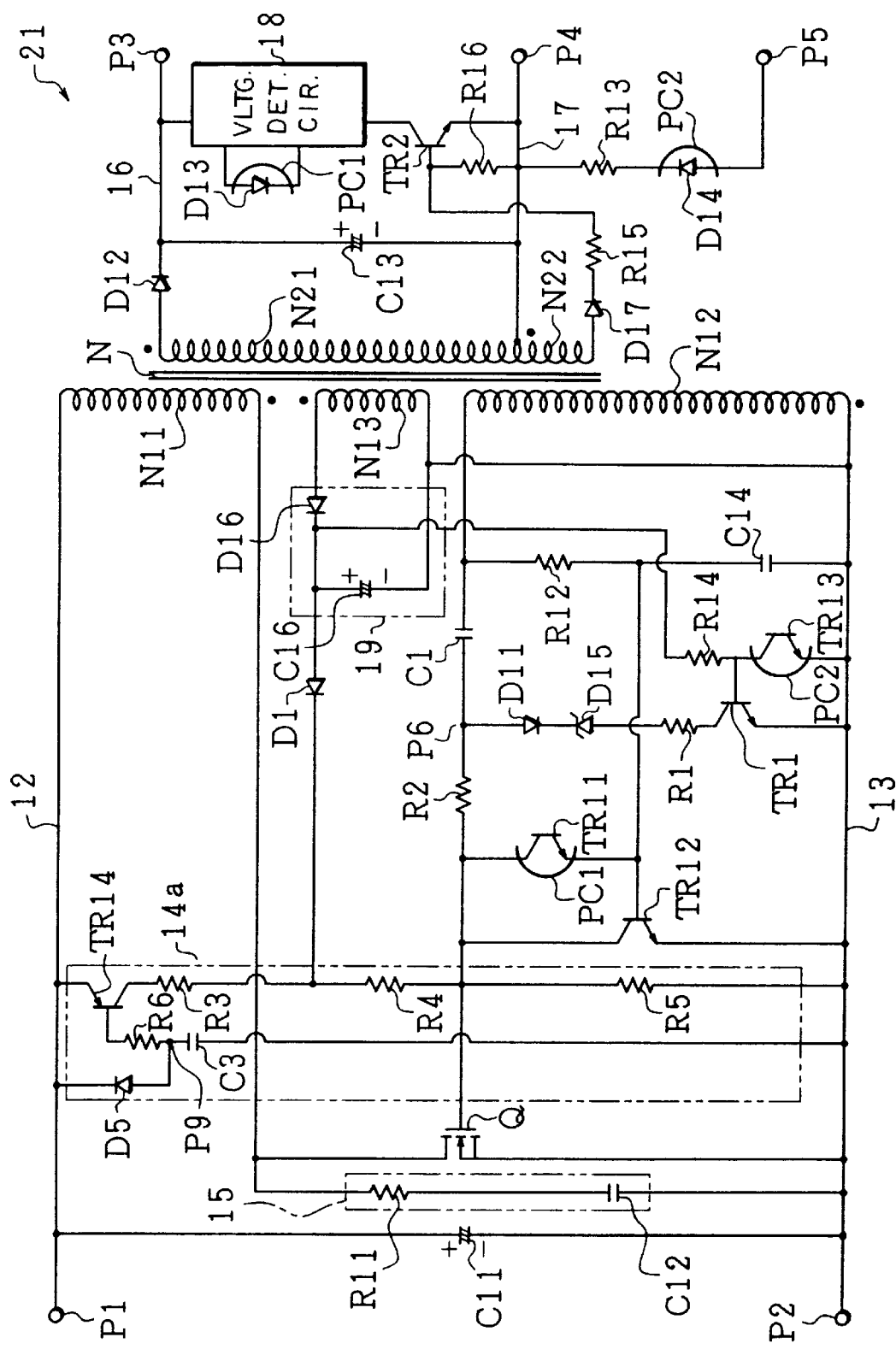
FIG. 4 is an electric circuit diagram of a switching power source of the RCC system in accordance with the second embodiment of the present invention.

Additionally, the above-mentioned arrangement, in which control transistor TR2 is interpolated between the output power-source lines 16 and 17 in series with the voltage detection circuit 18 and the voltage induced in the secondary sub coil N22 is supplied to the base of control transistor TR2 through diode D17 and resistors R15 and R16 so that the voltage detection circuit 18 is activated only during the period in which detection data is required for control, is preferably applied not only to a switching power source of the RCC system, such as the switching power source 11, but also to switching power sources of other systems such as the aforementioned PWM system, as a means for cutting power consumption. Referring to FIG. 4, the following description will discuss the second embodiment of the present invention. FIG. 4 is an electric circuit diagram of a switching power source 21 of the second embodiment of the present invention. The switching power source 21 is similar to the aforementioned switching power source 11, and the corresponding parts are indicated by the same reference numerals and the description thereof is omitted. What is noted is that the switching power source 21 has a modified starter circuit, and instead of capacitor C2 in the aforementioned starter circuit 14, this starter circuit 14a is provided with transistor TR14, resistor R6 and capacitor C3.

Transistor TR14 of the PNP type constitutes a series circuit together with the aforementioned voltage-dividing resistors R3 through R5, and is interpolated between the main power-source lines 12 and 13. The emitter of transistor TR14 is connected to the main power-source line 12 on the high-level side, the collector thereof is connected to voltage-dividing resistor R3, and the base thereof is connected to the main power-source line 13 on the low-level side through a series circuit of resistor R6 and capacitor C3. Moreover, connecting point P9 between resistor R6 and capacitor C3 is connected to the main power-source line 12 on the high-level side through discharging diode D5 that is the same as the aforementioned diode D4.

Therefore, when, upon application of power, a main power-source voltage is applied, the base of transistor TR14 is biased to virtually 0 V by capacitor C3 which has been discharging; thus, transistor TR14 is turned on and the divided voltage of the main power-source voltage Vin is supplied to the gate of the main switching element Q as indicated by equation 1, thereby making it possible to turn on the main switching element Q. Moreover, simultaneously with the application of power, charging of capacitor C3 is started, and after a lapse of the aforementioned predetermined time in which the aforementioned smoothing capacitor C16 in the sub power-source circuit 19 has been charged to a predetermined charged voltage, the terminal-to-terminal voltage of capacitor C3 becomes virtually equal to the main power-source voltage. Thus, transistor TR14 is turned off, and in the stand-by state, the actuation of the main switching element Q is available by using the divided voltage of the charged voltage of smoothing capacitor C16 as described earlier.

Upon power cutoff, as the output voltage of smoothing capacitor C11 is lowered, a discharging path for capacitor C13 is formed, that is, a path from smoothing capacitor C11—the main power-source line 13—capacitor C3—diode D5—the main power-source line 12 to smoothing capacitor C11 is formed, and the aforementioned resetting operation is carried out in preparation for the re-application of power.

In the starter circuit 14a having the above-mentioned arrangement, supposing that the current amplification factor of transistor TR14 is hfe, the capacity of capacitor C3 can be set to a 1/hfe of the capacity of the aforementioned capacitor C2, thereby making it possible to miniaturize the capacitor in the starter circuit.

Referring to FIGS. 5 through 8, the following description will discuss the third embodiment of the present invention.

Figure 5:
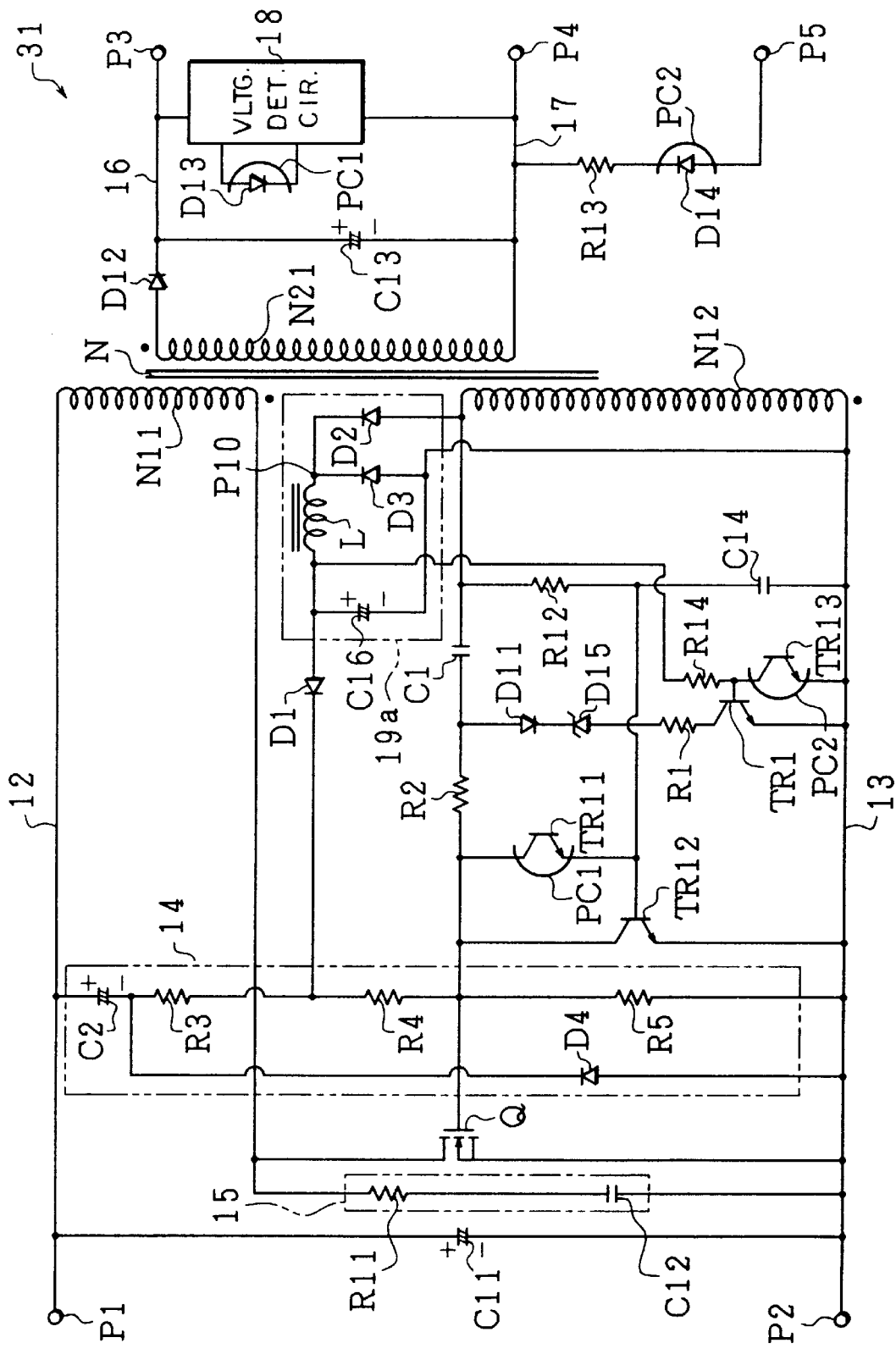
FIG. 5 is an electric circuit diagram of a switching power source of the RCC system in accordance with the third embodiment of the present invention.
Figure 6:
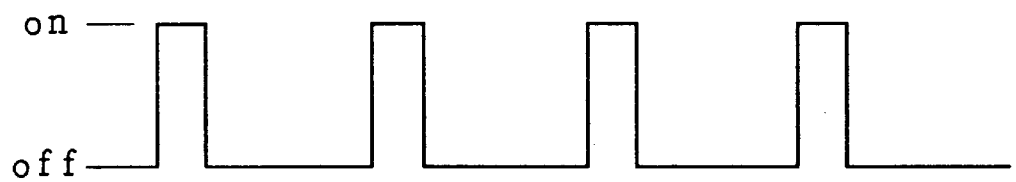
FIGS. 6(a) through 6(c) are drawings that compare the switching operation of the main switching element upon variation of load in the stand-by state between the switching power sources shown in FIGS. 1 and 4 and the switching power source shown in FIG. 5.
Figure 6:
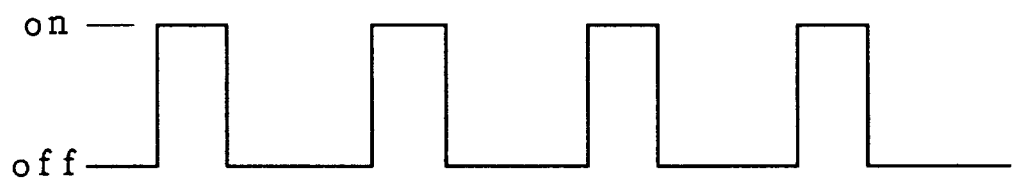
Figure 6:
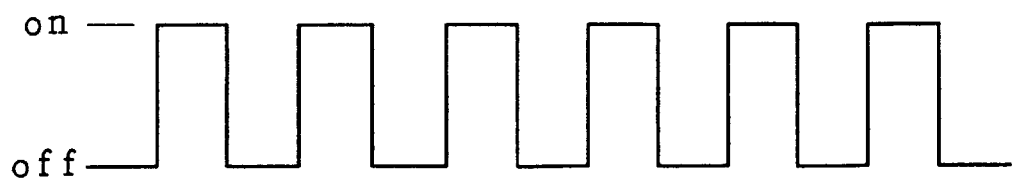

FIG. 5 is an electric circuit diagram of a switching power source 31 of the third embodiment of the present invention. The switching power source 31 is similar to the aforementioned switching power sources 11 and 21, and the corresponding parts are indicated by the same reference numerals and the description thereof is omitted.

In the switching power source 31, control transistor TR2, the secondary sub coil N22 for driving it, and the device for on/off-driving the voltage detecting circuit 18 which consists of diode D17 and resistors R15 and R16 are omitted from the aforementioned switching power sources 11 and 21. Therefore, although the power consumption of the voltage detection circuit 18 increases, it is preferably applied to a low-cost construction, and it also makes it possible to avoid an increase in the number of taps of the transformer Na in the switching power source 31.

Moreover, in the switching power source 31, the sub power-source circuit 19a is constituted by the aforementioned smoothing capacitor C16, two diodes D2 and D3, and a choke coil L. Diode D2 draws an induced current from one of the terminals of the control coil N12 in the on-period of the main switching element Q, and charges smoothing capacitor C16 through the choke coil L. Fly-wheel diode D3 connects connecting point P10 between the choke coil L and diode D2 to the other terminal of the aforementioned the control coil N12. Therefore, when the main switching element Q is turned off and the polarity direction of the induced voltage of the control coil N12 is inverted, diode D2 is turned off so that the exciting current inside the choke coil L charges smoothing capacitor C16 through fly-wheel diode D3. The inductance of the choke coil L is selected so as to maintain the exciting current at zero until the next on-time of the main switching element in the non-stand-by state.

The sub power-source circuit 19a having the above-mentioned arrangement makes it possible to eliminate the aforementioned sub power-source coil N13 from the transformer Na, and also to reduce the number of taps.

Moreover, in the aforementioned sub power-source circuit 19, since smoothing capacitor C16 is charged by means of the fly-back system, and since the rectifying voltage of the sub power-source coil N13 is directly connected to smoothing capacitor C16, the charging voltage $E_0$ of the aforementioned smoothing capacitor C16 is not susceptible to the influence of the output current value on the secondary side. Here, assuming that the numbers of coil of the secondary coil N21 and the sub power-source coil N13 are the same as the respective reference numerals, the charging voltage $E_0$ has a constant value represented as follows:

$$E_0 = V_0 \times (N13/N21) \quad (3)$$

Consequently, the switching frequency during the stand-by state is set virtually to a constant value without reflecting the influence of load variations on the secondary side.

In contrast, in the sub power-source circuit 19a, since smoothing capacitor C16 is charged from the control coil N12 through the choke coil L, the above-mentioned charging voltage $E_0$ increases as the output current value on the secondary side increases, that is, as the on-period of the main switching element Q becomes longer, thereby making it possible to increase the switching frequency.

In other words, during the stand-by state in which control transistor TR1 is turned on, FIG. 6(a) shows the switching operation of the main switching element Q in the case of a comparatively light load, and when the load becomes slightly heavier, smoothing capacitor C16 is directly charged by the rectified voltage of the sub power-source coil N13 in the aforementioned switching power sources 11 and 21, and since the charging voltage $E_0$ has a constant value as indicated by the aforementioned equation 3, the on-period is lengthened with the switching frequency being constant. When the on-time comes to a state in which restriction is made by the aforementioned resistor R12 as shown in FIG. 6(b), no proper response is available in the case when the load becomes further higher.

In contrast, in the switching power source 31, since smoothing capacitor C16 is charged by a voltage applied from the output voltage of the control coil N12 through the choke coil L, the aforementioned charging voltage $E_0$ becomes higher as the secondary-side output current value increases, as will be described in detail later, and as shown in FIG. 6(c), as the on-period is lengthened to the state in which restriction is made by the aforementioned resistor R12, the switching frequency also increases. Therefore, even in the stand-by state, it is possible to properly respond to the load variations.

Figure 7:
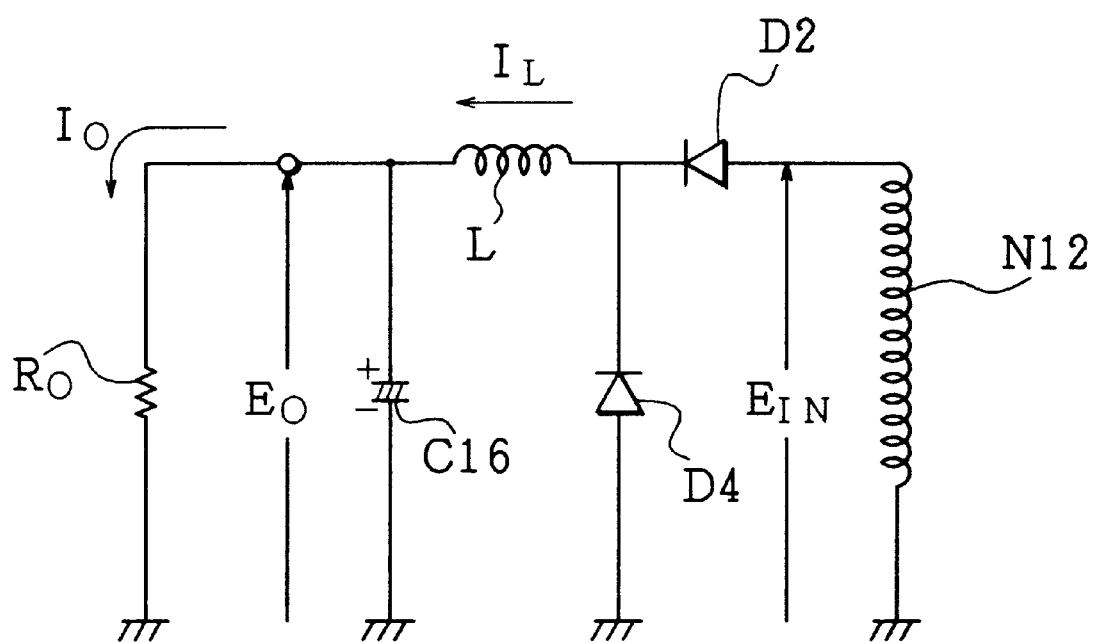
FIG. 7 is an equivalent circuit diagram which explains the operation of a sub power-source circuit in the switching power source shown in FIG. 5.
Figure 8:
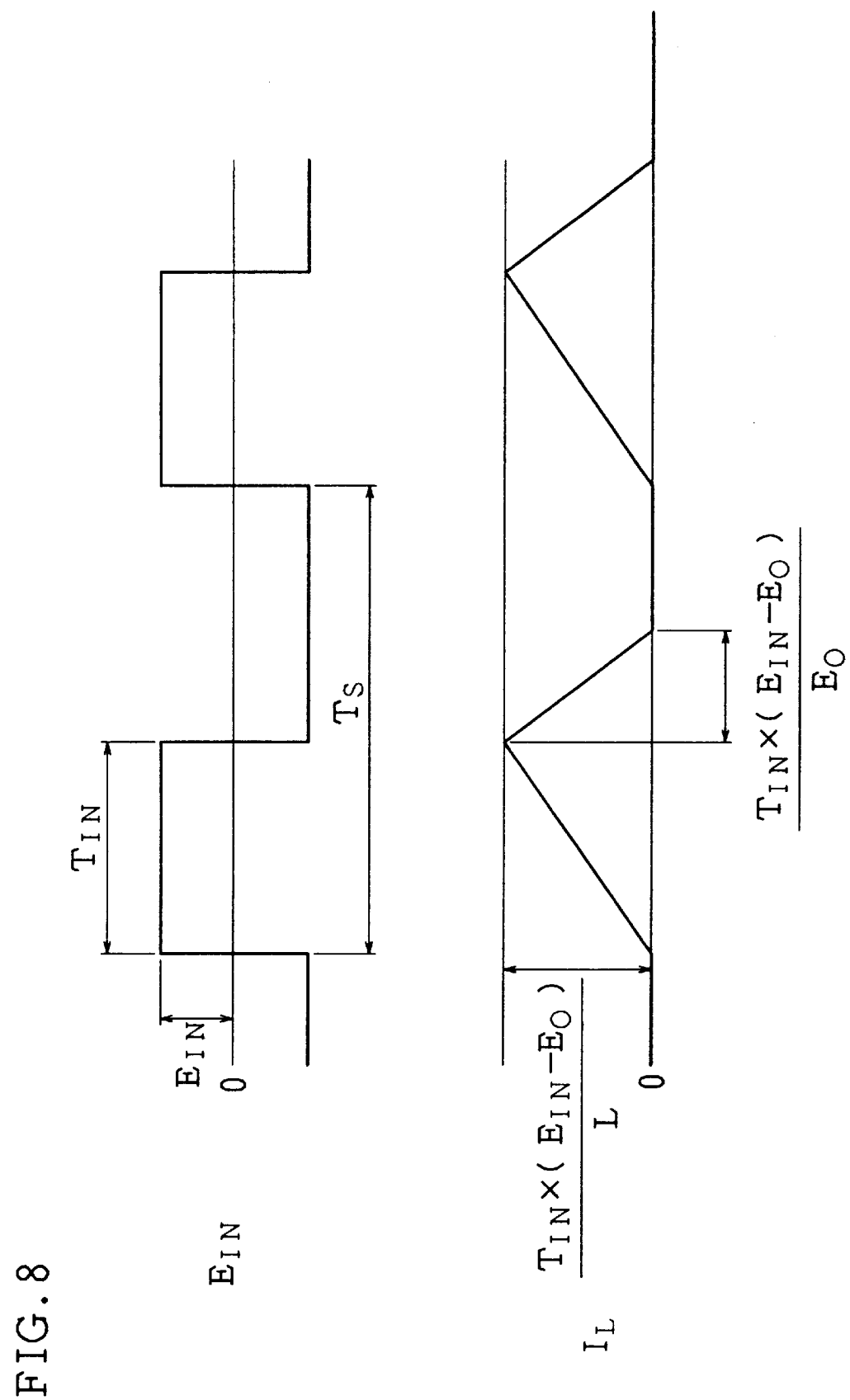
FIG. 8 is a waveform diagram that explains the operation of the switching power source of FIG. 5.

FIG. 7 is an equivalent circuit diagram that explains the operation of the sub power-source circuit 19a. Here, in FIG. 7, the starter circuit 14 and control transistor TR12 and resistor R14, which consume electric currents, are represented by resistor $R_0$, and their consumption current is represented by $I_0$. Supposing that a positive pulse from the control coil N12, that is, a pulse formed in a forward direction with respect to diode D2 in FIG. 7, has an output time of $T_{IN}$, its voltage value is $E_{IN}$, the switching period of the main switching element Q is $T_S$, and the charging voltage of smoothing capacitor C16 is the aforementioned $E_0$, the pulse $E_{IN}$ that is generated in the control coil N12 and the current $I_L$ that flows into smoothing capacitor C16 through the choke coil L are indicated by FIG. 8. Further, supposing that the inductance of the choke coil L is the same as its reference numeral, and the average value $I_{LAV}$ of the above-mentioned current $I_L$ is found from the following equations:

$$I_{LAV} = \frac{1}{2 \times T_s} \times \left\{ \frac{T_{IN}(E_{IN} - E_0)}{L} \times T_{IN} + \frac{T_{IN}(E_{IN} - E_0)}{L} \times \frac{T_{IN}(E_{IN} - E_0)}{E_0} \right\} \quad (4)$$

Here, the current $I_0$ that flows to constant resistor $R_0$ from smoothing capacitor C16 is represented as follows:

$$I_0 = E_0/R_0 \quad (5)$$

and when the charging voltage $E_0$ from smoothing capacitor C16 is stable, $I_{LAV} \approx I_0$; therefore, the following equation is obtained from equations 4 and 5:

$$E_0 = E_{IN} - \frac{2 \times L \times T_s}{T_{IN}^2 \times E_{IN} \times R_0} \quad (6)$$

Therefore, it is understood that, as the period $T_{IN}$ during which the main switching element Q is kept on increases, the charging voltage $E_0$ of smoothing capacitor C16 increases. In this manner, the greater the output current value on the secondary side, the longer the on-period, as described earlier, and the greater the switching frequency; therefore, it is possible to properly respond to the load variations even in the stand-by state.

Although the above-mentioned explanation exemplifies a case in which, as shown in FIG. 8, the current flowing through the choke coil L disappears during the off-period of the positive pulse of the control coil N12, the charging current $E_0$ of smoothing capacitor C16 increases as the load increases also in the case when the current does not disappear.

Figure 9:
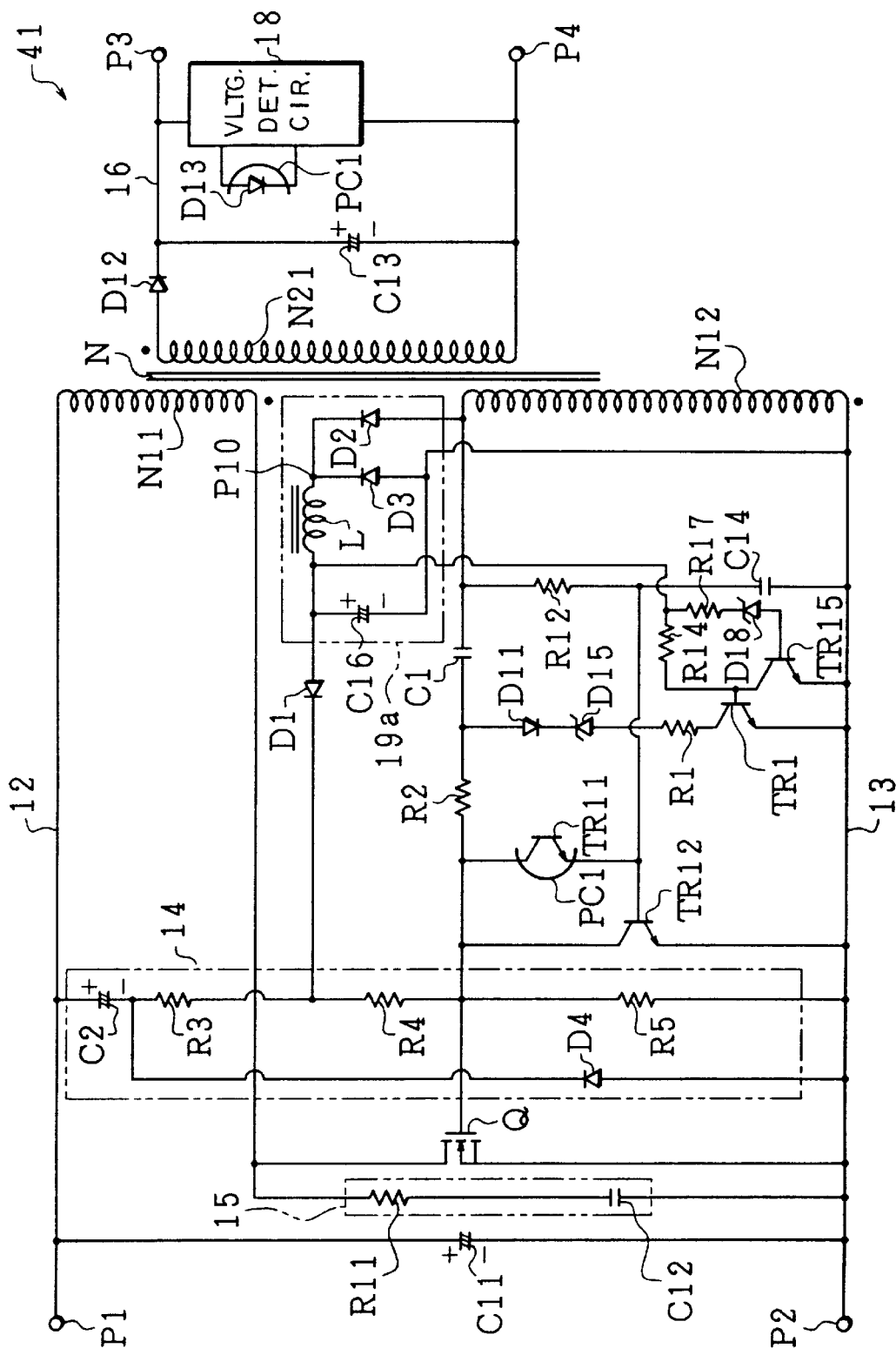
FIG. 9 is an electric circuit diagram of a switching power source of the RCC system in accordance with the fourth embodiment of the present invention.

Referring to FIG. 9, the following description will discuss the fourth embodiment of the present invention.

FIG. 9 shows an electric circuit diagram of a switching power source 41 of the fourth embodiment of the present invention. The switching power source 41 is similar to the aforementioned switching power source 31, and the corresponding parts are indicated by the same reference numerals and the description thereof is omitted. Here, the switching power source 41 has the same construction as a switching power source 131 which will be described later, if, instead of the control circuit 132, a series circuit consisting of resistor R1 and transistor TR1, and the starter circuit 14 are used so as to reduce the switching frequency at the time of light load.

In the switching power source 41, taking it into consideration that smoothing capacitor C16 of the sub power-source circuit 19a in the aforementioned switching power source 31 is charged by a voltage corresponding to the secondary-side output current value, the on/off driving of control transistor TR1 is carried out based upon the output voltage of this smoothing capacitor C16.

More specifically, the base of control transistor TR1 is connected to the low-level side of the main power-source line 13 by transistor TR15 instead of photo-transistor TR13 of the aforementioned photo-coupler PC2, and the output voltage of the aforementioned smoothing capacitor C16 is supplied to the base of transistor TR15 through Zener diode D18 and resistor R17.

Therefore, when the load on the secondary side becomes higher with the charging voltage of smoothing capacitor C16 being higher and exceeding the Zener voltage of Zener diode D18, a current flows to the base of transistor TR15, turning transistor TR15 on. Thus, the base of transistor TR1 goes low and transistor TR1 is turned off so that the operation is carried out in the normal operation mode in the non-stand-by state.

In contrast, when the load on the secondary side becomes lighter with the charging voltage being lower than the Zener voltage, the base current of transistor TR15 becomes zero and transistor TR15 is turned off; thus, the base of transistor TR1 is biased by resistor R14, and therefore, transistor TR1 is turned on so that the operation is carried out in the operation mode in the stand-by state.

In this manner, control transistor TR1 is automatically controlled by making a judgement as to the level of the load only by the use of the primary side; therefore, it becomes possible to eliminate the need for installing a specific construction for detecting the operation mode of installed equipment, such as control terminal P5, and consequently to cut costs.

Figure 10:
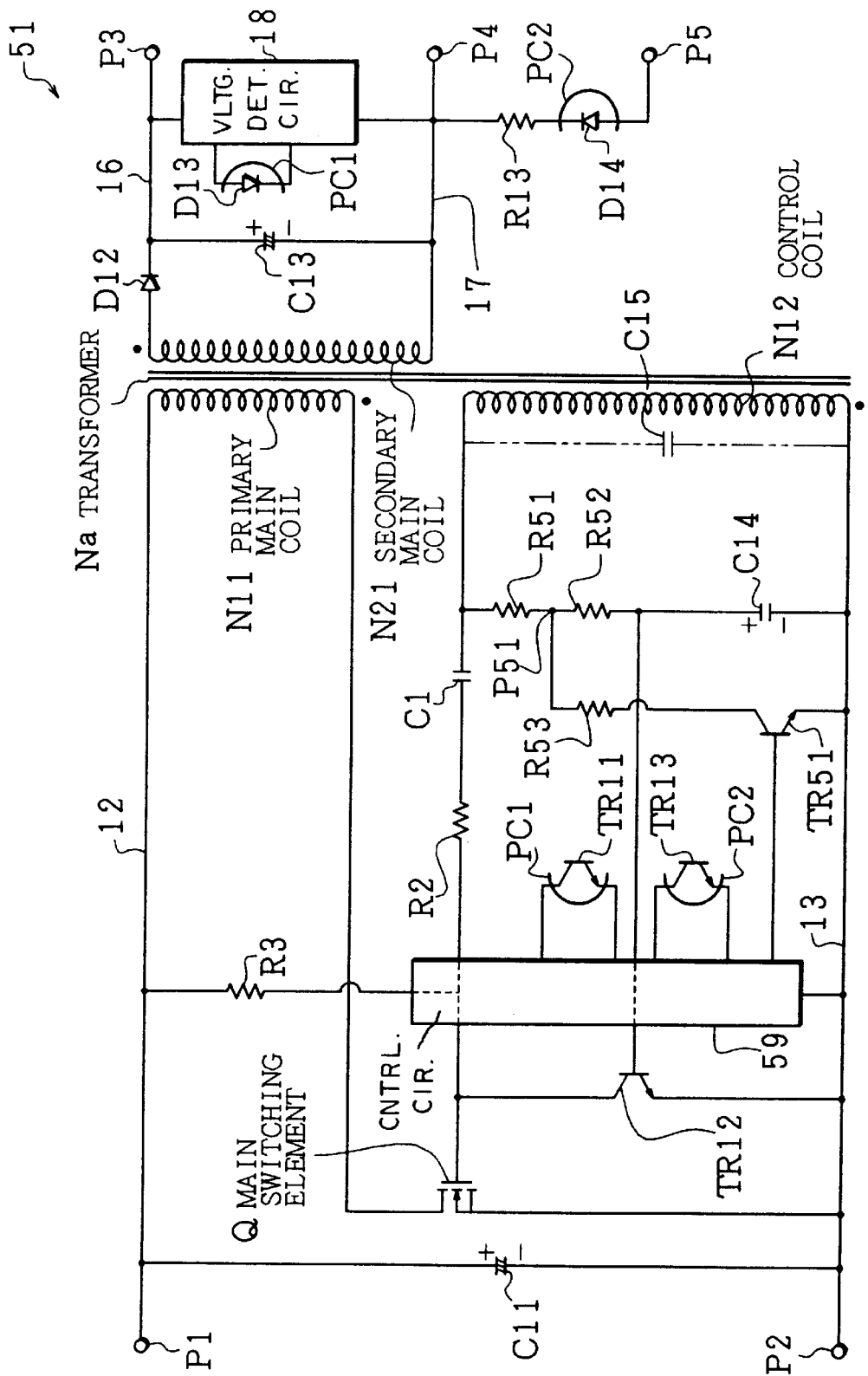
FIG. 10 is a block diagram that shows an electric construction of a switching power source of the RCC system in accordance with the fifth embodiment of the present invention.

Referring to FIG. 10, the following description will discuss the fifth embodiment of the present invention.

FIG. 10 is an electric circuit diagram of a switching power source 51 of the RCC system of the fifth embodiment of the present invention.

A dc, which has been obtained by rectifying a commercial ac by using a main power source circuit (not shown), is inputted between input terminals P1 and P2. The dc is smoothed by smoothing capacitor C11, and a main power source voltage is outputted between a main power source line 12 on the high-level side and a main power source line 13 on the low-level side from smoothing capacitor C11.

A series circuit of the primary main coil N11 of a transformer Na and a main switching element Q is connected between the main power source lines 12 and 13. The main switching element Q is realized by using, for example, a bipolar transistor or an electric-field effect type transistor, and in the example of FIG. 10, the electric-field effect type transistor is adopted. Moreover, a control circuit 59 connected between the main power source lines 12 and 13 through a starting resistor R3.

Upon application of power, that is, upon applying a source voltage between input terminals P1 and P2, the output voltage of smoothing capacitor C11, that is, the main source voltage, increases, and when the voltage-divided value in the control circuit 59 from the starting resistor R3 reaches the threshold voltage Vth of the main switching element Q, for example, not less than 3, the main switching element Q is turned on so that a voltage in the upward direction in FIG. 10 is applied to the primary main coil N11 and excited energy is accumulated therein. When the main switching element Q is turned off in a manner as will be described later, an electro motive force having the downward direction is generated in the primary main coil N11 by the accumulated excited energy, thereby inducing a voltage having the upward direction in the secondary main coil N21.

The dc, induced in the above-mentioned secondary main coil N21, is given to smoothing capacitor C13 through diode D12, and after having been smoothed by smoothing capacitor C13, it is outputted to a load circuit, not shown, from output terminals P3 and P4 through the output power-source lines 16 and 17. A voltage detection circuit 18 is interpolated between the above-mentioned output power-source lines 16 and 17. The voltage detection circuit 18 is constituted by voltage-dividing resistors, photo-coupler PC1, etc., and light-emitting diode D13 of the photo-coupler PC1 is driven so as to light up with a luminance corresponding to the output voltage, and the value of the output voltage is fed back to the primary side.

Upon turning the main switching element Q on, a voltage is induced in the control coil N12 in the same upward direction as that in the primary main coil N11, and its induced current is given to the gate of the main switching element Q through capacitor C1 for cutting dc, bias resistor R2 and the control circuit 59; thus, the gate potential of the main switching element Q is further raised so that the main switching element Q is maintained in the ON state.

Moreover, the current induced in the control coil N12 upon turning the main switching element Q on is given to one of the terminals of capacitor C14 from the control circuit 59 through photo-transistor TR11 of the above-mentioned photo-coupler PC1. The other terminal of capacitor C14 is connected to the aforementioned main power-source line 13 in the low level. Therefore, the above-mentioned capacitor C14 is charged with positive polarity as shown in FIG. 10, and the higher the secondary-side output voltage becomes, the greater the charging current, thereby allowing the terminal voltage of capacitor C14 to increase rapidly. The charging voltage of capacitor C14 is supplied through the control circuit 59 to the base of control transistor TR12 that is interpolated between the gate and source of the main switching element Q, and when the output voltage goes beyond the threshold voltage of control transistor TR12, for example, not less than 0.6 V, control transistor TR12 is allowed to conduct, making the gate voltage of the main switching element Q drop abruptly, with the result that the main switching element Q is off-driven.

Therefore, the higher the secondary-side output voltage becomes, that is, the lighter the load, the quicker the output voltage of capacitor C14 increases, with the result that the main switching element Q is off-driven more quickly. Moreover, the current induced in the control coil N12 is supplied to capacitor C14 through two division resistors R51 and R52. The series circuit consisting of division resistors R51 and R52 and capacitor C14 is connected in parallel with the control coil N12, thereby forming an excess-current protection circuit. Even if the output voltage of smoothing capacitor C13 on the secondary side is low due to shortcircuiting between output terminals P3 and P4, etc., the excess-current protection circuit makes it possible to limit the on-period of the main switching element Q to a predetermined period, thereby protecting the main switching element Q.

Here, supposing that the numbers of coil of the control coil N12 and secondary main coil N21 are represented by the same numbers as the reference numerals and the output voltage on the secondary side is Vo, the voltage (N12/N21) Vo is induced in the control coil N12 in the downward direction of FIG. 10 upon turning the main switching element Q off; thus, when the induced current flows through division resistors R51 and R52, the charge of capacitor C14 is drawn so that capacitor 14 is charged with polarity reversed to that shown in FIG. 10, and a resetting operation for the next on-operation of the main switching element Q is carried out.

When, after turning the main switching element Q off, the excited energy, accumulated in the primary main coil N11, has been outputted to the secondary side, ringing occurs between parasitic capacity C15 mainly possessed by the control coil N12 and the control coil N12, the electrostatic energy, accumulated in parasitic capacity C15 with the voltage (N12/N21) Vo, is discharged, this is converted to excited energy of the control coil N12 after a ¼ period of vibration, and then an electro motive voltage with the voltage (N12/N21) Vo in the upward direction is generated in the control coil N12 so as to again charge parasitic capacity C15. The electro motive voltage, which is a ringing pulse, is set to be not less than the threshold voltage Vth of the main switching element Q; thus, the main switching element Q is again turned on by the electro motive voltage. In this manner, the main switching element Q is continuously on/off-driven based upon the switching frequency corresponding to the load automatically, thereby making it possible to provide a desired secondary-side output voltage.

In addition to the above-mentioned normal construction of a switching power source of the RCC system, the switching power source 51 is provided with the following construction in order to reduce the switching frequency upon low load of an apparatus having the switching power source 51 in which it is in the stand-by state: A control signal is supplied from the apparatus to control terminal P5. A series circuit consisting of light-emitting diode D14 of photo-coupler PC2 and resistor R13 is connected between control terminal P5 and the output power-source line 17 on the low-level side. Therefore, when the control signal goes high upon receipt of heavy load, light-emitting diode D14 lights up, thereby informing the primary side of the heavy load state through the output.

On the primary side, photo-transistor TR13 of the above-mentioned photo-coupler PC2, resistor R53 for bypassing the connecting point P51 of the above-mentioned division resistors R51 and R52 to the main power-source line 13 on the low level side, and control transistor TR51 are installed in the control circuit 59. At the time of the heavy load, photo-transistor TR13 turns on, the oscillation-frequency restricting operation of the control circuit 59 is suspended, and the aforementioned ringing pulse is given to the main switching element Q; therefore, the aforementioned normal RCC operation is carried out, while control transistor TR51 is turned off, thereby allowing capacitor C14 to be charged with positive polarity shown in FIG. 10 by a comparatively large charging current.

In contrast, at the time of light load, the control signal to control terminal P5 goes low, light-emitting diode D14 is turned off, the oscillation-frequency restricting operation is carried out, and control transistor TR12 is kept on so that the ringing pulse is bypassed; then, after a predetermined time, control transistor TR12 turns off so that the main switching element Q is turned on by the voltage-divided value in the control circuit 59 from starting resistor R3.

Moreover, at the time of light load, control transistor TR51 is also turned on, and one portion of the charging current to capacitor C14 is bypassed, allowing capacitor C14 to be charged with positive polarity shown in FIG. 10 by a comparatively small charging current.

Therefore, even if the bypassing of the ringing pulse causes an operation dead time in the main switching element Q and the discharge of charging potential of capacitor C14 progresses, thereby reducing in off timing the electric charge having the polarity reversed to that shown in FIG. 10, which is to remain in capacitor C14, the corresponding reduction in the electric charge can be compensated for by dividing and bypassing the charging current having the positive polarity as shown in FIG. 10 at the on time by resistor R53 and control transistor TR51 and suppressing the charging current.

Therefore, the time period during which capacitor C14 is charged by the voltage of the positive polarity induced on the control coil N12 upon turning on the main switching element Q to form the above-mentioned threshold voltage of the positive polarity that is sufficient to turn on control transistor TR12 is virtually the same even at the time of light load as that at the time of heavy load. The above-mentioned time is equal to the on time of the main switching element Q, and corresponds to the current flowing through the main switching element Q, such as a current having a triangular waveform, which increases with the increase in the on time of the main switching element Q. Therefore, it is possible to make the excess current limit value of the main switching element at the time of light load virtually the same as that at the time of heavy load.

As described above, in the present embodiment, the resistor used for overcurrent protection is constituted by division resistors R51 and R52, and its connecting point P51 is bypassed by transistor TR51. Thus, at the time of light load, the charging current having the positive polarity that is flowed from the control coil N12 during the on-time is reduced so that the charging time to the predetermined voltage is lengthened; therefore, the control circuit 59 makes it possible to reduce the switching frequency sufficiently by making the overcurrent limitation value of the main switching element Q virtually equal to that at the time of heavy load.

As a result, in the switching power source 51 of the RCC system, in an attempt to reduce the switching frequency at the time of light load so as to improve the power-conversion efficiency, with respect to capacitor C14 which activates control transistor TR12 for off-driving the main switching element Q when its charging voltage has become a predetermined voltage, the accumulated charge having the reversed polarity, which has flowed thereto during the off-time of the main switching element Q, is discharged during the operation suspension period; and this discharged portion is compensated so that the overcurrent limitation values at the time of light load and at the time of heavy load virtually equal to each other.

In this manner, when provision is made to reduce the oscillation frequency at the time of light load in order to improve the power conversion efficiency by reducing power consumption required for drawing the electric potential accumulated in the parasitic capacity between the drain and source of the main switching element Q and also reducing the core loss of the transformer Na, the performance of each constituent part can be enhanced to the vicinity of the rated value even at the time of light load; therefore, there is no need to adopt parts having unnecessarily high rated values, and it is possible to achieve low costs.

Figure 11:
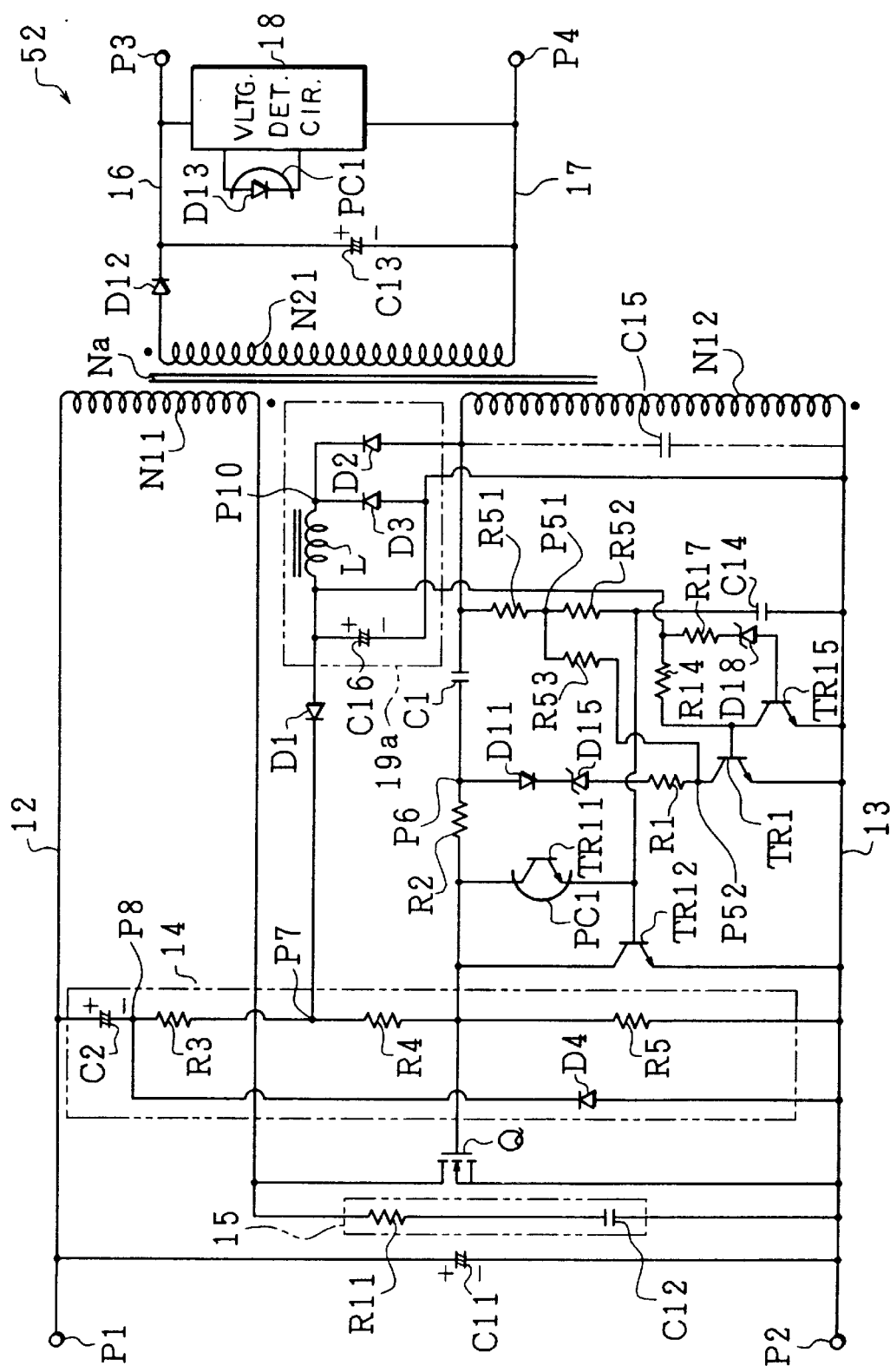
FIG. 11 is an electric circuit diagram of a switching power source in accordance with the sixth embodiment of the present invention.

Referring to FIG. 11, the following description will discuss the sixth embodiment of the present invention.

FIG. 11 shows an electric circuit diagram of a switching power source 52 of the second embodiment of the present invention. The basic construction of this switching power source 52 is the same as the constructions that have been explained in the above-mentioned embodiments one through four in the present embodiment. Further, the construction for suppressing a charging current to capacity C14 at the time of light load is the same as that in the aforementioned switching power source 51; therefore, the corresponding parts are indicated by the same reference numerals and the description thereof is omitted.

A starter circuit 14, constituted by capacitor C2, voltage-dividing resistors R3 through R5 and diode D4, is connected between main power-source lines 12 and 13. Upon application of power, that is, when a power-source voltage is applied between the input terminals P1 and P2, the output voltage of smoothing capacitor C11, that is, the main source voltage, increases, and when the voltage-divided value between voltage-dividing resistors R4 and R5 of the starter circuit 14 becomes not less than the aforementioned threshold voltage Vth of the main switching element Q, the main switching element Q is on-driven.

A snubber circuit 15 made of a series circuit of resistor R11 and capacitor C12 is parallel-connected between the drain and source of the main switching element Q. This snubber circuit 15 absorbs and eliminates vibration that occurs due to leakage inductance between the primary main coil N11 and other coils N12 and N21 at the on-time of the main switching element Q.

A current induced in the control coil N12 at the on-time of the main switching element Q is inputted to the gate of the main switching element Q through direct-current cutting capacitor C1 and bias resistor R2. Moreover, the current induced in the control coil N12 at the on-time of the main switching element Q is inputted to one of the terminals of capacitor C14 from the above-mentioned capacitor C1 and bias resistor R2 through photo-transistor TR11 of photo-coupler PC1. The charging voltage of capacitor C14 is inputted to the base of control transistor TR12 that is interpolated between the gate and source of the main switching element Q.

A series-circuit consisting of diode D11 for preventing reverse currents, Zener diode D15, resistor R1 and control transistor TR1 is connected between connecting point P6 between capacitor C1 and bias resistor R2 and the power-source line 13 on the low-level side. Connecting point P52 between control transistor TR1 that also has the function of the aforementioned control transistor TR51 and resistor R1 is connected to connecting point P51 of the aforementioned dividing resistors R51 and R52 through resistor R53.

To the base of control transistor TR1 is supplied a source voltage from the sub power-source circuit 19a that forms a voltage corresponding to the secondary-side output current value, as will be described later, through resistor R14. Transistor TR15 is interpolated between the base of control transistor TR1 and the main power-source line 13 on the low-level side, and the source voltage from the sub power-source circuit 19a is inputted to the base of transistor TR15 through resistor R17 and Zener diode D18.

In other words, instead of the aforementioned photo-transistor TR13 of photo-coupler PC2, transistor TR15 drives the base of control transistor TR1; therefore, when the load of the secondary side becomes higher to make the source voltage from the sub power-source circuit 19a not less than the Zener voltage of Zener diode D18, a current flows through the base of transistor TR15, thereby turning transistor TR15 on. Consequently, the base of control transistor TR1 goes low, and control transistor TR1 is turned off, thereby carrying out an operation in the high-load operation mode.

In contrast, when the load of the secondary side becomes light to make the charging voltage lower than the Zener voltage, the base current of transistor TR15 becomes zero, thereby turning transistor TR15 off; thus, the base of control transistor TR1 is biased by the aforementioned resistor R14 so that control transistor TR1 turns on, thereby carrying out an operation in the low-load operation mode.

In this manner, control transistor TR1 is automatically controlled by making a judgement as to the level of the load only by the use of the primary side; therefore, there is no need to install a special construction for detecting the operation mode of installed devices such as control terminal P5, and it is possible to reduce costs.

The aforementioned sub power-source circuit 19a is constituted by smoothing capacitor C16, two diodes D2 and D3 and the choke coil L. Diode D2 draws an induced current from one of the terminals of the control coil N12 while the main switching element Q is on, and charges smoothing capacitor C16 through the choke coil L. Fly-wheel diode D3 connects connecting point P10 of the choke coil L and diode D2 to the other terminal of the aforementioned the control coil N12. Therefore, when the main switching element Q turns off and the direction of polarity of the induced voltage in the control coil N12 is inverted, diode D2 turns off, thereby allowing an exciting current inside the choke coil L to charge smoothing capacitor C16 through fly-wheel diode D3. The inductance of the choke coil L is selected so that the above-mentioned exciting current becomes zero by the next on-time of the main switching element at the time of heavy load.

With this construction, smoothing capacitor C16 is charged to a voltage corresponding to the output current value on the secondary side as described earlier so that it becomes possible to carry out the on/off driving of control transistor TR1 based upon the output voltage of smoothing capacitor C16.

In the switching power source S2 having the above-mentioned construction, upon heavy load, transistor TR15 turns on, and control transistor TR1 turns off, with the result that the aforementioned normal RCC operation is carried out without being subjected to any effects from the aforementioned series-circuit consisting of diode D11 for preventing reverse currents, Zener diode D15, resistor R1 and control transistor TR1.

In contrast, upon light load, transistor TR15 turns off and transistor TR1 turns on, with the result that the series-circuit is connected between the aforementioned connecting point P6 and the main power-source line 13. For example, the resistivity of bias resistor R2 is set to 680 Ω, and the resistivity of resistor R1 is set to, for example, 150 Ω. Therefore, during the on-time of the main switching element Q, a greater current is allowed to flow the series circuit, while the main switching element Q is kept at the on-state, so that a charge is accumulated in capacitor C1 with the control coil N12 side being positive.

Therefore, at the time of light load, even if a ringing pulse occurs, the ringing pulse is reverse-biased by a voltage between the terminals of capacitor C1, and is supplied to the main switching element Q, thereby preventing the on-driving of the main switching element Q. As compared with the above-mentioned conventional switching power source 1, this switching power source 52 is formed merely by adding a simple construction of resistor R1 and control transistor TR1 except for Zener diode D15 and diode D11 for preventing reverse currents which are not essential constituent parts as will be described later. More specifically, the switching frequency, which has been kept at, for example, approximately 80 kHz upon heavy load, increases to a range of 400 kHz to 500 kHz upon light load in the above-mentioned switching power source 1; in contrast, the switching power source 52 makes it possible to reduce it to approximately several kHz, and consequently to greatly enhance the power-conversion efficiency at the time of heavy load. Further, the aforementioned switching power source 51 needs a comparatively complex construction in the control circuit 59; however, as described above, this switching power source 52 is, virtually, merely added by resistor R1 and control transistor TR1, and control transistor TR1 also has a function of the aforementioned control transistor TR51; this makes it possible to provide such an extremely simple construction.

The power-source voltage from the sub power-source circuit 19a is also outputted to connecting point P7 of voltage-dividing resistors R3 and R4 of the above-mentioned starter circuit 14. Accordingly, the aforementioned capacitor C2 is installed in the starter circuit 14.

Therefore, upon application of power in which the voltage across the terminals of capacitor C2 is virtually zero, the divided voltage by the voltage-dividing resistors R3 through R5 of the main power-source voltage that is, for example, as high as several hundreds V, is applied to the gate of the main switching element Q.

In contrast, after the lapse of a predetermined time from the application of power, smoothing capacitor C16 is charged to a predetermined power-source voltage, for example, approximately 10 V, and capacitor C2 is charged to a voltage corresponding to the difference between the aforementioned main power-source voltage and the output voltage of the sub power-source circuit 19a. Therefore, as described earlier, even if the on-driving of the main switching element Q by the ringing pulse is not carried out due to light load and the starter circuit 14 is allowed to output a voltage for the on-driving, the current flow from the main power-source side to the voltage-dividing resistors R3 through R5 can be prevented, and the main switching element Q can be driven by the divided voltage of the output voltage of the sub power-source circuit 19a that is a comparatively low voltage. Thus, it is possible to cut power consumption by voltage-dividing resistors R3 through R5, and consequently to achieve high efficiency.

Here, diode D4 used for discharging is installed between connecting point P8 of the above-mentioned capacitor C2 and voltage dividing resistor R3 and the main power-source line 13 on the low-level side in parallel with voltage-dividing resistors R3 through R5 so as to be aligned in a reverse-bias direction. Therefore, when the main power-source voltage drops, the following discharging paths are formed for capacitor C2: a path from smoothing capacitor C11—main power-source line 13—voltage-dividing resistors R5 through R3—capacitor C2—main power-source line 12 to smoothing capacitor C11, and a path from smoothing capacitor C11—main power-source line 13—diode D4—capacitor C2—main power-source line 12 to smoothing capacitor C11. With these paths, even if the time from a power-source cut-off to a re-application is too short, capacitor C2 is positively allowed to discharge so that the electrical potential of connecting point P8 increases to virtually the same level as the main power-source voltage; therefore, it is possible to positively start the main switching element Q.

Additionally, in the same manner as the first embodiment, resistivities of division resistors R3 through R5 and the Zener voltage of Zener diode D15 are determined based upon equation (1), equation (2), etc. Moreover, if equation (1) and equation (2) can be satisfied at the time of light load, Zener diode D15 may be omitted. Furthermore, in the case when the negative bias is not released to the gate of the main switching element Q during the off-period of the main switching element Q by modifying, for example, the base-current supplying circuit, etc., it is also possible to omit diode D11 used for preventing reverse currents.

Figure 12:
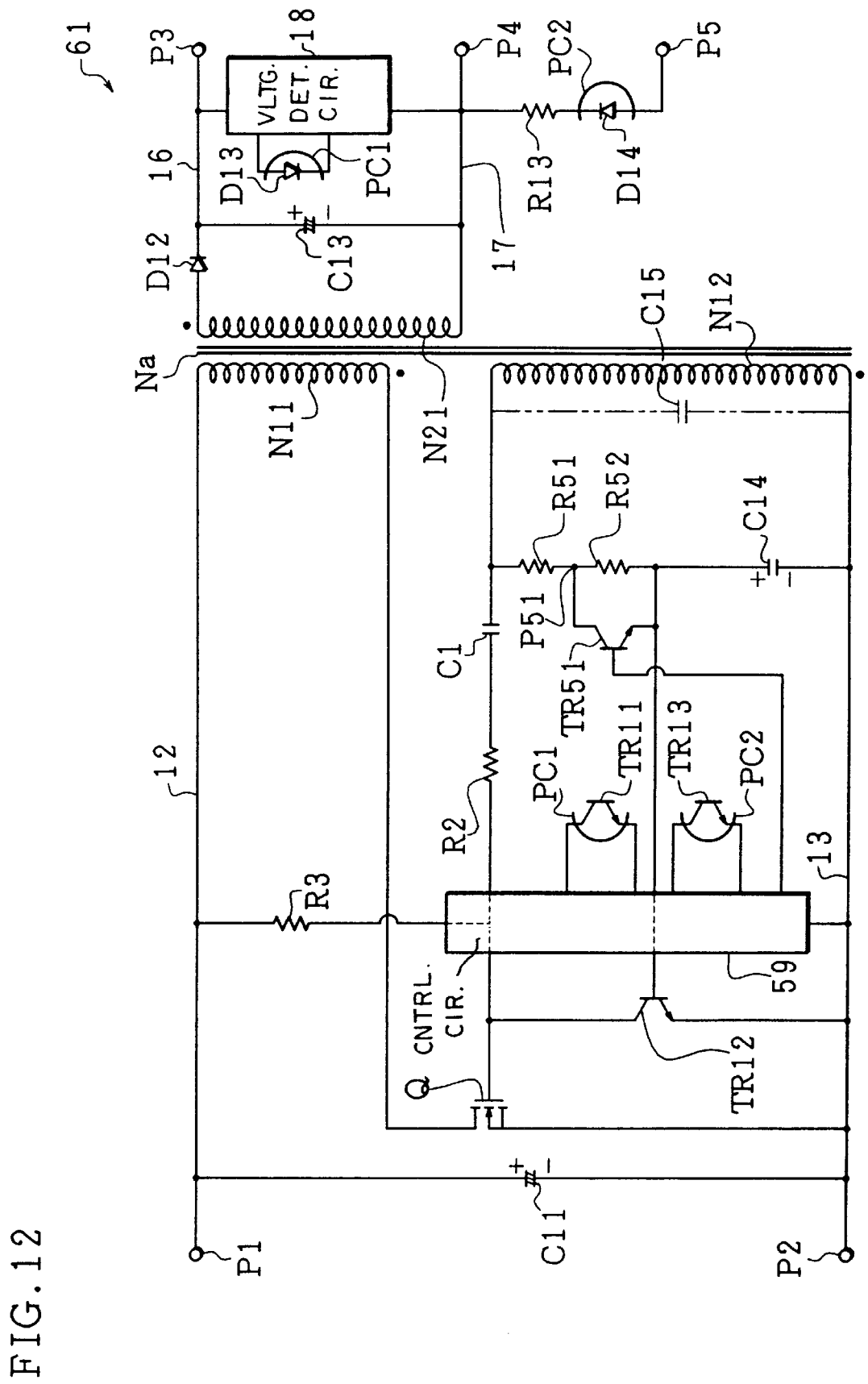
FIG. 12 is a block diagram that shows an electric construction of a switching power source in accordance with the seventh embodiment of the present invention.

Referring to FIG. 12, the following description will discuss the seventh embodiment of the present invention.

FIG. 12 is a block diagram of a switching power source 61 of the seventh embodiment of the present invention. Since this switching power source 61 is similar to the aforementioned switching power source 51, those corresponding members are represented by the same reference numerals and the description thereof is omitted. In the switching power source 61, control transistor TR51 is placed in parallel with division resistor R52. Therefore, the control circuit 59 controls this transistor TR51 so that at the time of heavy load, it is turned on so as to shortcircuit across the terminals of division resistor R52, thereby allowing the induced current in the control coil N12 to charge capacitor C14 with a comparatively small resistivity, and so that at the time of light load, it is turned off so as to release the terminals of division resistor R52, thereby allowing the induced current to be supplied to capacitor C14 with a comparatively large resistivity.

In this manner also, it is possible to make limited values on excessive currents of the main switching element Q virtually the same in both the light load time and the heavy load time by compensating capacitor C14 for its discharged portion of the accumulated charge having the reverse polarity due to the operation stop period of the main switching element Q at the time of light load. Here, it is needless to say that control transistor TR51 may be placed in parallel with division resistor R51.

Figure 13:
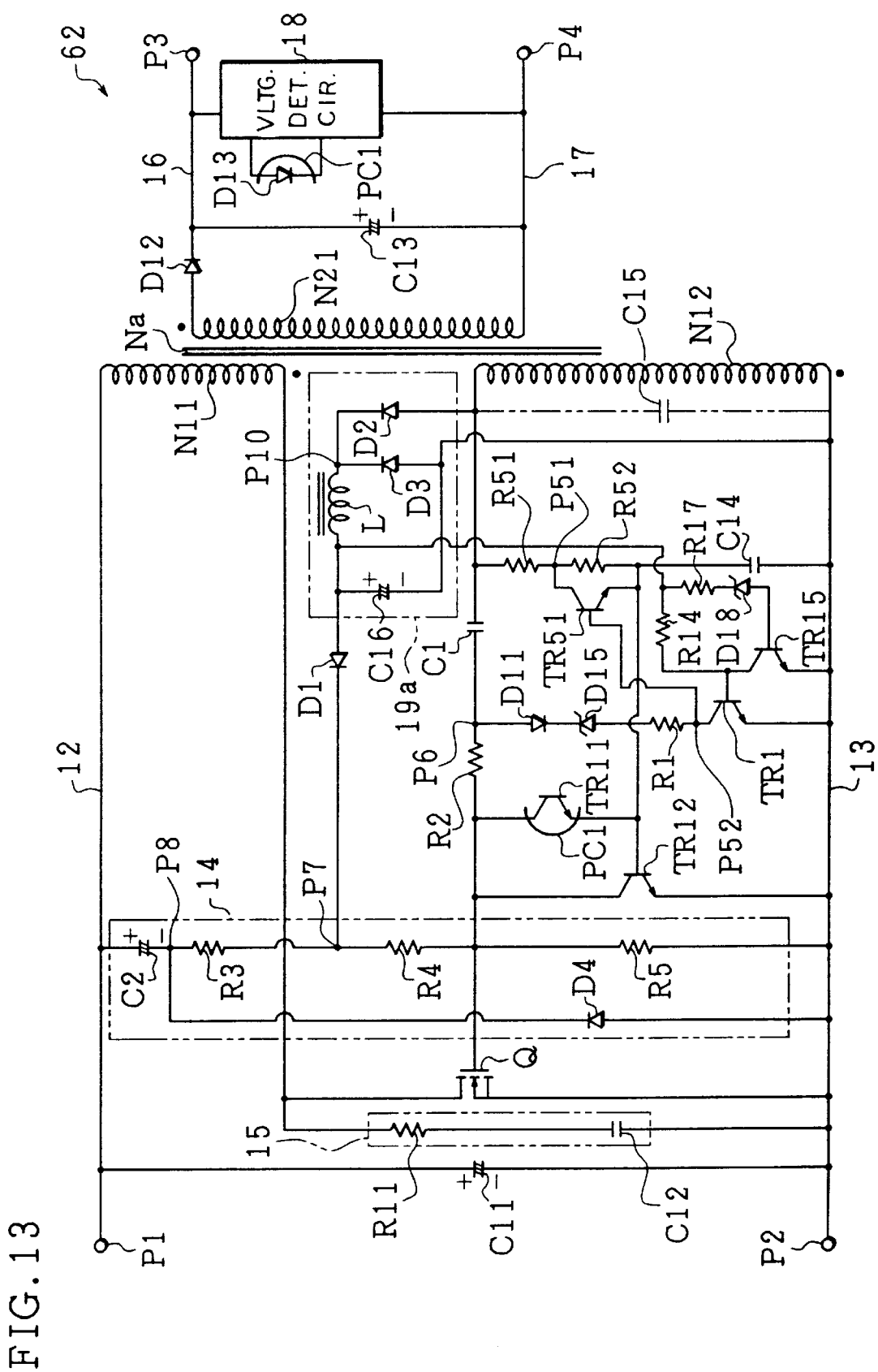
FIG. 13 is an electric circuit diagram of a switching power source in accordance with the eighth embodiment of the present invention.

Referring to FIG. 13, the following description will discuss the eighth embodiment of the present description.

FIG. 13 is an electric circuit diagram of a switching power source 62 of the eighth embodiment of the present invention. Since this switching power source 62 is similar to the aforementioned switching power sources 52 and 61, those corresponding members are indicated by the same reference numerals, and the description thereof is omitted. In this switching power source 62, in an attempt to utilize the fact that upon heavy load, transistor TR1 is turned off with its collector potential high, and that upon light load it is turned off with its collector potential low, the base of control transistor TR51 is connected to the collector of control transistor TR1. With this arrangement also, in the same manner as the aforementioned switching power-source 61, the terminals of division resistor R52 can be short-circuited at the time of heavy load, and can be opened at the time of light load.

Figure 14:
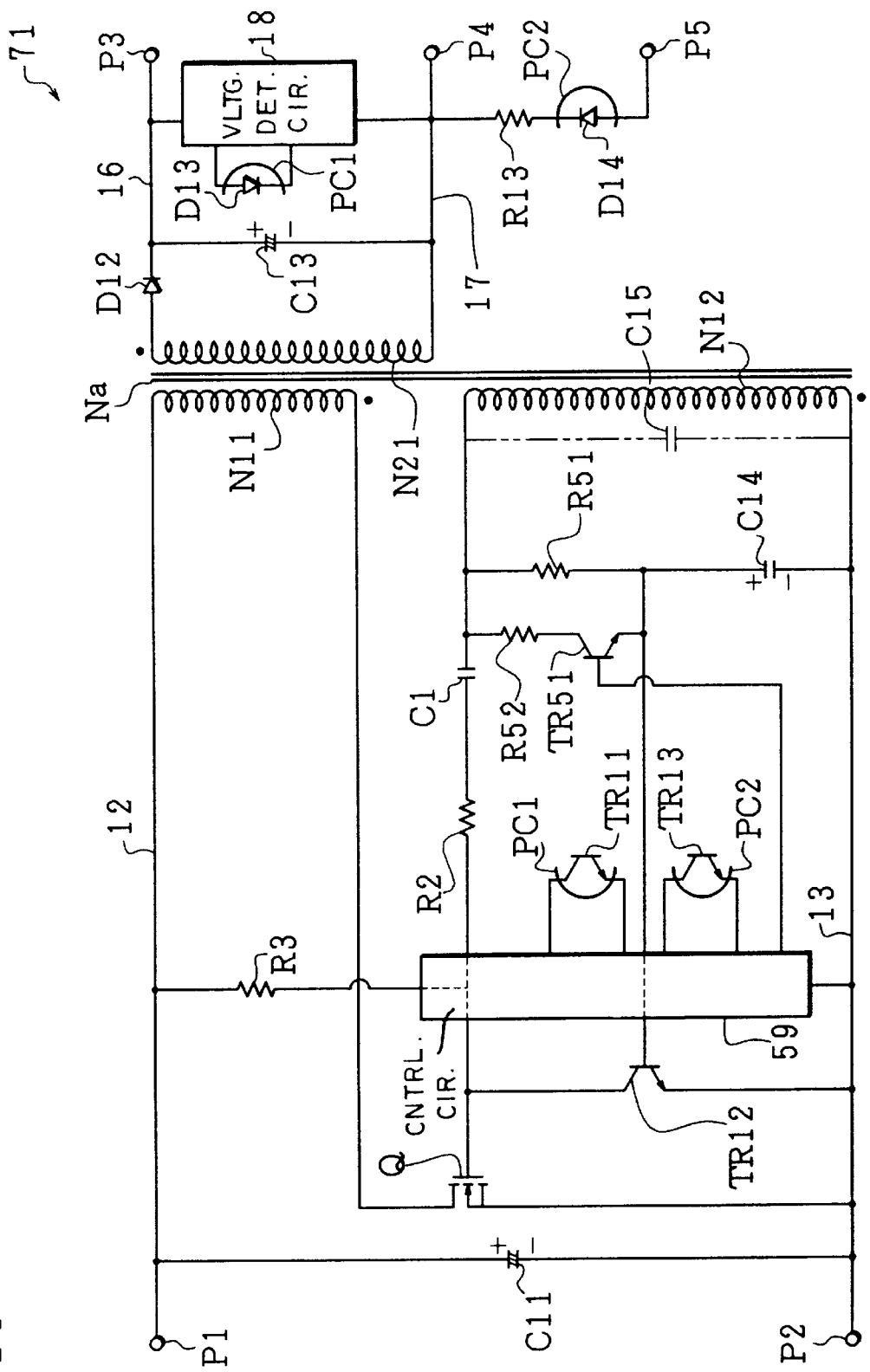
FIG. 14 is a block diagram that shows an electric construction of a switching power source in accordance with the ninth embodiment of the present invention.

Referring to FIG. 14, the following description will discuss the ninth embodiment of the present invention.

FIG. 14 is a block diagram of a switching power source 71 of the ninth embodiment of the present invention. Since this switching power source 71 is similar to the aforementioned switching power source 51, those corresponding members are represented by the same reference numerals and the description thereof is omitted. In this switching power source 71, two division resistors R51 and R52 are placed in parallel with each other, and the aforementioned transistor TR51 is connected in series with one of the division resistors (in an example of FIG. 14, with division resistor R52).

Therefore, at the time of heavy load, the control circuit 59 turns transistor TR51 on so as to minimize a composite resistivity by voltage-diving resistors R51 and R52, thereby supplying the induced current from the control coil N12 to capacitor C14 with a relatively small resistivity. At the time of light load, it turns transistor TR51 off, thereby supplying to capacitor C14 with a relatively large resistivity. In this manner also, it is possible to make limited values on excessive currents of the main switching element Q virtually the same in both the light load time and the heavy load time, by compensating capacitor C14 at the time of light load for a reduction in its accumulated charge having the reverse polarity.

Figure 15:
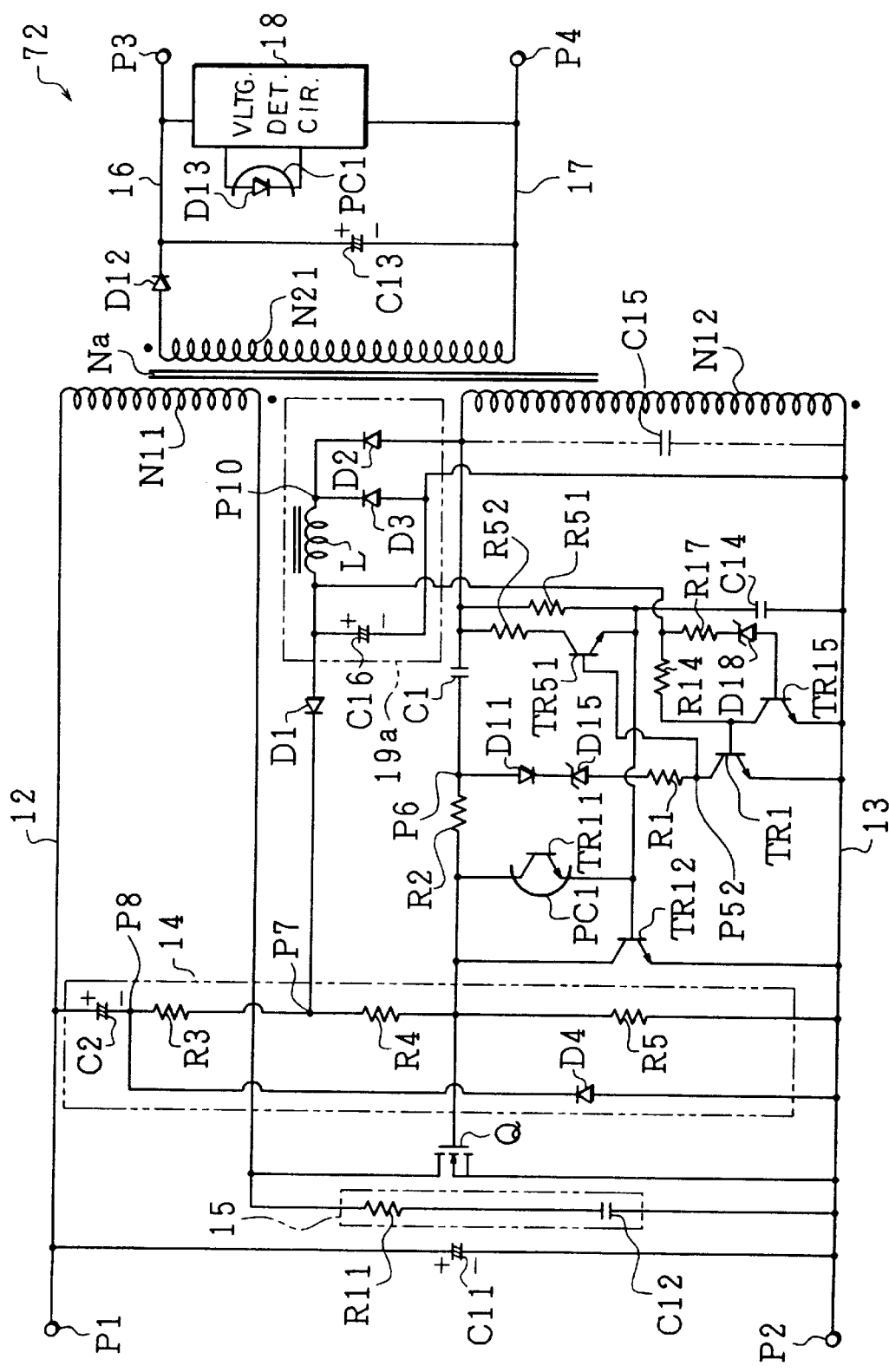
FIG. 15 is an electric circuit diagram of a switching power source in accordance with the 10th embodiment of the present invention.

Referring to FIG. 15, the following description will discuss the tenth embodiment of the present invention.

FIG. 15 is an electric circuit diagram of a switching power source 72 of the tenth embodiment of the present invention. Since this switching power source 72 is similar to the aforementioned switching power sources 52 and 71, those corresponding members are indicated by the same reference numerals, and the description thereof is omitted. In the switching power source 72, control transistor TR51 is series-connected to one of two division resistors R51 and R52 placed in parallel with each other, and its base is connected to the collector of the aforementioned control transistor TR1.

With this construction also, at the time of heavy load, control transistor TR1 is turned off with its collector high, thereby allowing control transistor TR51 to turn on so that the induced current in the control coil N12 is allowed to charge capacitor C14 with a relatively small resistivity. In contrast, at the time of light load, control transistor TR1 is turned on with its collector low, thereby allowing control transistor TR51 to turn off so that the induced current is allowed to charge capacitor C14 with a relatively large resistivity.

Figure 16:
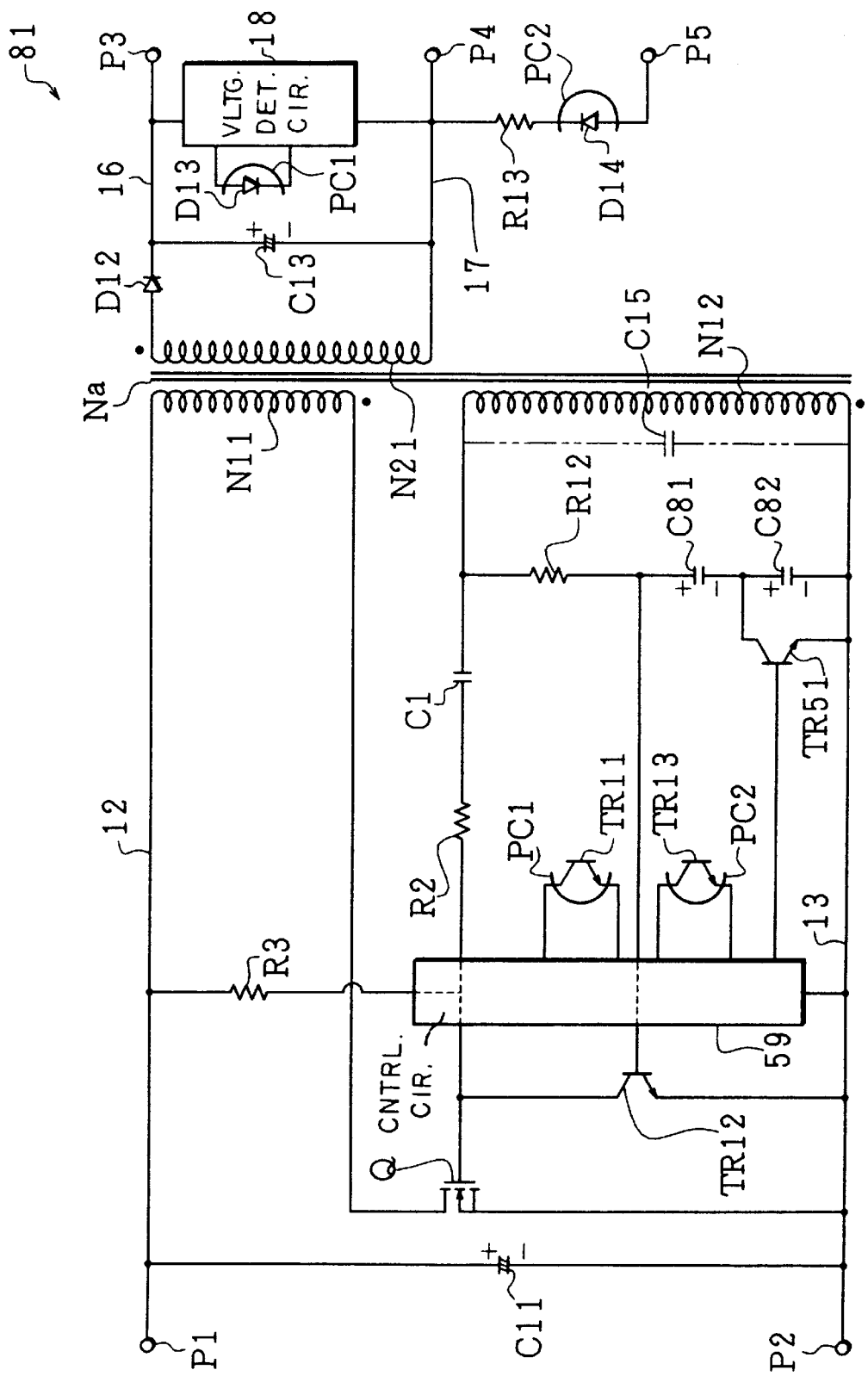
FIG. 16 is a block diagram that shows an electric construction of a switching power source in accordance with the 11th embodiment of the present invention.

Referring to FIG. 16, the following description will discuss the 11th embodiment of the present invention.

FIG. 16 is a block diagram that shows a switching power source 81 of the 11th embodiment of the present invention. Since this switching power source 81 is similar to the aforementioned switching power source 51, the corresponding members are indicated by the same reference numerals, and the description thereof is omitted. In the switching power source 81, constant resistor R12 is used in lieu of the aforementioned division resistors R51 and R52, capacitor C14 is divided into two division capacitors C81 and C82 that are connected in series with each other, and the aforementioned control transistor TR51 is installed in parallel with either division capacitor C81 or division capacitor C82 (in an example of FIG. 16, with C82). The capacity of division capacitor C81 is selected so as to be equal to that of the aforementioned capacitor C14.

Therefore, at the time of light load, the control circuit 59 turns control transistor TR51 on so as to bypass division capacitor C82, thereby allowing the induced current from the control coil N12 to charge division capacitor C81 with a comparatively large capacity. In contrast, at the time of heavy load, the control circuit 59 turns control transistor TR51 off, thereby allowing the induced current to charge a relatively small composite capacity made by connecting division capacitors C81 and C82 in series with each other.

In this manner, it is possible to compensate division capacitor C81 for a reduction in its accumulated charge having the reverse polarity at the time of light load by minimizing the capacity value of the capacitors, and consequently to make limited values on excessive currents of the main switching element Q virtually the same in both the light load time and the heavy load time.

Figure 17:
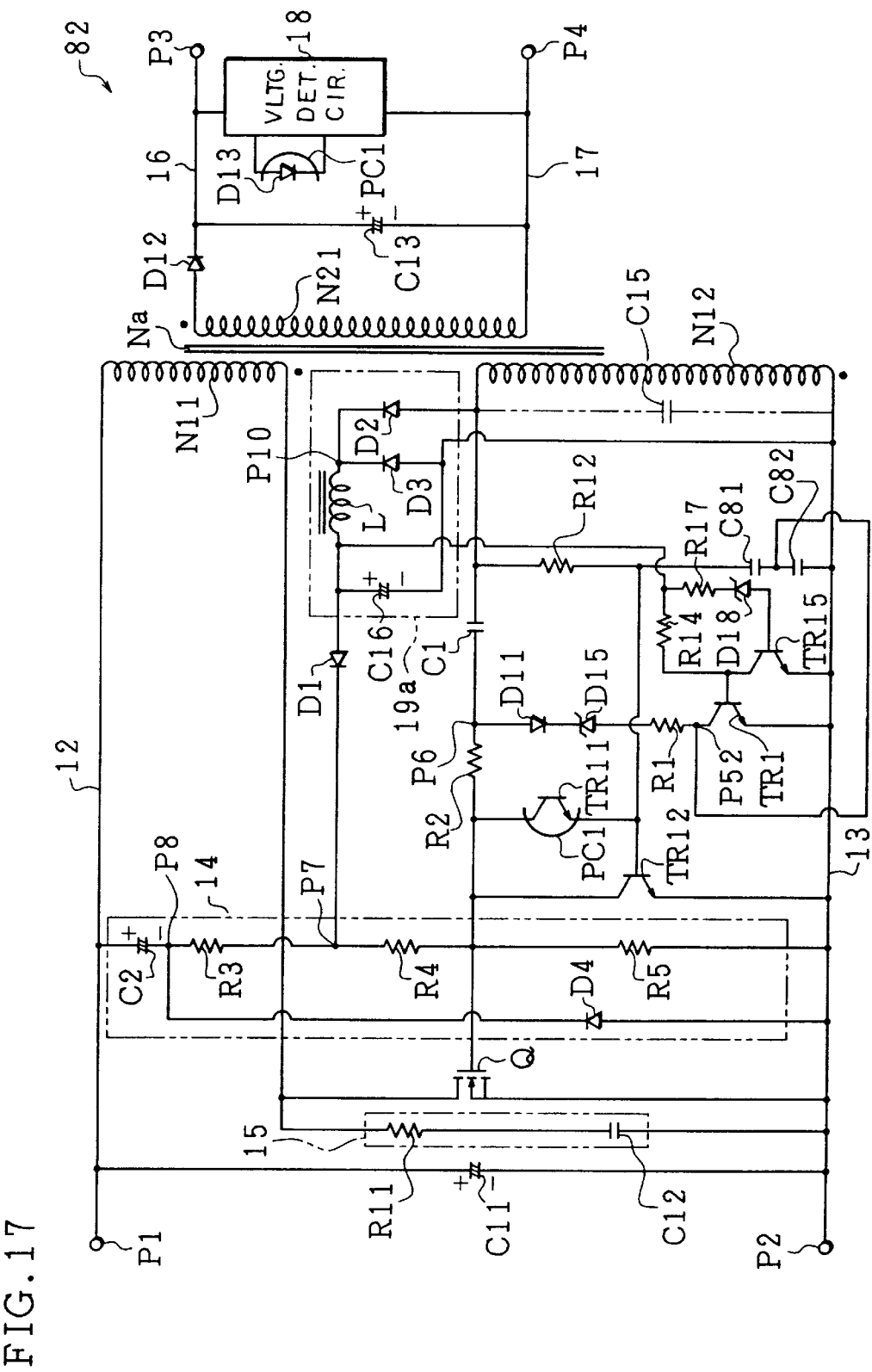
FIG. 17 is an electric circuit diagram of a switching power source in accordance with the 12th embodiment of the present invention.

Referring to FIG. 17, the following description will discuss the 12th embodiment of the present invention.

FIG. 17 is an electric circuit diagram showing a switching power source 82 of the 12th embodiment of the present invention. Since this switching power source 82 is similar to the aforementioned switching power sources 52 and 81, the corresponding members are indicated by the same reference numerals, and the description thereof is omitted. In this switching power source 82 also, the aforementioned capacitor C14 is divided into two division capacitors C81 and C82, and control transistor TR1 shortcircuits or opens the terminals of division capacitor C82.

Figure 18:
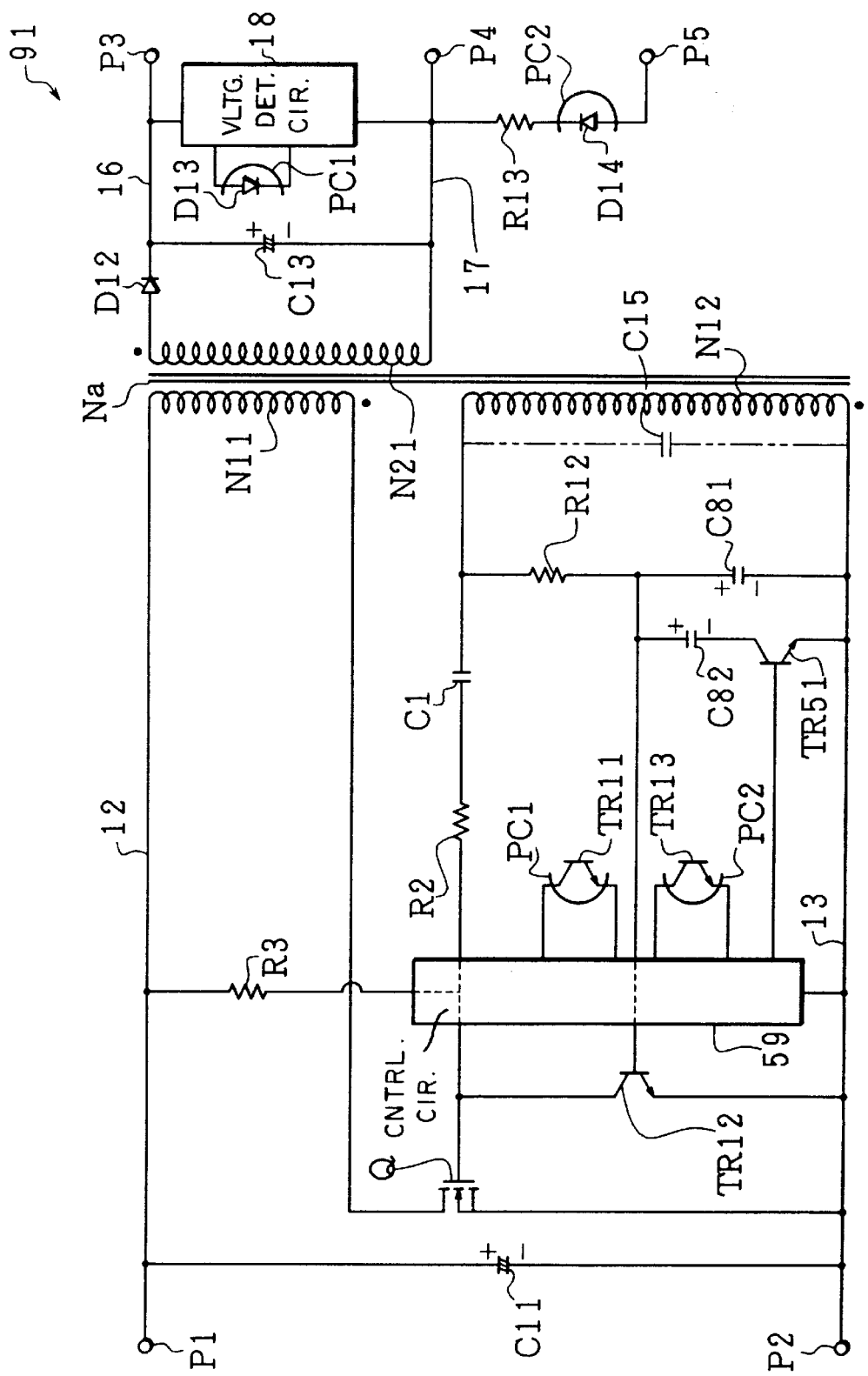
FIG. 18 is a block diagram that shows an electric construction of a switching power source in accordance with the 13th embodiment of the present invention.

Referring to FIG. 18, the following description will discuss the 13th embodiment of the present invention.

FIG. 18 is a block diagram that shows a switching power source 91 of the 13th embodiment of the present invention.

Since this switching power source 91 is similar to the aforementioned switching power sources 71 and 81, the corresponding members are indicated by the same reference numbers and the description thereof is omitted. In the switching power source 91, the aforementioned capacitors C81 and C82 are placed in parallel with each other, and the aforementioned control transistor TR51 is connected in series with one of the capacitors (division capacitor C82 in an example of FIG. 18). The capacity of division capacitor C81 is set to be equal to that of the aforementioned capacitor C14.

The control circuit 59 turns control transistor TR51 off at the time of heavy load, thereby making only the capacity of division capacitor C81 effective, and also turns control transistor TR51 on at the time of light load, thereby increasing the composite capacity value of division capacitors C81 and C82 so that the charging speed of division capacitors C81 and C82 is reduced. In this manner also, it is possible to make limited values on excessive currents of the main switching element Q virtually the same in both the light load time and the heavy load time.

Figure 19:
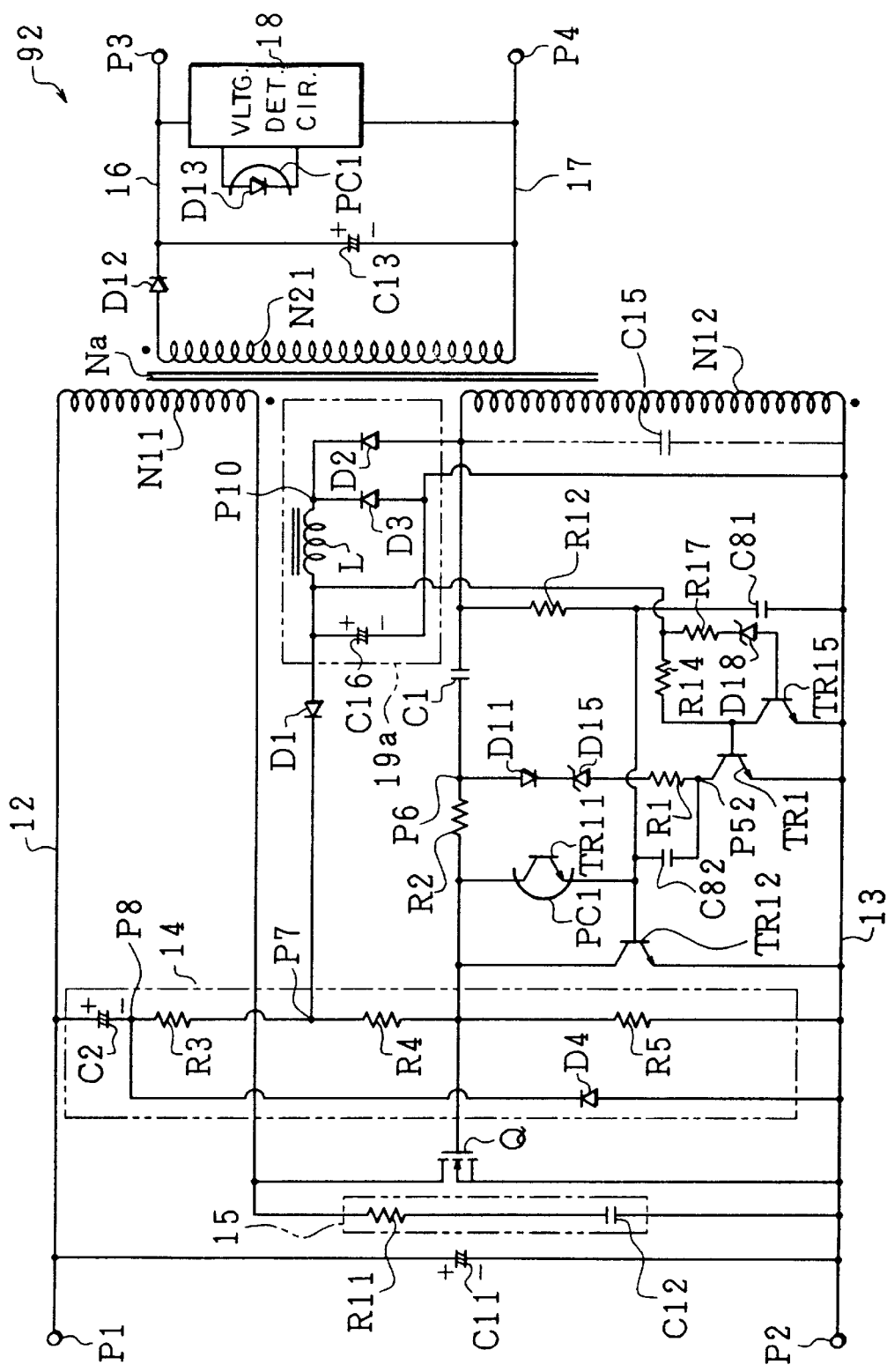
FIG. 19 is an electric circuit diagram of a switching power source in accordance with the 14th embodiment of the present invention.

Referring to FIG. 19, the following description will discuss the 14th embodiment of the present invention.

FIG. 19 shows an electric circuit diagram showing a switching power source 92 of the 14th embodiment of the present invention. Since this switching power source 92 is similar to the aforementioned switching power sources 72 and 82, the corresponding parts are indicated by the same reference numerals and the description thereof are omitted. In the switching power source 92 also, the aforementioned capacitor C14 are divided into division capacitors C81 and C82 that are aligned in parallel with each other, and at the time of light load, division capacitor C82 is connected in parallel with the above-mentioned division capacitor C81 by control transistor TR1.

Figure 20:
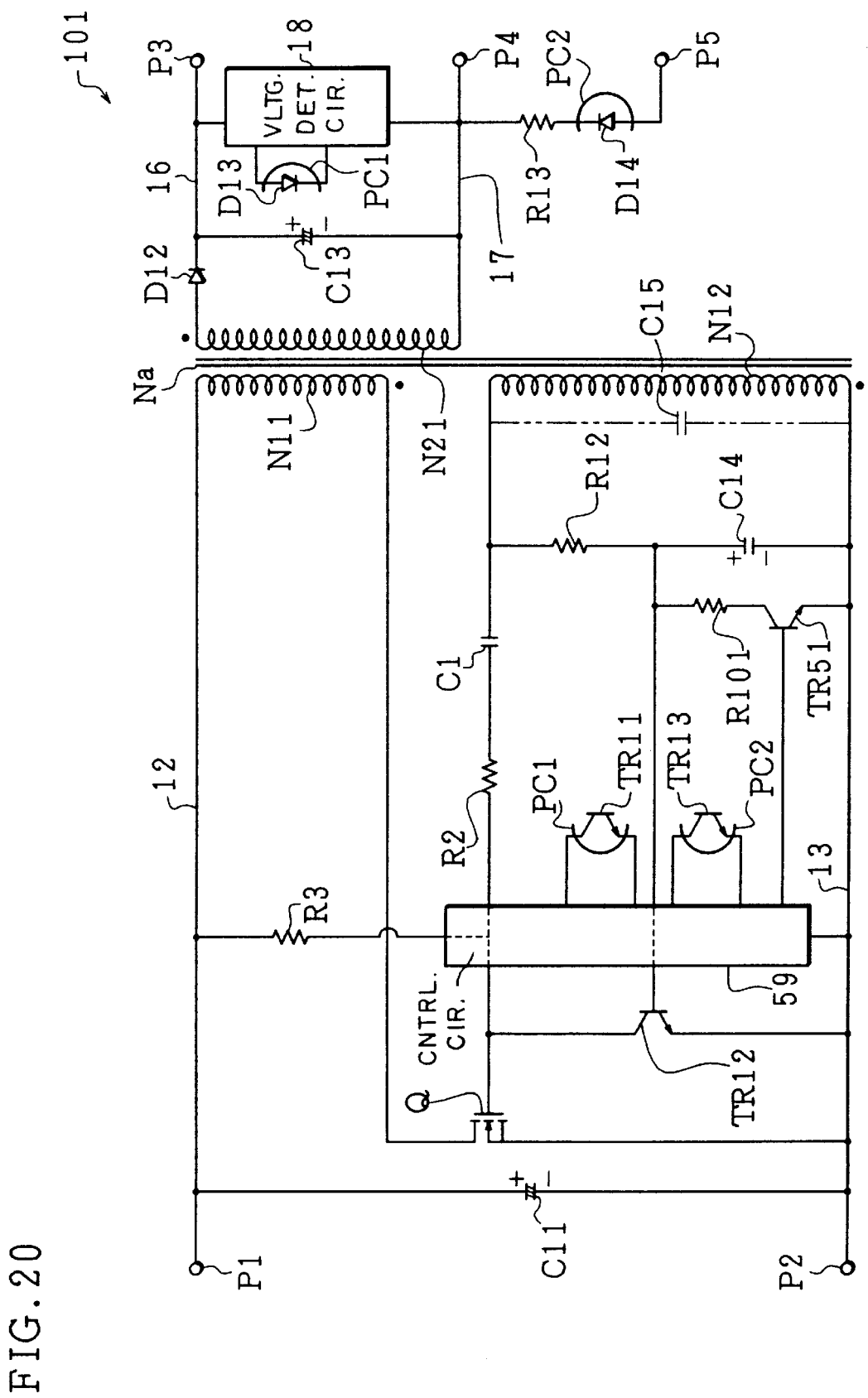
FIG. 20 is a block diagram that shows an electric construction of a switching power source in accordance with the 15th embodiment of the present invention.

Referring to FIG. 20, the following description will discuss the 15th embodiment of the present invention.

FIG. 20 is a block diagram showing a switching power source 101 of the 15th embodiment of the present invention. Since this switching power source 101 is similar to the aforementioned switching power sources 51, the corresponding parts are indicated by the same reference numerals and the description thereof is omitted. In the switching power source 101, a series circuit consisting of discharging resistor R101 and the aforementioned control transistor TR51 is installed in parallel with capacitor C14. A the time of heavy load, the control circuit 59 turns control transistor TR51 off, while at the time of light load, it turns control transistor TR51 on so as to bypass one portion of a charging current that flows from the aforementioned control coil N12 to capacitor C14 through constant resistor R12.

Therefore, since one portion of the charging current is bypassed at the time of light load, it is possible to compensate capacitor C14 for a reduction in its accumulated charge having the reverse polarity at the time of light load, and consequently to make the overcurrent limitation values of the main switching element Q at the time of light load and at the time of heavy load virtually equal to each other.

Figure 21:
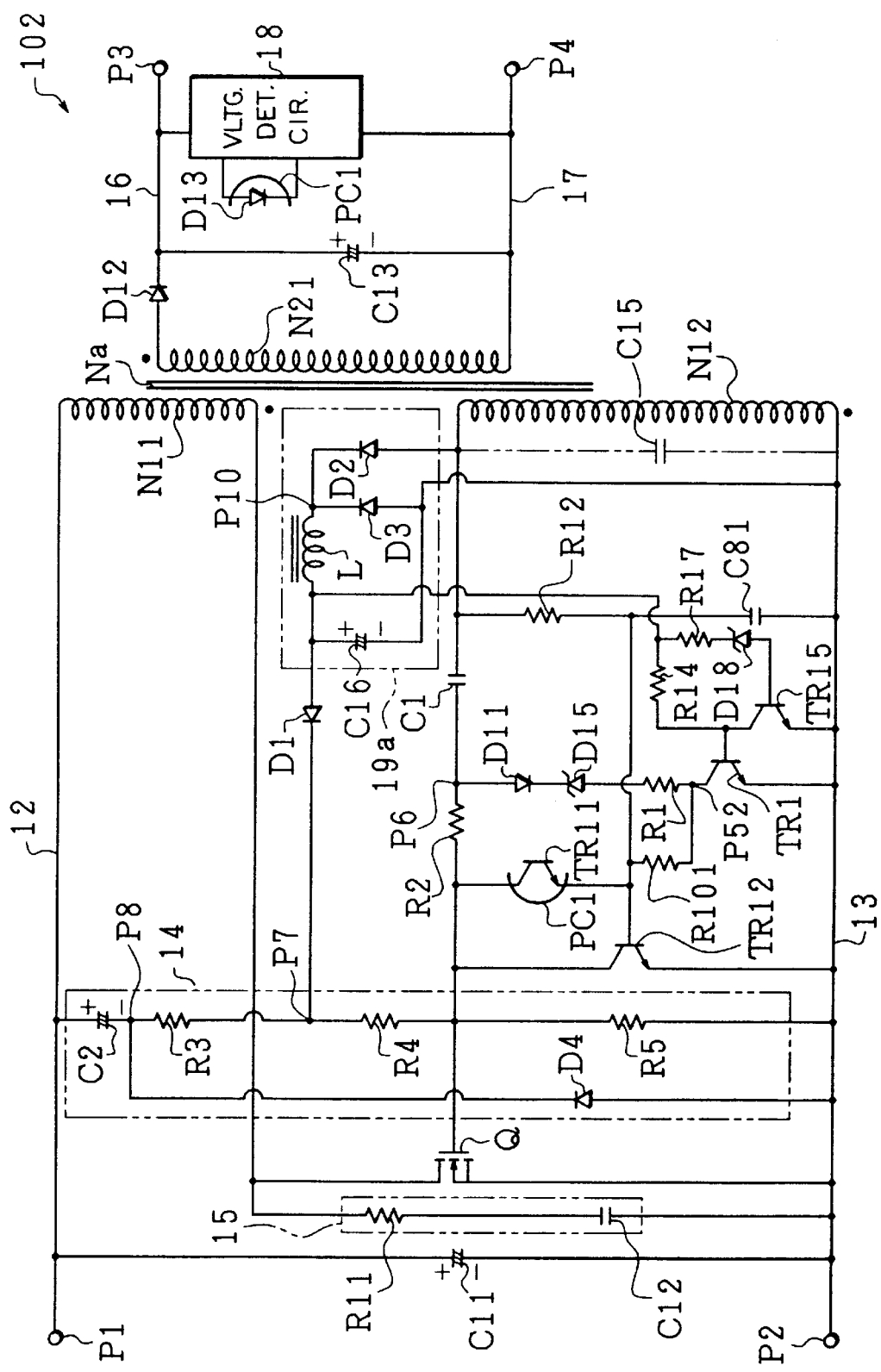
FIG. 21 is an electric circuit diagram of a switching power source in accordance with the 16th embodiment of the present invention.

Referring to FIG. 21, the following description will discuss the 16th embodiment of the present invention.

FIG. 21 is an electric circuit diagram showing a switching power source 102 of the 16th embodiment of the present invention. Since this switching power source 102 is similar to the aforementioned switching power sources 52 and 101, the corresponding parts are indicated by the same reference numerals and the description thereof is omitted. In this switching power source 102 also, discharging resistor R101 is placed in parallel with the aforementioned capacitor C14, and discharging resistor R101 is connected to the main power-source line 13 on the low-level side through the aforementioned control transistor TR1. This arrangement also makes it possible to bypass one portion of the charging current of capacitor C14 at the time of light load.

Figure 22:
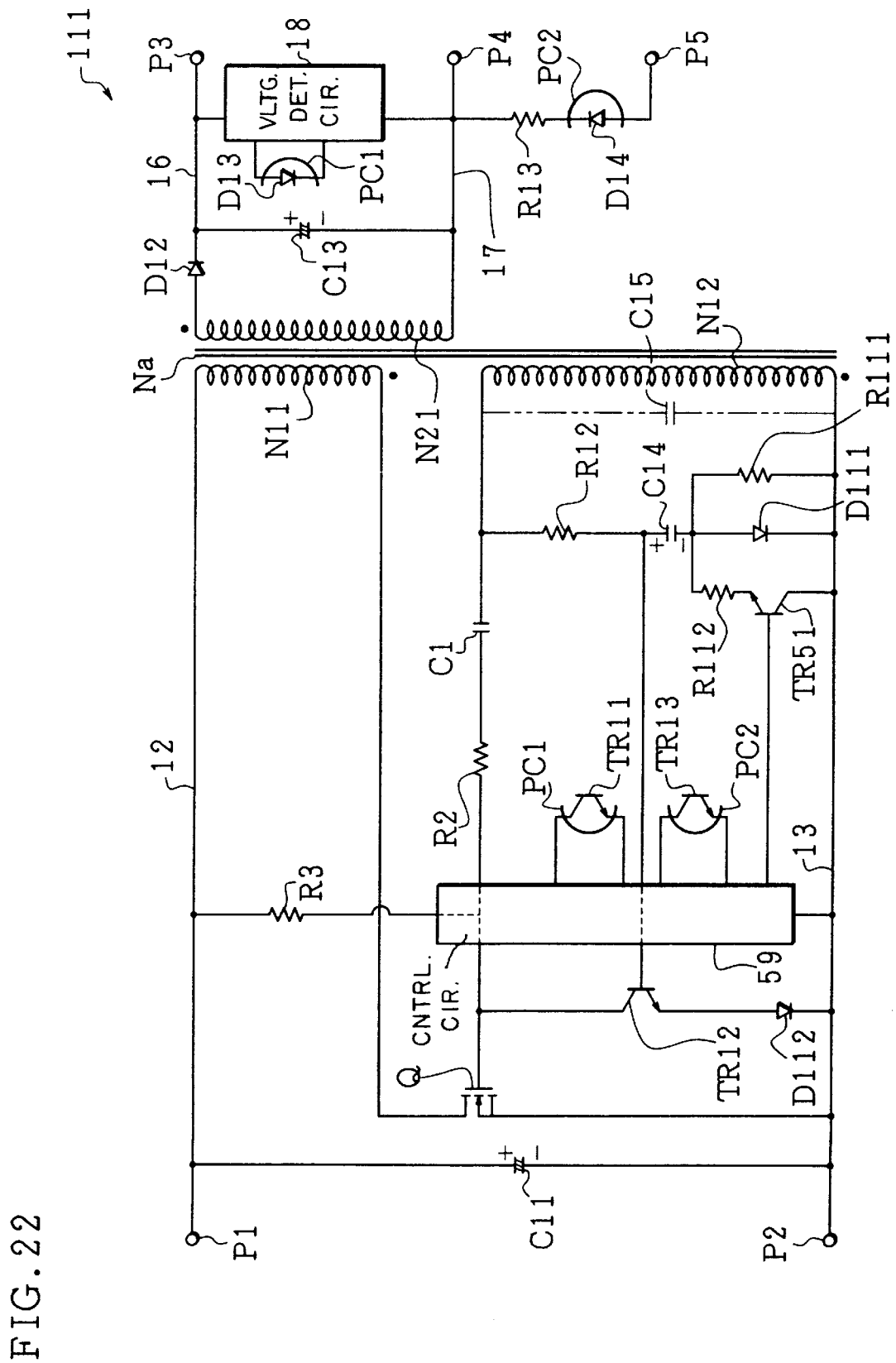
FIG. 22 is a block diagram that shows an electric construction of a switching power source in accordance with the 17th embodiment of the present invention.

Referring to FIG. 22, the following description will discuss the 17th embodiment of the present invention.

FIG. 22 is a block diagram showing a switching power source 111 of the 17th embodiment of the present invention. The basic construction of this switching power source 111 is similar to the aforementioned switching power source 51; however, in contrast with the fact that any of the switching power sources 61, 71, 81, 91, 101, including the switching power source 51, has an attempt to make the overcurrent limitation values of the main switching element Q at the time of light load and at the time of heavy load virtually equal to each other, by controlling the amount of charge to capacitor C14 or C81 and C82 which is made by the induced current of the control coil N12, during the on-time of the main switching element Q, this switching power source 111 has an attempt to make the above-mentioned overcurrent limitation values equal to each other by adjusting the charging current having the reverse polarity to capacitor C14 during the off-time of the main switching element Q.

For this reason, to the above-mentioned capacitor C14 is connected diode D111 in series therewith on the control coil N12 side in a forward direction with respect to the charging current having the positive polarity during the on-time of the main switching element Q. Resistor R111 is placed in parallel with this diode D111, and a series circuit consisting of resistor R112 and the aforementioned control transistor TR51 is also connected thereto. Here, control transistor TR51 has its collector connected to the control coil N12 side, that is, to the cathode side of diode D111, and its emitter connected to the capacitor C14 side. Additionally, resistor R112 and control transistor TR51 may be replaced with each other.

Therefore, during the on-time of the main switching element Q, the induced current of the control coil N12 normally charges capacitor C14 with the positive polarity through diode D11. In contrast, during the off-time of the main switching element Q, control transistor TR51 is turned on at the time of light load, with the result that the induced current having the reverse polarity in the control coil N12 charges capacitor C14 with the reverse polarity through a relatively small parallel resistivity of two resistors R111 and R112, while at the time of heavy load, control transistor TR51 is turned off, with the result that the induced current having the reverse polarity charges capacitor C14 with reverse polarity through a relatively high resistivity of only the resistor R111.

Therefore, a higher charge having the reverse polarity is stored in capacitor C14 at the time of light load as compared with the time of heavy load; this makes it possible to preliminarily compensate for an increase in the quantity of discharge due to the aforementioned operation suspension period of the main switching element Q. In this manner, it is possible to make the overcurrent limitation values of the main switching element Q at the time of light load and at the time of heavy load virtually equal to each other.

Additionally, diode D112 is interpolated between the emitter of control transistor TR12 and the main power-source line 13 on the low-level side. This diode D112 is installed so as to ensure the operation of control transistor TR12 against the shift of its base-bias level toward the high potential side due to the insertion of the aforementioned diode D111.

Figure 23:
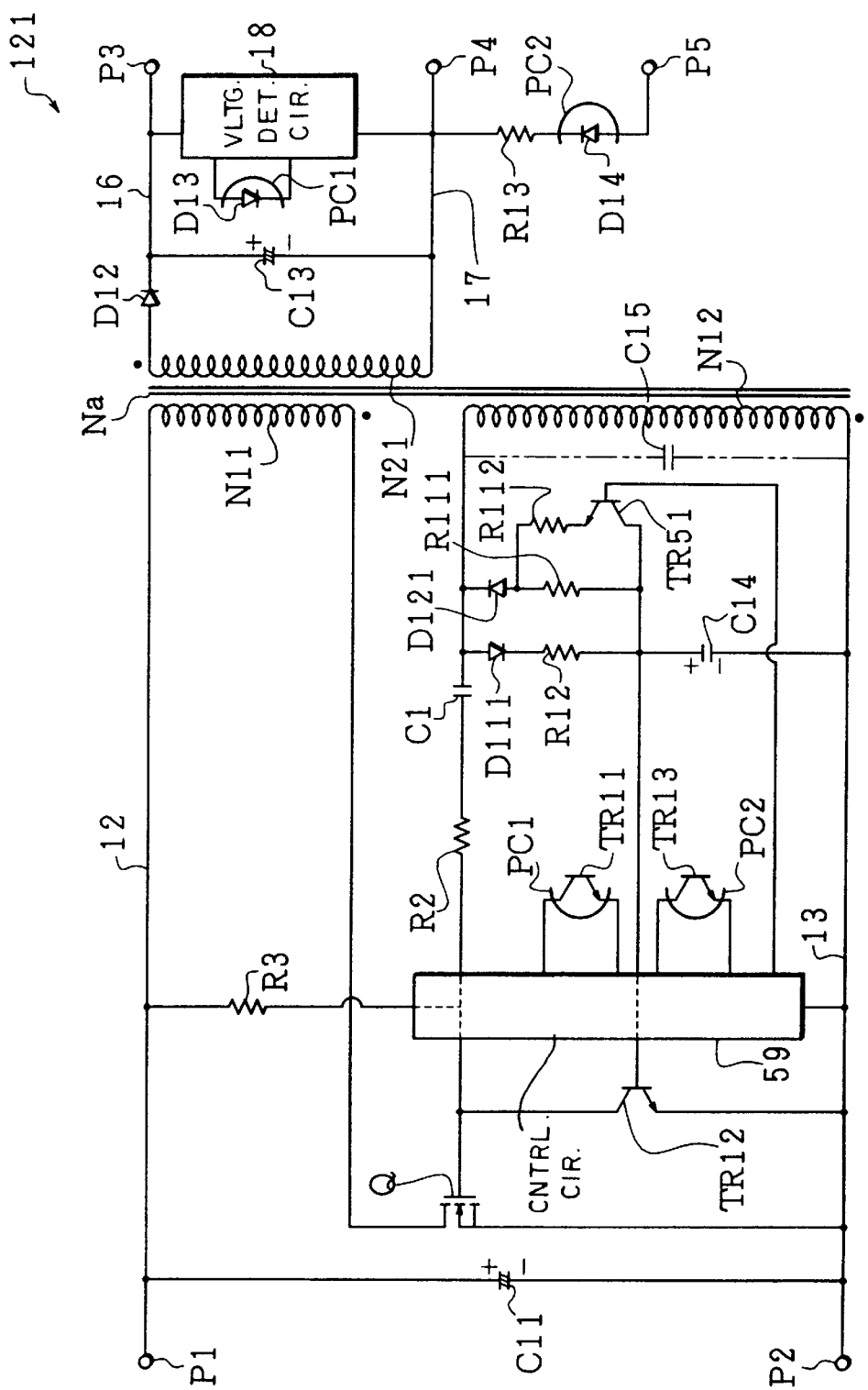
FIG. 23 is a block diagram that shows an electric construction of a switching power source in accordance with the 18th embodiment of the present invention.

Referring to FIG. 23, the following description will discuss the 18th embodiment of the present invention.

FIG. 23 is a block diagram showing a switching power source 121 of the 18th embodiment of the present invention. Since this switching power source 121 is similar to the aforementioned switching power source 111, the corresponding parts are indicated by the same reference numerals and the description thereof is omitted. In this switching power source 121, the aforementioned diode D111 is placed in series with constant resistor R12. Therefore, with respect to the series circuit of diode D111 and constant resistor R12, the series circuit of diode D121 and resistor R111 is installed, and the aforementioned control transistor TR51 is series-connected to resistor R112 which is placed in parallel with resistor R111.

The control circuit 59 turns control transistor TR51 on at the time of light load, thereby increasing the charging current having the reverse polarity to capacitor C14 in the same manner as the aforementioned switching power source 111. In this manner also, it is possible to make the overcurrent limitation values of the main switching element Q at the time of light load and at the time of heavy load virtually equal to each other.

It is needless to say that the same construction as the aforementioned switching power sources 111 and 121 may be applied to the switching power sources related to the first through fourth embodiments of the present invention. In the above-mentioned fourth embodiment, etc., when the switching power source decreases the oscillation frequency, or changes the time constant used for charging capacitor C14 (C82 and C83), it makes a judgement as to the level of load based upon the terminal voltage of the choke coil L on the diode D1 side in the sub power-source circuit 19a placed on the primary side. Here, the sub power-source circuit 19a may be used regardless of the above-mentioned applications, as long as it is used for the purpose of identifying the level of load. The following description will discuss cases in which the sub power-source circuit 19a is used for applications other than those described above.

Figure 24:
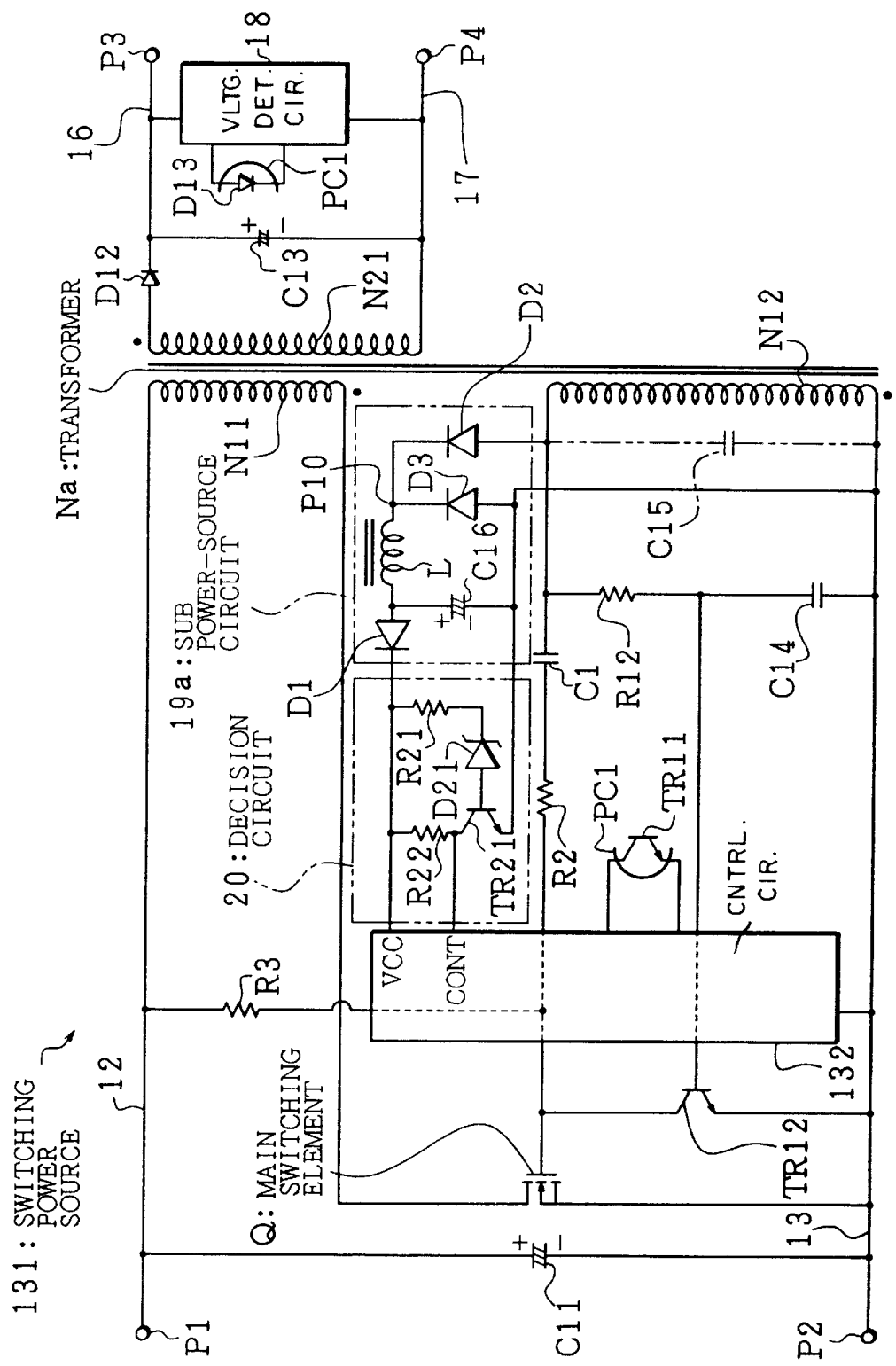
FIG. 24 is a block diagram that shows an electric construction of a switching power source of the RCC system in accordance with the 19th embodiment of the present invention.
Figure 25:
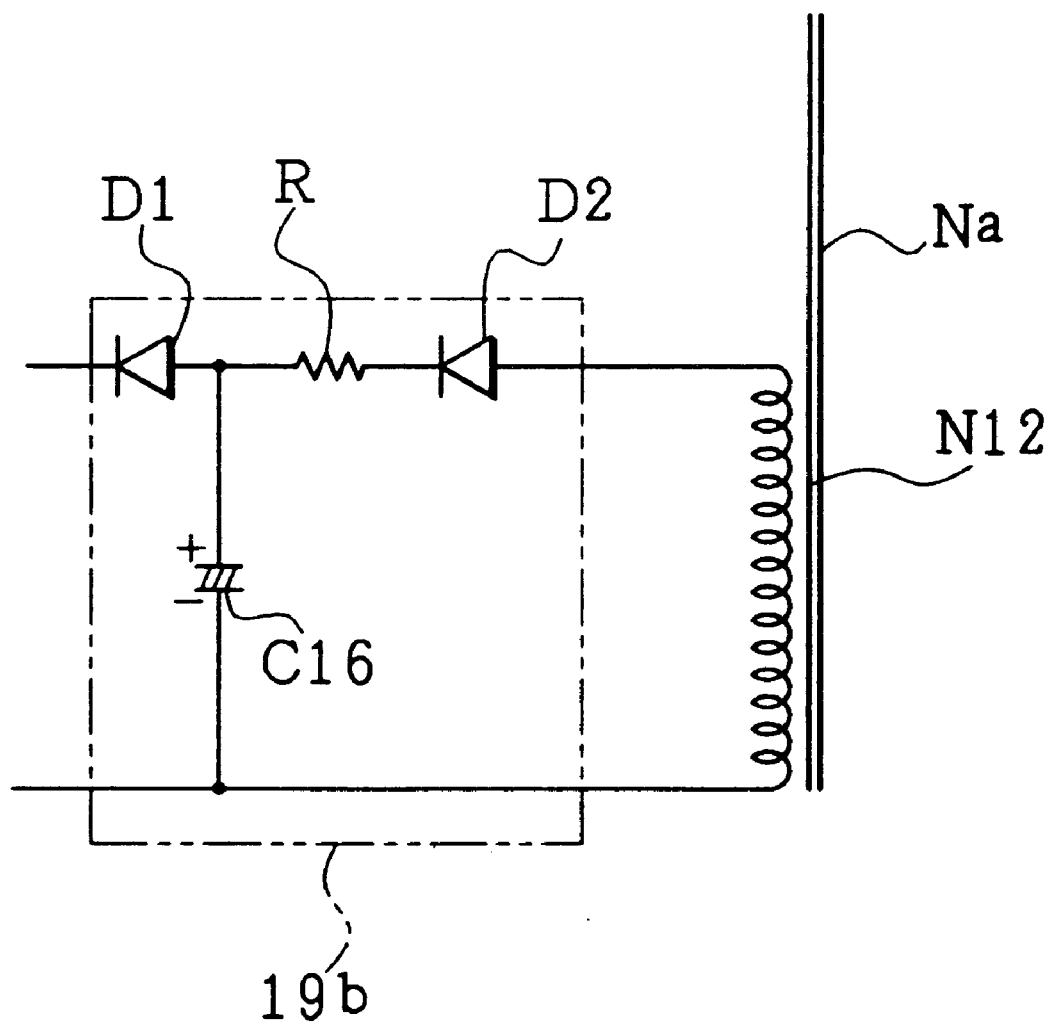
FIG. 25 is an electric circuit diagram that explains another example of a sub power-source circuit in the switching power source shown in FIG. 24.

Referring to FIGS. 24 and 25, the following description will discuss the 19th embodiment of the present invention.

FIG. 24 is a block diagram showing an electrical construction of a switching power source 131 of the RCC system of the 19th embodiment of the present invention. A dc, which has been obtained by rectifying a commercial ac by using a main power source circuit (not shown), is inputted between input terminals P1 and P2. The dc is smoothed by smoothing capacitor C1, and a main power source voltage is outputted between a main power source line 12 on the high-level side and a main power source line 13 on the low-level side from smoothing capacitor C11.

A series circuit of the primary main coil N11 of a transformer Na and a main switching element Q is connected between the main power source lines 12 and 13. The main switching element Q is realized by using, for example, a bipolar transistors or an electric-field effect type transistor, and in the example of FIG. 24, the electric-field effect type transistor is adopted. Moreover, a control circuit 132 is connected between the main power source lines 12 and 13 through resistor R3.

Upon application of power, that is, upon applying a source voltage between input terminals P1 and P2, the output voltage of smoothing capacitor C11, that is, the main source voltage, increases, and when the output voltage of a starter circuit, which is realized by division resistors in the control circuit 132, exceeds the threshold voltage Vth of the main switching element Q, for example, not less than 3 V, the main switching element Q is turned on so that a voltage in the upward direction in FIG. 24 is applied to the primary main coil N11 and excited energy is accumulated therein. When the main switching element Q is turned off in a manner as will be described later, a voltage having the upward direction is induced in the secondary main coil N21 by the excited energy. The dc, induced in the above-mentioned secondary coil N21, is given to smoothing capacitor C13 through diode D12, and after having been smoothed by smoothing capacitor C13, it is outputted to a load circuit, not shown, from output terminals P3 and P4 through the output power-source lines 16 and 17.

A voltage detection circuit 18 is interpolated between the above-mentioned output power-source lines 16 and 17. The voltage detection circuit 18 is constituted by division resistors, photo-coupler PC1, etc., and light-emitting diode D13 of photo-coupler PC1 is driven so as to light up with a luminance corresponding to the output voltage, and the value of the output voltage is fed back to the primary side.

Upon turning the main switching element Q on, a voltage is induced in the control coil N12 in the same upward direction as that of the primary main coil N11, and its induced current is given to the gate of the main switching element Q through capacitor C1 for cutting dc and bias resistor R2; thus, the gate potential of the main switching element Q is further raised so that the main switching element Q is maintained in the ON state.

Moreover, the current induced in the control coil N12 upon turning the main switching element Q on is given to one of the terminals of capacitor C14 from capacitor C1 and bias resistor R2 through photo-transistor TR11 of the above-mentioned photo-coupler PC1. The other terminal of capacitor C14 is connected to the aforementioned main power-source line 13 in the low level; therefore, the higher the secondary-side output voltage becomes, the greater the charging current, thereby allowing the terminal voltage of capacitor C14 to increase rapidly. The charging voltage of capacitor C14 is supplied to the base of control transistor TR12 that is interpolated between the gate and source of the main switching element Q, and when the output voltage goes beyond the threshold voltage of control transistor TR12, for example, not less than 0.6 V, control transistor TR12 is allowed to conduct, making the gate voltage of the main switching element Q drop abruptly, with the result that the main switching element Q is off-driven.

Therefore, the higher the secondary-side output voltage becomes, that is, the lighter the load, the quicker the output voltage of capacitor C14 increases, with the result that the main switching element Q is off-driven more quickly. Moreover, the current induced in the control coil N12 is supplied to capacitor C14 through resistor R12. With this arrangement, even if the output voltage of smoothing capacitor C13 on the secondary side is low due to shortcircuiting between output terminals P3 and P4, etc., it is possible to limit the on-period of the main switching element Q to a predetermined period, thereby protecting the main switching element Q.

Here, supposing that the numbers of coil of the control coil N12 and the secondary main coil N21 are represented by the same numbers as the reference numerals and the output voltage on the secondary side is Vo, the voltage (N12/N21) Vo is induced in the control coil N12 in the downward direction of FIG. 24 upon turning the main switching element Q off; thus, the charge of capacitor C14 is drawn, and a resetting operation for the next on-operation of the main switching element Q is carried out.

When, after turning the main switching element Q off, the excited energy, accumulated in the primary main coil N11, has been outputted to the secondary side, ringing occurs between parasitic capacity C15 mainly possessed by the control coil N12 and the control coil N12, the electrostatic energy, accumulated in parasitic capacity C15 with the voltage (N12/N21) Vo, is discharged, this is converted to excited energy of the control coil N12 after a ¼ period of vibration, and then an electro motive voltage with the voltage (N12/N21) Vo in the upward direction is generated in the control coil N12 so as to again charge parasitic capacity C15. The electro motive voltage, which is a ringing pulse, is set to be not less than the threshold voltage of the main switching element Q; thus, the main switching element Q is again turned on by the electro motive voltage. In this manner, the main switching element Q is continuously on/off-driven based upon the switching frequency corresponding to the load automatically, thereby achieving the RCC operation for outputting a desired secondary-side output voltage.

In addition to the construction for carrying out a normal RCC operation as described above at the time of heavy load in which the apparatus which is equipped with the switching power source 131 is in the non-stand-by state, the present invention is provided with a sub power-source circuit 19a and a decision circuit 20 in addition to the control coil N12 serving as a detection coil, so as to reduce the switching frequency at the time of light load in which the apparatus equipped with the switching power source 131 is in the stand-by state.

The aforementioned sub power-source circuit 19a is constituted by smoothing capacitor C16, diodes D1, D2 and D3 and the choke coil L. Diode D2 draws an induced current from one of the terminals of the control coil N12 while the main switching element Q is on, and charges smoothing capacitor C16 through the choke coil L. Fly-wheel diode D3 connects connecting point P10 of the choke coil L and diode D2 to the other terminal of the aforementioned control coil N12. Therefore, when the main switching element Q turns off and the direction of polarity of the induced voltage in the control coil N12 is inverted, diode D2 turns off, thereby allowing an exciting current inside the choke coil L to charge smoothing capacitor C16 through fly-wheel diode D3. The inductance of the choke coil L is selected so that the above-mentioned exciting current becomes zero by the next on-time of the main switching element at the time of heavy load.

In the sub power-source circuit 19a having the above-mentioned construction, the choke coil L serving as an impedance element is interpolated between diode D2, which is a rectifying means, and smoothing capacitor C16 so that the charging voltage $E_0$ of the aforementioned smoothing capacitor C16 becomes higher, as the output current value on the secondary side increases, that is, as the on-period of the main switching element Q becomes longer. The charging voltage $E_0$ is supplied to the power-source input terminal VCC of the control circuit 132, and also supplied to the decision circuit 20, through diode D1.

The decision circuit 20 is constituted by resistors R21 and R22, transistor TR21 and Zener diode D21. The aforementioned charging voltage $E_0$ is supplied to the base of transistor TR21 through resistor R21 and Zener diode D21, and the aforementioned charging voltage $E_0$ is applied to the collector of transistor TR21 through resistor R22, with the collector being connected to the control input terminal CONT of the control circuit 132 and the emitter being connected to the main power-source line 13 on the low-level side.

Therefore, when the load on the secondary side becomes heavier and the charging voltage $E_0$ of smoothing capacitor C16 becomes higher so that it becomes not less than the Zener voltage of Zener diode D21, a current flows through the base of transistor TR21, thereby turning transistor TR21 on. Consequently, the control input terminal CONT of the control circuit 132 goes low, thereby allowing the control circuit 132 to carry out an operation in the normal operation mode with heavy load.

In contrast, when the load on the secondary side becomes lighter and the charging voltage $E_0$ of smoothing capacitor C16 becomes lower than the Zener voltage, the base current of transistor TR21 becomes zero so that transistor TR21 is turned off. Consequently, the control input terminal CONT of the control circuit 132 goes high, thereby allowing the control circuit 132 to carry out an operation in the operation mode with light load.

In the operation mode with heavy load, the control circuit 132 carries out the normal RCC operation as described earlier, and in the operation mode with light load, it prevents the ringing pulse from entering the gate of the main switching element Q so that a re-activation is carried out by resistor R3 and a starter circuit in the control circuit 132, thereby allowing a switching operation by using a frequency that is sufficiently lower than that of the RCC operation. As described above, the sub power-source circuit 19a having the above-mentioned construction operates as an equivalent circuit as shown in FIG. 7; therefore, as indicated by equations (4) through (6), as the period TIN during which the main switching element Q is kept on increases, the charging voltage $E_0$ of smoothing capacitor C16 increases. In this case, constant resistor $R_0$ shown in FIG. 7 is equivalent to the control circuit 132, resistors R21 and R22, and control transistor TR12. Thus, independent of a construction for controlling the switching frequency, the decision circuit 20 makes a judgement as to the level of the load based upon the output voltage of the sub power-source circuit 19a, thereby controlling the switching frequency of the control circuit 132.

As described above, in the present embodiment, in the switching power source 131 where the control circuit 132 controls the on/off periods of the main switching element Q in response to the secondary-side output voltage detected by the voltage detection circuit 18 so as to obtain a desired secondary-side output voltage, the sub power-source circuit 19a rectifies and smoothes the induced voltage in the coil N12 for detection so as to allow the decision circuit 20 to make a judgement as to the level of the load based upon its output voltage.

With this construction, when an attempt is made to reduce loss that increases with an increase in the switching frequency due to a charge drawn from the node of the main switching element Q, etc., it is possible to easily achieve a construction for making a judgement as to the level of the load with little loss.

As described above, without causing greater loss due to, for example, a series connection of a current-detection resistor to the main switching element Q or an installation thereof in a line having a comparatively large current flow, such as, the power-source line 12, 13, 16 or 17, and with a simple construction provided only in the primary side circuit where only a simple insulation is required, it is possible to make a judgement as to the level of the load. Moreover, since the control coil N12 for generating a ringing pulse is used as the detection coil, it becomes possible to make a judgement as to the level of the load, without causing an increase in the number of coils and taps in the transformer N.

Additionally, although the sub power-source circuit 19a is designed in the so-called forward system which generates a positive pulse in the control coil N12 during the on-time of the main switching element Q, also in the fly-back system which generates a positive pulse during the off-time thereof, it makes the positive-pulse generation period $T_{IN}$ longer with respect to an increase in load; therefore, it is possible to make a judgement as to the level of the load based upon the charging voltage $E_0$ of the smoothing capacitor C16. In the case of the construction using the fly-back system, it is possible to reduce the variation in the output voltage of the sub power-source circuit 19a with respect to the variation in the input power-source voltage.

Although the above-mentioned explanation deals with a case in which the current flowing the choke coil L disappears during the off period of the positive pulse of the control coil N12 as shown in FIG. 8, also in the case when it does not disappear, it is possible to increase the charging voltage $E_0$ of smoothing capacitor C16 with the increase in the load.

The sub power-source circuit 19a can achieve virtually the same operation as the sub power source circuit 19b as shown in FIG. 25. In other words, the positive pulse, generated in the control coil N12, is supplied to the aforementioned smoothing capacitor C16 through diode D2 and resistor R. In this construction, since resistor R is used as the impedance element, it is possible to eliminate the aforementioned choke coil L and fly-wheel diode D3 although a slight loss occurs due to resistor R; thus, this construction is preferably used for a case in which low costs are required.

Moreover, when a dedicated sub coil is attached to the transformer Na as a detection coil for the secondary side load, it becomes possible to set the output voltage of the sub power-source circuit 19a (19b) to an optimal value, independent of other designing limitations to the switching power source.

Figure 26:
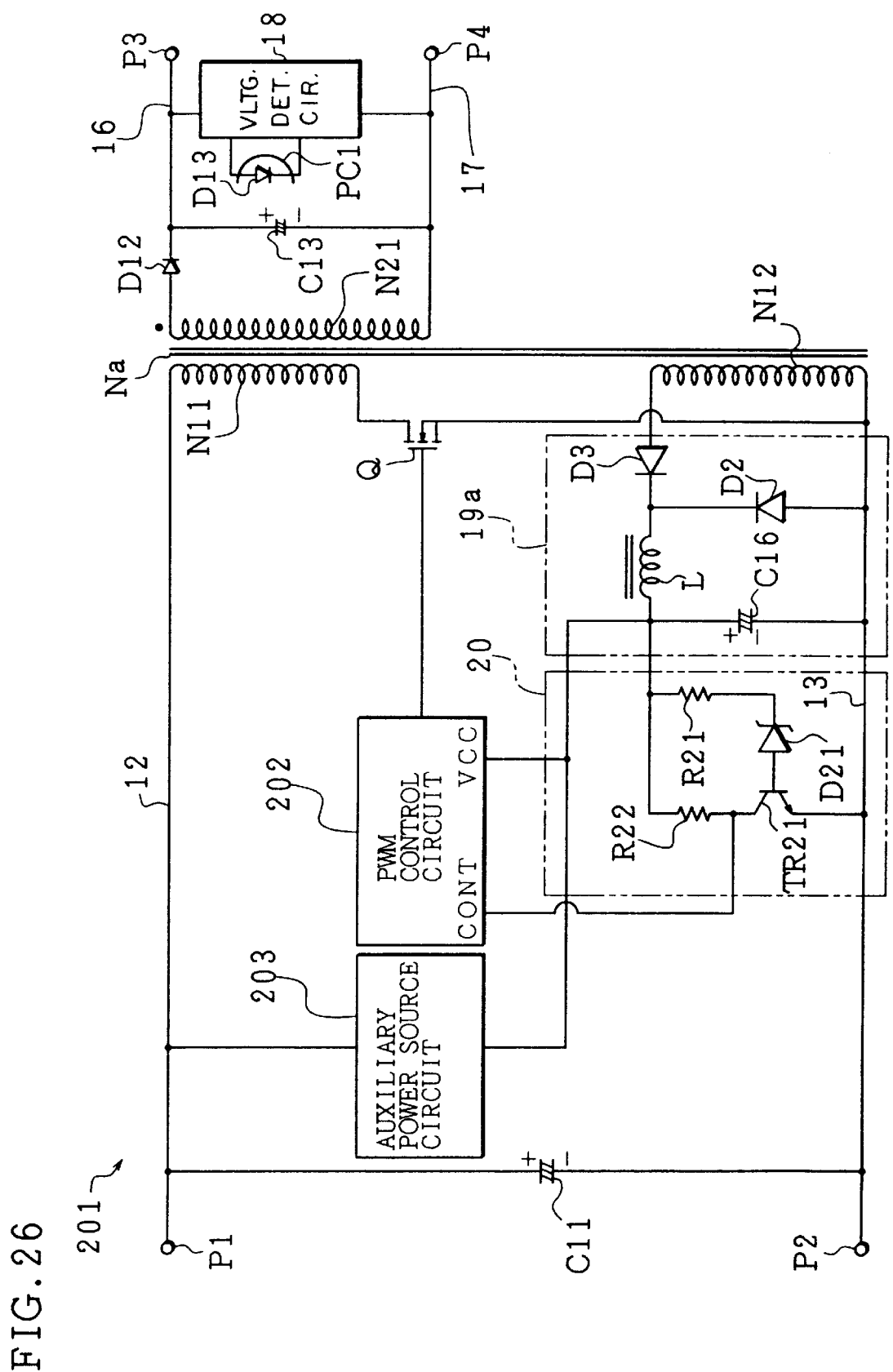
FIG. 26 is a block diagram that shows an electric construction of a switching power source of a PWM system in accordance with the 20th embodiment of the present invention.
Figure 27:
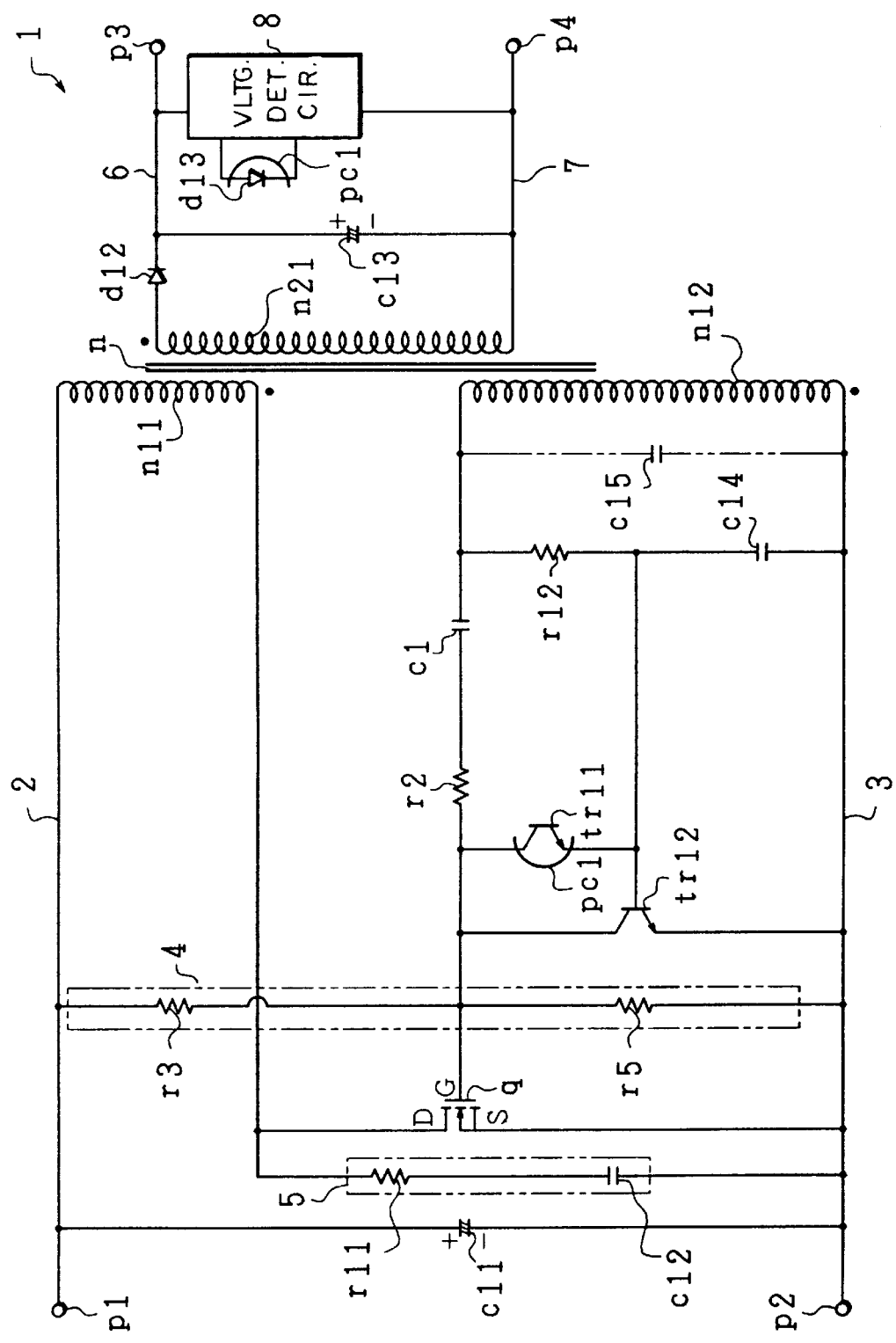
FIG. 27 is an electric circuit diagram of a typical prior-art switching power source of the RCC system.
Figure 28:
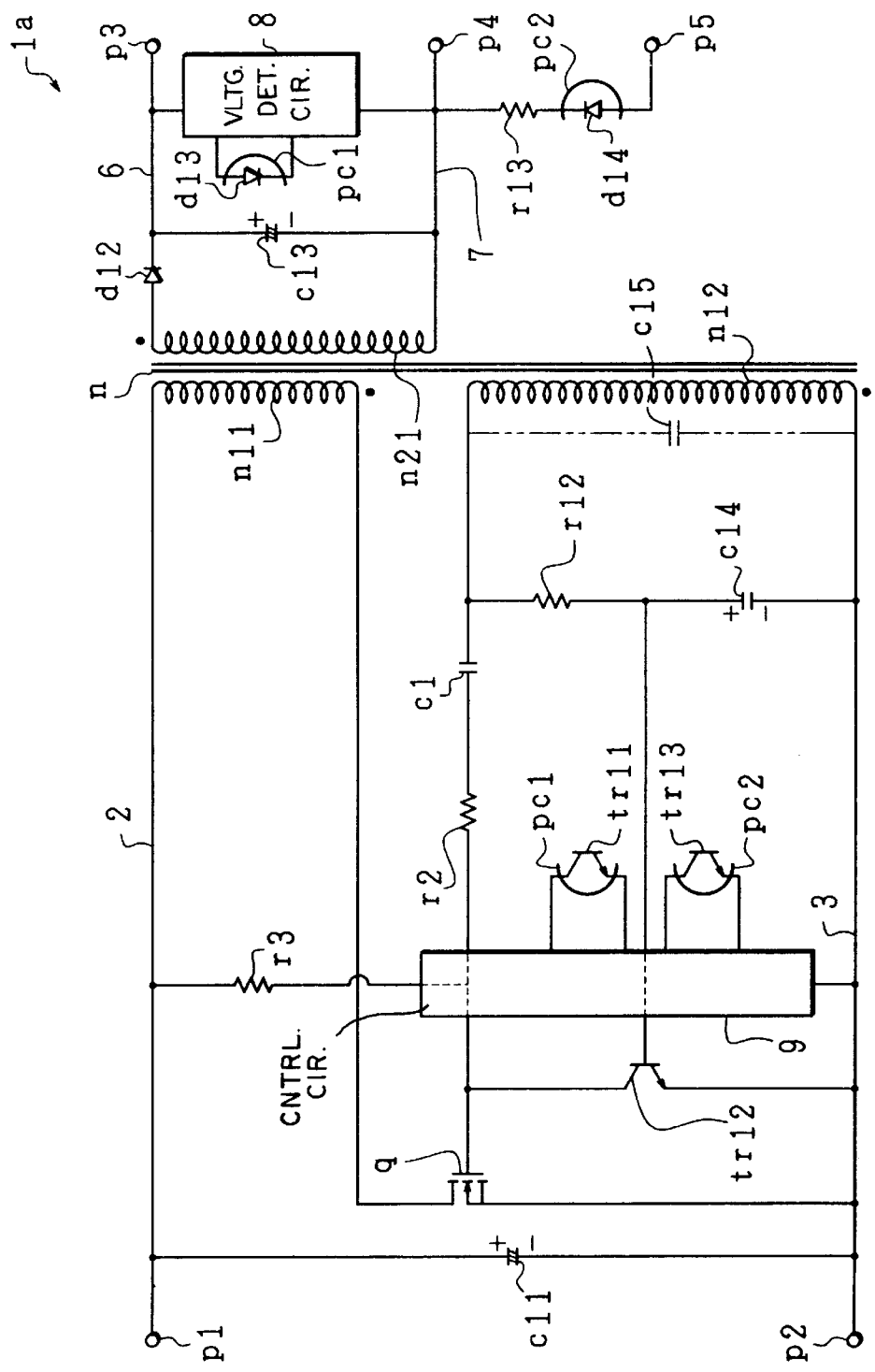
FIG. 28 is a block diagram that schematically shows another typical prior-art switching power source of the RCC system.
Figure 29:
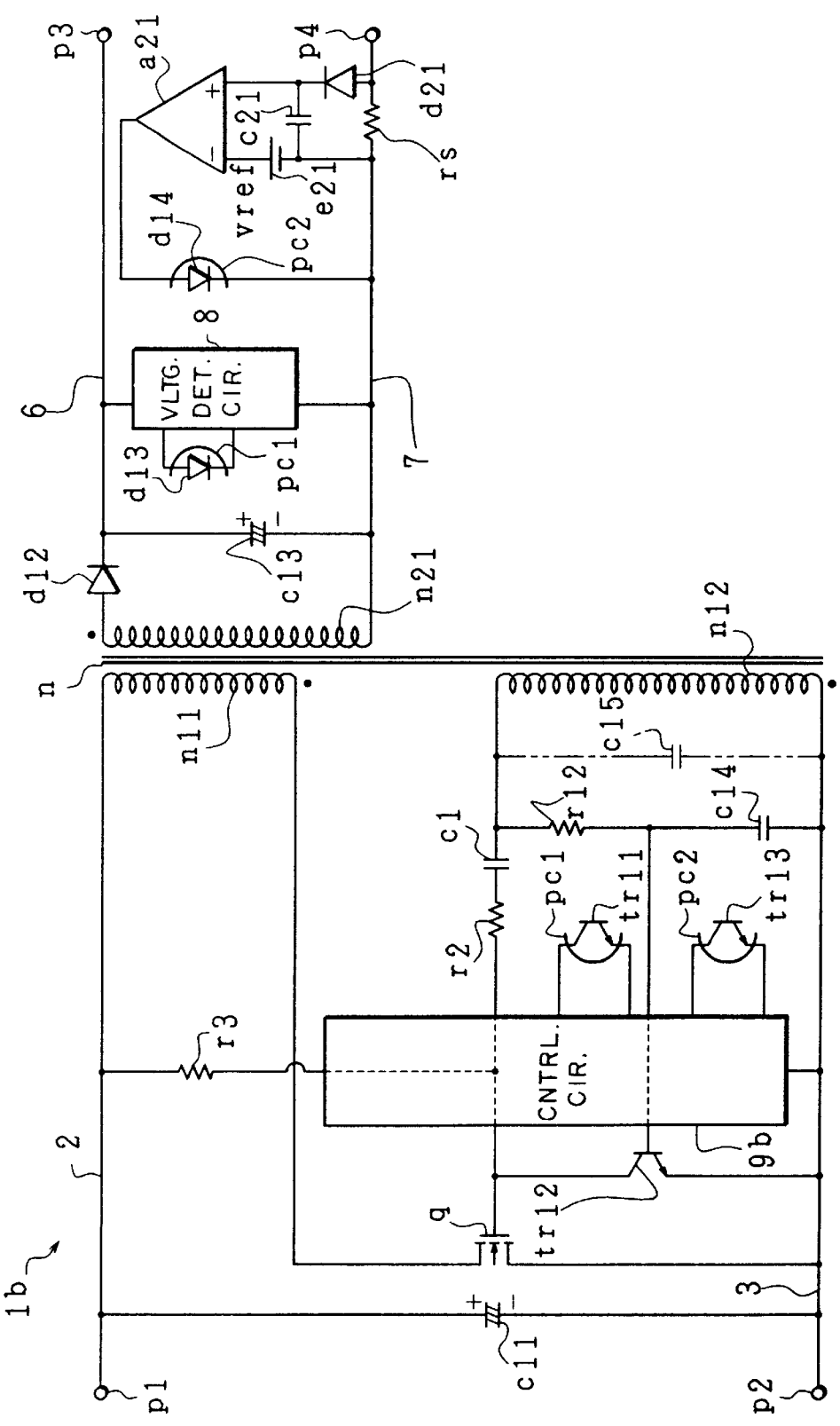
FIG. 29 is a block diagram that shows an electric construction of still another typical prior-art switching power source of the RCC system.
Figure 30:
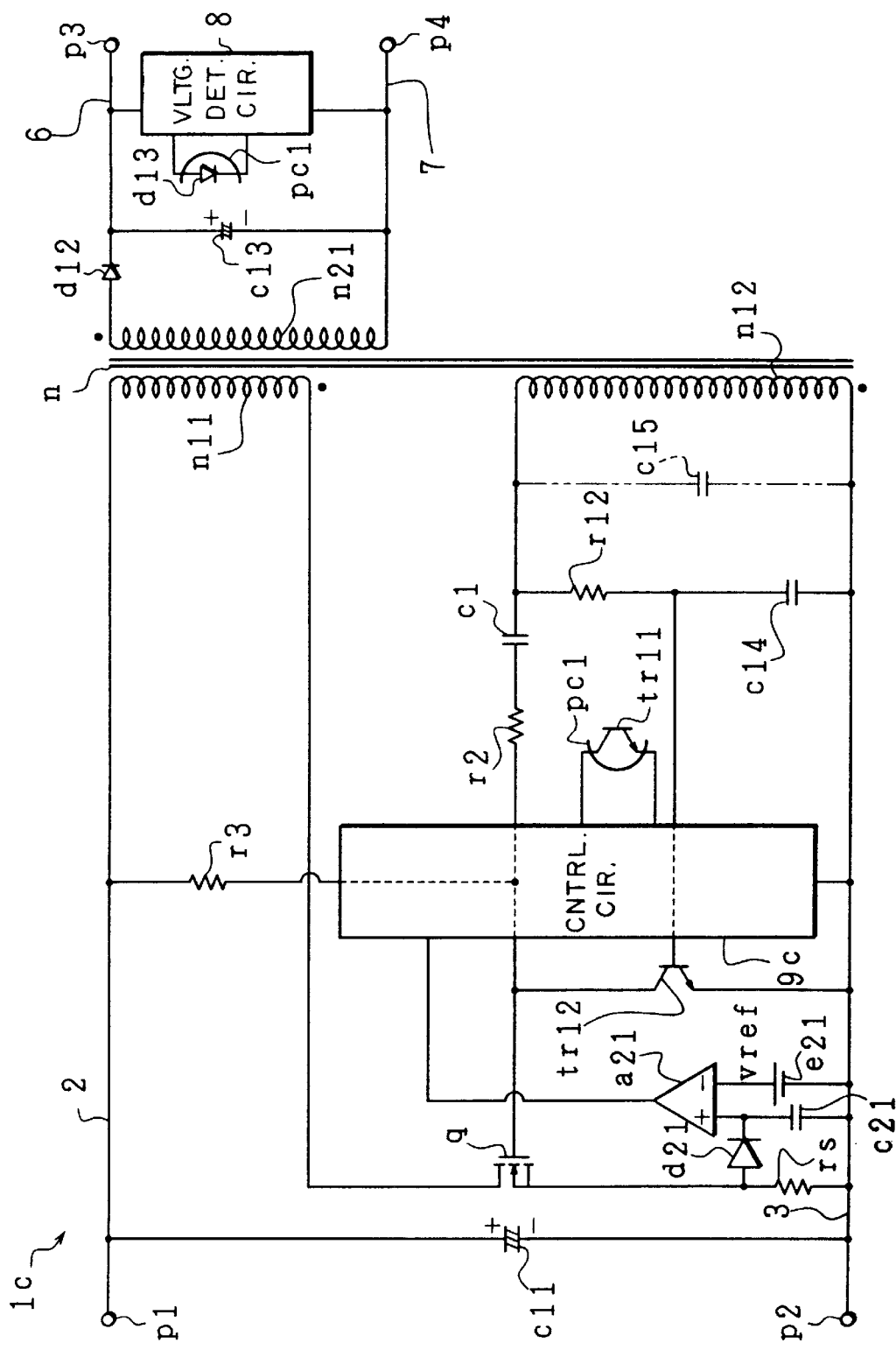
FIG. 30 is a block diagram that shows an electric construction of the other prior-art switching power source.

Referring to FIG. 26, the following description will discuss the 20th embodiment of the present invention.

FIG. 26 is a block diagram showing an electrical construction of a switching power source 201 of the 20th embodiment of the present invention. Since this switching power source 201 is similar to the aforementioned switching power source 131, the corresponding parts are indicated by the same reference numerals and the description thereof is omitted. Here, it is to be noted that the switching power source 201 is not a switching power source of the RCC system like the switching power source 131, but a switching power source of the pulse-width modulation (PWM) system.

In the switching power source 201, when a power source voltage is applied between input terminals P1 and P2, the PWM control circuit 202 is activated by power supplied by an auxiliary power-source circuit 203, and controls the switching pulse width of the main switching element Q in accordance with the result of detection of the secondary-side output voltage by the voltage detection circuit 18 so that a desired secondary-side output voltage is obtained. The switching frequency is also varied in accordance with the result of decision from the decision circuit 20 supplied to the control terminal CONT.

Here, when the sub power-source circuit 19a (19b) is activated, and starts supplying power to the PWM control circuit 202, the auxiliary power-source circuit 203 stops supplying power and is maintained in a stopped state in the steady operation.

In this manner, the present invention is also applied to the switching power source of the PWM system.

As described in the first through fourth embodiments of the present invention, the switching power source (11, 21, 31, 41), which is a switching power source of the ringing choke converter system in which excited energy, accumulated in a transformer (N, Na) during an on-period of a main switching element (Q), is outputted to an output circuit (C13) on the secondary side during an off-period and a ringing pulse, which is generated in a control coil (N12) of the transformer upon completion of an output, is fed back to the control terminal (G) of the main switching element through a first capacitor (C1) for cutting a dc so that the main switching element is on-driven, is characterized by comprising a series circuit that is constituted by a reverse bias voltage setting resistor (R1) and a control switching element for reducing the switching frequency (TR1), and that is connected to the output side of the first capacitor, and a bias resistor (R2) that is interpolated between the first capacitor and the main switching element, wherein the control switching element for reducing the switching frequency is on-driven at the time of light load, and a charge is accumulated in the first capacitor by a voltage induced in the control coil during the on-period of the main switching element at the time of light load, and upon occurrence of a ringing pulse, a reversed bias voltage is generated by the charge accumulated in the first capacitor so as to block the on-driving of the main switching element.

With the above-mentioned arrangement, at the time of heavy load that is a normal load, the control switching element for reducing the switching frequency is maintained off, and the ringing pulse is supplied to the control terminal of the main switching element through the first capacitor and the bias resistor without being subject to the influence of the series circuit; thus, the main switching element is on-driven so that the switching operation is continuously carried out.

In contrast, at the time of light load, the above-mentioned series circuit is connected between the first capacitor and the bias resistor so that more of the current induced in the control coil is allowed to flow through the first capacitor, thereby accumulating a charge. In this case, the electric potential of the control terminal of the main switching element is maintained by the bias resistor so that even if the series circuit is interpolated by the activation of the control switching element for reducing the switching frequency, the main switching element is allowed to maintain its on-state. When a ringing pulse is generated after the main switching element has been turned off and the excited energy has been discharged, the ringing pulse is reversely biased by a value corresponding to the charging voltage of the first capacitor, and supplied to the control terminal of the main switching element through the bias resistor, thereby making it possible to block the on-driving of the main switching element due to the ringing pulse.

Therefore, when the main switching element once carries out a switching operation at the time of light load, the next switching operation is carried out in the same manner as that carried out upon application of power. More specifically, the electric potential of the control terminal of the main switching element is gradually changed by a starting voltage derived from the main power-source voltage divided by resistors, etc., and when it reaches the threshold voltage that allows the main switching element to turn on, the main switching element is turned on.

In this manner, at the time of light load, the re-starting of the main switching element using the ringing pulse, which is carried out at the time of heavy load, is stopped, and a smooth re-starting operation is carried out in the same manner as that carried out upon application of power, thereby making it possible to reduce the switching frequency at the time of light load. Thus, it becomes possible to reduce losses that increase in proportion to the switching frequency, such as power required to draw a charge accumulated in the floating capacity between the drain and source in the main switching element, and consequently to obtain a higher power-conversion efficiency even at the time of light load.

Here, such a reduction in the switching frequency at the time of light load can be achieved by using an inexpensive construction having only a series circuit consisting of the reverse bias voltage setting resistor and the control switching element for reducing the switching frequency, and a second resistor.

Moreover, as described in the first embodiment of the present invention, the above-mentioned switching power source, which is provided with a starter circuit 14 that is constituted by a series circuit of a capacitor (C2) and first through third starting resistors (R3 to R5) and that is interpolated between main power source lines (12, 13) with a connecting point between the second starting resistor and the third starting resistor being connected to the control terminal of the main switching element, a sub power-source coil (N13) installed in the transformer, a sub power-source circuit (19) for rectifying and smoothing the output of the sub power-source coil, and a diode for preventing reverse current (D1) that supplies the output of the sub power-source circuit to the connecting point between the first starting resistor and the second starting resistor, is preferably arranged so that during a lapse of predetermined time from power application, the main switching element is turned on by a divided voltage of the main power-source voltage from the starter circuit and after the lapse of predetermined time from power application, the main switching element is turned on by a divided voltage from the sub power-source circuit.

With the above-mentioned construction, when, after a lapse of predetermined time from power application, the output voltage of the smoothing capacitor of the sub power-source circuit has reached a sufficient voltage for activating the main switching element, the capacitor (C2) has been provided with a voltage virtually corresponding to the difference between the main power-source and the output voltage of the sub power-source circuit in this state; thus, it is possible to turn on the main switching element by the divided voltage of the output voltage of the sub power-source circuit, and also to prevent the incoming current from the main power source. Therefore, even if the construction is designed so that re-activation of the main switching element is carried out by the main power-source voltage that has been divided by the first through third starting resistors in the same manner as that at the time of application of power, the main switching element is turned on by the divided voltage of the main power-source, which, for example, reaches as much as several hundreds V, only at the time of application of power, and after the lapse of the predetermined time, the main switching element can be turned on by the divided voltage of the output voltage of the sub power-source circuit, which is, for example, as small as 10 V. Thus, it becomes possible to also reduce the power consumption of the first through third starting resistors that are voltage dividing resistors, and consequently to achieve higher efficiency.

Moreover, as described in the third or fourth embodiment, the above-mentioned switching power source, which is provided with a starter circuit that is constituted by a series circuit of a capacitor (C2) and first through third starting resistors and that is interpolated between main power source lines with a connecting point between the second starting resistor and the third starting resistor being connected to the control terminal of the main switching element, a sub power-source circuit (19a) consisting of a rectifying diode (D2) that takes an output from one of the terminals of the control coil of the transformer (Na), a choke coil (L) to which the output of the rectifying diode is supplied, a smoothing capacitor (C16) for smoothing a current passing through the choke coil and a fly-wheel diode (D3) for connecting the connecting point between the rectifying diode and the choke coil to the other terminal of the control coil, and a reverse-current preventing diode (D1) that supplies the output of the sub power-source circuit to the connecting point between the first starting resistor and the second starting resistor, is preferably designed so that during a lapse of predetermined time from power application, the main switching element is turned on by a divided voltage of the main power-source voltage from the starter circuit and after the lapse of predetermined time from power application, the main switching element is turned on by a divided voltage from the sub power-source circuit.

With the above-mentioned construction, during the on-period of the main switching element, a charge is accumulated in the smoothing capacitor through the rectifying diode and the choke coil, and during the off-period of the main switching element, the exciting current inside the choke coil is allowed to charge the smoothing capacitor through the fly-wheel diode.

Therefore, when, after a lapse of predetermined time from power application, the output voltage of the smoothing capacitor of the sub power-source circuit has reached a sufficient voltage for activating the main switching element, the capacitor (C2) has been provided with a voltage virtually corresponding to the difference between the main power-source and the output voltage of the sub power-source circuit in this state; thus, it is possible to turn on the main switching element by the divided voltage of the output voltage of the sub power-source circuit, and also to prevent the incoming current from the main power source.

Therefore, even if the construction is designed so that re-activation of the main switching element is carried out by the main power-source voltage that has been divided by the first through third starting resistors in the same manner as that at the time of application of power, the main switching element is turned on by the divided voltage of the main power-source, which, for example, reaches as much as several hundreds V, only at the time of application of power, and after the lapse of the predetermined time, the main switching element can be turned on by the divided voltage of the output voltage of the sub power-source circuit, which is, for example, as small as 10 V. Thus, it becomes possible to also reduce the power consumption of the first through third starting resistors that are voltage dividing resistors, and consequently to achieve higher efficiency.

Here, since the smoothing capacitor is charged through the impedance element such as a choke coil, it is affected by the value of the secondary-side output current. For example, the charging voltage becomes higher as the secondary-side output current value increases. Therefore, when the load becomes large and the on-period of the main switching element is lengthened, causing the secondary-side output current value to become large, the voltage that is supplied from the sub power-source circuit so as to turn on the main switching element becomes high so that the on-timing of the main switching element becomes faster and the switching frequency also becomes higher. In this manner, it is possible to properly respond to large load variations at the time of light load. Moreover, it is not necessary to increase the number of taps in the transformer so as to supply power to the sub power-source circuit.

Furthermore, as shown in the first embodiment or the third embodiment of the present invention, the switching power source is preferably designed to comprise a discharging diode (D4) that is installed in parallel with the first through third starting resistors in a reverse-bias direction.

With the above-mentioned construction, when, after power cutoff, the power-source voltage of the main power source drops, the following discharging paths for the capacitor (C2) are formed: a path from the main power source—the third through first resistors—the capacitor (C2) to the main power source, and a path from the main power source—the discharging diode (D4)—the capacitor (C2) to the main power source.

Therefore, even if the time from power cutoff to re-application is short, the capacitor (C2) is positively allowed to discharge, and upon re-application of power, it can be positively turned on not by the output voltage from the smoothing capacitor of the sub power-source circuit that has dropped, but by the above-mentioned divided voltage of the main power source, etc.

Moreover, as shown in second embodiment of the present invention, the switching power source is preferably designed so that, instead of the capacitor (C2), a transistor (TR14) placed between one of the main power-source lines and the first starting resistor, a series circuit that consists of a base resistor (R6) and a capacitor (C3) and that connects the base of the transistor to the other main power-source line, and a discharging diode (D5), which connects the connecting point between the base resistor and the capacitor (C3) to the one of the main power-source line, are further installed.

With the above-mentioned construction, assuming that the current amplification rate of the transistor (TR14) is hfe, the charging current of the capacitor (C3) is represented by 1/hfe with respect to the charging current of the capacitor (C2).

Therefore, the capacitor can be provided in a small size.

Moreover, when, after power cutoff, the power-source voltage of the main power source drops, the following discharging path for the capacitor (C3) is formed: a path from the main power source—the capacitor (C3)—the discharging diode (DS) to the main power source.

Therefore, even if the time from power cutoff to re-application is short, the capacitor (C3) is positively allowed to discharge, and upon re-application of power, it can be positively turned on not by the output voltage from the smoothing capacitor of the sub power-source circuit that has dropped, but by the above-mentioned divided voltage of the main power source, etc.

Moreover, as shown in the fourth embodiment of the present invention, the switching power source is preferably designed so that the control switching element for reducing the switching frequency is controlled by using a charging voltage in the smoothing capacitor of the above-mentioned sub power-source circuit.

With the above-mentioned construction, since the smoothing capacitor of the sub power-source circuit is charged through the impedance element such as a choke coil and since its charging voltage corresponds to the value of the secondary-side output current, the level of the load can be judged by the charging voltage so as to control the control switching element for reducing the switching frequency.

Therefore, it is possible to eliminate the need for installing a specific construction for detecting the operation mode of installed equipment, and also to control the control switching element for reducing the switching frequency automatically by making a judgement as to the level of the load only by the use of the primary side, thereby allowing cost reduction.

Furthermore, as described in the first or second embodiment of the present invention, the switching power source, wherein a voltage detection circuit detects the secondary-side output voltage in the transformer, and the main switching element switches the primary current of the transformer in response to the result of detection so that a desired secondary current having a constant voltage is obtained, is designed to further comprise a switching element used for timing control (TR2) that is interpolated between the secondary-side output lines in series with the voltage detection circuit, and a bias circuit (D17, R15, R16) for supplying the output of the secondary coil of the transformer to the control terminal of the switching element used for timing control.

With the above-mentioned construction, when an output voltage is induced on the secondary side, a bias voltage is supplied to the control terminal of the switching element used for timing control by the bias circuit so that the voltage detection circuit is connected between the secondary-side output lines.

Therefore, the voltage detection circuit is made operative only for a minimum period required for the detection of the secondary-side output voltage; therefore, it is possible to reduce power consumption in the voltage detection circuit provided with light-emitting diodes of the photo-coupler and division resistors, and consequently to improve the power-conversion efficiency.

As described in the 5th through 18th embodiments of the present invention, the switching power source, which is a switching power source of the ringing choke converter system in which: excited energy is accumulated in a transformer during an on-period of a main switching element; a second capacitor (C14, C81·C82) is charged by a current obtained in a constant resistor (R51·R52, R12) from a voltage induced in a control coil in the transformer and a feed-back current from the secondary side; when the charged voltage becomes a predetermined voltage, an off-driving control switching element (TR12) off-drives the control terminal of the main switching element; during the off-period, the excited energy accumulated in the transformer is outputted to an output circuit on the secondary side; upon completion of the output, a ringing pulse occurring in the control coil of the transformer is fed back to the control terminal of the main switching element through the first dc-cutting capacitor (C1) so that the main switching element is again on-driven, is provided with a switching-frequency switching means (59, TR1, R1, R2) for reducing the switching frequency of the main switching element at the time of light load than that at the time of heavy load and a charge-compensating means (TR51, R53, R101, D111, R111, R112, D111 and D121) that compensates an overcurrent protection circuit that is constituted a series circuit consisting of the constant resistor and the second capacitor and that is connected in parallel with the control coil for a reduction in the accumulated charge in the second capacitor due to the reduction of the switching frequency at the time of light load.

During the normal RCC operation at the time of heavy load, the second capacitor is charged with the reversed polarity by the reversed electro motive voltage generated in the control coil at the off-time of the main switching element, while, at the time of light load, during the operation suspension period from the time when the main switching element is once turned on/off to the time when it is again turned on, the accumulated charge with the reversed polarity in the second capacitor is reduced by the reduction in the switching frequency by the switching-frequency switching means; therefore, the charge-compensating means having the above-mentioned construction makes it possible to compensate for the reduction in the charge.

Therefore, the time period required for the second capacitor being charged by the voltage with the positive polarity induced in the control coil upon turning the main switching element on to have the predetermined voltage with the positive polarity that is large enough to on-drive the off-driving control switching element is set virtually the same even at the time of light load as that at the time of heavy load. The time period forms the on-time of the main switching element, and corresponds to currents, such as those having triangle waveforms, that flow through the main switching element and that increases with the increase of the on-time of the main switching element. Therefore, it is possible to make the overcurrent limitation values of the main switching element at the time of light load and at the time of heavy load virtually equal to each other. Thus, the performance of each constituent part can be enhanced to the vicinity of the rated value even at the time of light load. Consequently, it becomes possible to make the switching frequency at the time of light load sufficiently low without the need for parts having unnecessarily high rated values.

Moreover, as described in the fifth or the sixth embodiment of the present invention, the switching power source is preferably provided with a construction in which: the above-mentioned constant resistor (R51·R52) is divided into two portions, and the charge-compensating means has a bypassing means (TR51, R53) for bypassing the charging current to the second capacitor from the dividing point of the constant resistor at the time of light load.

With the above-mentioned construction, the bypassing means, which has the constant resistor constituted by two division resistors and is realized by a series circuit of a transistor, a resistor, etc, bypasses the charging current to the second capacitor from the dividing point at the time of light load, thereby reducing the charging current supplied from the control coil to the second capacitor in the positive direction.

Therefore, at the time of light load, the charging current supplied to the second capacitor from the control coil in the positive direction is made smaller as compared with the time of heavy load so as to compensate for the reduction in the accumulated charge with the reversed polarity in the second capacitor during the operation suspension period; thus, it becomes possible to make the overcurrent limitation values of the main switching element virtually equal to each other.

Furthermore, as described in the 7th through 10th embodiments of the present invention, the switching power source is preferably provided with a construction in which: the constant resistor is divided into two portions, the above-mentioned charge-compensating means is placed in association with the two division resistors, and an operation-switching means for switching the resistivity of the constant resistor between the light load time and the heavy load time is provided.

With the above-mentioned construction, the constant resistor is constituted by the two division resistors, and in the case when the two division resistors are connected in series with each other, the operation-switching means (TR51), which is realized by a transistor, etc., is placed so as to shortcircuit the terminals of one of the division resistors; thus, at the time of heavy load, the terminals are shortcircuited so that the charging current is supplied through a relatively small composite resistivity, while at the time of light load, the terminals are opened so that the charging current is supplied through a relatively large composite resistivity. In this case, when the two division resistors are placed in parallel with each other, the operation-switching means is interpolated in series with either of the division resistors so that it is allowed to conduct at the time of heavy load, and cut off at the time of light load.

Therefore, at the time of light load, the charging current supplied to the second capacitor from the control coil in the positive direction is made smaller as compared with the time of heavy load so as to compensate for the reduction in the accumulated charge with the reversed polarity in the second capacitor during the operation suspension period; thus, it becomes possible to make the overcurrent limitation values of the main switching element virtually equal to each other.

Moreover, as described in the 11th through the 14th embodiments of the present invention, the switching power source is preferably provided with a construction in which: the second capacitor (C81·C82) is divided into two portions, and the aforementioned charge-compensating means is placed in association with the two divided capacitors, and an operation-switching means for switching the capacity value of the second capacitor between the light load time and the heavy load time is installed.

With the above-mentioned construction, the second capacitor is constituted by the two divided capacitors, and for example, in the case when the two divided capacitors are connected in series with each other, the operation-switching means is placed so as to shortcircuit the terminals of one of the capacitors; thus, at the time of heavy load, the terminals are opened so that the charging current is supplied with a relatively small composite capacity value, while at the time of light load, the terminals are shortcircuited so that the charging current is supplied with a relatively large composite capacity value. In this case, when the two divided capacitors are placed in parallel with each other, the operation-switching means is interpolated in series with either of the divided capacitors so that it is cut off at the time of heavy load, and allowed to conduct at the time of light load.

Therefore, at the time of light load, the capacity value of the second capacitor is made greater as compared with the time of heavy load so as to compensate for the reduction in the accumulated charge with the reversed polarity in the second capacitor during the operation suspension period; thus, it becomes possible to make the overcurrent limitation values of the main switching element virtually equal to each other.

Furthermore, as described in the 15th or 16th embodiment of the present invention, the switching power source is preferably provided with a construction in which: the charge-compensating means has a discharging resistor (R101) that is interpolated in parallel with the second capacitor (C14) and an operation-switching means that is placed in association with the discharging resistor and that can connects or cuts off the charging resistor depending on the light load time and the heavy load time.

With the above-mentioned construction, at the time of light load, the operation-switching means is allowed to conduct so that the discharging resistor is connected in parallel with the second capacitor, and at the time of heavy load, the operation-switching means is cut off so that the discharging resistor is released.

Therefore, at the time of light load with less accumulated charge with the reversed polarity, one portion of the charging current with the positive polarity is bypassed by the charging resistor, with the result that it is possible to compensate for the reduction in the accumulated charge, and consequently to make the overcurrent limitation values of the main switching element virtually equal to each other.

Moreover, as described in the 17th embodiment of the present invention, the switching power source is preferably provided with a construction in which the aforementioned charge-compensating means has a first diode (D111) that is interpolated between the second capacitor and the control coil and that is aligned in the forward direction with respect to the current flowing from the control coil during the on-period of the main switching element, a pair of first and second resistors (R111·R112) that are interpolated in parallel with the first diode, and an operation-switching means that is interpolated in series with one of the resistors and that connects or cuts off the resistor depending on the light load time and the heavy load time.

With the above-mentioned construction, the first diode is interpolated so as to be aligned in the forward direction with respect to the current flowing to the second capacitor during the on-period of the main switching element, that is, the current charging the second capacitor with the positive polarity; therefore, the first diode carries an cut-off operation with respect to the current with the reversed polarity that is generated at the off-time of the main switching element. For this reason, the pair of first and second resistors are placed in parallel with the first diode, and the operation-switching means is interpolated in series with one of the resistors. The aforementioned operation-switching means is cut off at the time of heavy load so that it suppresses the charging current with the reversed polarity from flowing to the second capacitor, and is allowed to conduct at the time of light load so that more of the charging current with the reversed polarity is supplied.

Therefore, at the time of light load, a higher charge with the reversed polarity is accumulated, and even if a higher charge with the reversed polarity is discharged due to the operation suspension period, the corresponding discharged portion has been preliminarily compensated, making the overcurrent limitation values of the main switching element virtually equal to each other.

Furthermore, as described in the 18th embodiment of the present invention, the switching power source is preferably provided with a construction in which: the aforementioned charge-compensating means has a first diode that is interpolated in series with the constant resistor and that is aligned in the forward direction with respect to the current flowing from the control coil during the on-period of the main switching element, a series circuit that is interpolated in parallel with the series circuit consisting of the constant resistor (R12) and the first diode and that consists of a second diode (D121) having the reversed polarity to the first diode and the first resistor, a second resistor that is interpolated in parallel with the first resistor and an operation-switching means that is interpolated in series with the second resistor and that connects or cuts off the second resistor depending on the light load time and the heavy load time.

With the above-mentioned construction, during the on-period of the main switching element, the second capacitor is normally charged with the positive polarity by the first diode, and during the off-period, the first diode cuts off the charging current with the reversed polarity. For this reason, the pair of the first and second resistors are placed in parallel with the series circuit consisting of the first diode and the constant resistor, and the operation-switching means is installed in series with the second resistor. During the off-time of the main switching element, the operation-switching means is allowed to conduct at the time of light load so that a greater charging current is supplied as compared with the heavy load time.

Therefore, at the time of light load, a higher charge with the reversed polarity is accumulated, and even if a higher charge with the reversed polarity is discharged due to the operation suspension period, the corresponding discharged portion has been preliminarily compensated, making the overcurrent limitation values of the main switching element virtually equal to each other.

Furthermore, as described, for example, in the 6th, 8th, 10th, 12th, 14th or 16th embodiment, the switching power source is preferably provided with a construction in which: the aforementioned switching-frequency switching means has a bias resistorthat is series connected between the off-driving control switching element and the first capacitor, and a series circuit that is interpolated between the connecting point of the bias resistor and the first capacitor and the control coil and that consists of the reversed bias voltage setting resistor and the control switching element used for reducing the switching frequency, wherein: the control switching element used for reducing the switching frequency is on-driven at the time of light load, during the on-period of the main switching element at the time of light load, a charge is accumulated in the first capacitor by the voltage induced in the control coil, and at the time of the occurrence of a ringing pulse, a reverse bias is generated by the accumulated charge in the first capacitor so as to block the on-driving of the main switching element.

With the above-mentioned construction, at the time of heavy load, the control switching element used for reducing the switching frequency is maintained off, and is not susceptible to the influence of the series circuit, with the result that the ringing pulse is supplied to the control terminal of the main switching element through the first capacitor and the bias resistor so that the main switching element is on-driven and the switching operation is continuously carried out.

In contrast, at the time of light load, the control switching element used for reducing the switching frequency of the series circuit is on-driven, with the result that a greater current, induced by the control coil, flows through the first capacitor so that a charge is accumulated. In this case, the electric potential of the control terminal of the main switching element is maintained by a current flowing from the control coil through the reverse bias voltage setting resistor. When, after the main switching element has been turned off and the discharge of the excited energy has been complete, a ringing pulse occurs, and the ringing pulse is reverse biased by an amount corresponding to the charging voltage of the first capacitor and is supplied to the control terminal of the main switching element through the bias resistor;thus, it is possible to prevent the ringing pulse from on-driving the main switching element.

Therefore, when the main switching element once carries out a switching operation at the time of light load, the next switching operation is carried out in the same manner as that carried out upon application of power. More specifically, the electric potential of the control terminal of the main switching element is gradually changed by a starting voltage derived from the main power-source voltage divided by resistors, etc., and when it reaches the threshold voltage that allows the main switching element to turn on, the main switching element is turned on.

In this manner, at the time of light load, the re-starting of the main switching element using the ringing pulse, which is carried out at the time of heavy load, is stopped, and a smooth re-starting operation is carried out in the same manner as that carried out upon application of power, thereby making it possible to reduce the switching frequency at the time of light load. Thus, it becomes possible to reduce losses that increase in proportion to the switching frequency, such as power required to draw a charge accumulated in the floating capacity between the drain and source in the main switching element, and consequently to obtain a higher power-conversion efficiency even at the time of light load.

Here, such a reduction in the switching frequency at the time of light load can be achieved by using a simple, inexpensive construction having only a series circuit consisting of the reverse bias voltage setting resistor and the control switching element for reducing the switching frequency, and a second resistor.

Moreover, as described in the 4th, 6th, 8th, 10th, 12th, 14th, 16th, 19th or 20th embodiment of the present invention, the switching power source, which is designed to vary the switching frequency depending on the level of load, is preferably provided with: a detection coil (N12) formed in a transformer, a smoothing capacitor (C16), a rectifying means (D2) for rectifying the induced voltage in the detection coil and for supplying it to the smoothing capacitor, an impedance element (L, R) that is interpolated between the rectifying means and the smoothing capacitor, and a decision means (20) for making a judgement as to the level of the load based upon the output voltage of the smoothing capacitor.

With the above-mentioned construction, in the switching power source which is designed to vary the switching frequency depending on the level of load so as to reduce losses that increase in proportion to the switching frequency, such as power required to draw a charge accumulated in the floating capacity between the drain and source in the main switching element, and so as to obtain a higher power-conversion efficiency even at the time of light load, when an impedance element is inserted in a circuit for rectifying the induced voltage in the detection coil in the transformer and for charging the smoothing capacitor, it is possible to utilize the fact that the output voltage of the smoothing capacitor is allowed to correspond to the output current value on the secondary side, in an attempt to make a judgement as to the level of the load.

Therefore, the construction for making a judgement as to the level of load can be provided by installing a simple construction only on the primary side with a small loss.

Furthermore, as described in the 4th, 6th, 8th, 10th, 12th, 14th, 16th or 19th embodiment of the present invention, the switching power source may be provided as a switching power source of the ringing choke converter system in which: during the off-period of the main switching element, the excited energy which has been accumulated in the transformer during the on-period is outputted to an output circuit on the secondary side; and upon completion of the output, a ringing pulse occurring in the control coil of the transformer is fed back to the control terminal of the main switching element so that the main switching element is again on-driven, wherein the control coil serves as the detection coil.

With the above-mentioned construction, in the switching power source of the RCC system, the control coil, which is installed for the RCC operation, is utilized as the detection coil.

Therefore, it is not necessary to increase the number of coils and taps of the transformer and consequently to achieve a low-cost device.

Furthermore, the switching power source may be designed to have a construction in which: the rectifying means is a rectifying diode (D2) for drawing an output from one of the terminals of the control coil of the transformer; the impedance element is a choke coil (L) to which the output of the rectifying diode is supplied; a fly-wheel diode (D3) for connecting the connecting point of the rectifying diode and the choke coil to the other terminal of the control coil is further installed; these rectifying diode, choke coil, fly-wheel diode and the aforementioned smoothing capacitor constitute a sub power-source circuit; a starter circuit that is constituted by a series circuit of a capacitor and first through third starting resistors, and interpolated between the main power-source lines with the connecting point between the second starting resistor and the third starting resistor being connected to the control terminal of the main switching element is installed; and a reverse-current preventing diode (D1) that supplies the output of the sub power-source circuit to the connecting point of the first starting resistor and the second starting resistor is further installed. In this construction, during a lapse of predetermined time from power application, the main switching element is turned on by a divided voltage of the main power-source voltage from the starter circuit and after the lapse of predetermined time from power application, the main switching element is turned on by a divided voltage from the sub power-source circuit.

With the above-mentioned construction, during the on-period of the main switching element, the sub power-source circuit charges the smoothing capacitor through the rectifying diode and the choke coil, and during the off-period of the main switching element, the exciting current inside the choke coil is allowed to charge the smoothing capacitor through the fly-wheel diode.

Therefore, when, after a lapse of predetermined time from power application, the output voltage of the smoothing capacitor of the sub power-source circuit has reached a sufficient voltage for activating the main switching element, the capacitor of the starter circuit has been provided with a voltage virtually corresponding to the difference between the main power-source and the output voltage of the sub power-source circuit inthis state;thus, it is possible to turn on the main switching element by the divided voltage of the output voltage of the sub power-source circuit, and also to prevent the incoming current from the main power source.

Therefore, in a switching power source of the RCC system, even if the construction is designed so that re-activation of the main switching element is carried out by the same starter circuit used upon application of power (for example, the first through third starting resistors that voltage-divide the main power-source voltage), the main switching element is turned on by a relatively high voltage, such as the divided voltage of the main power-source, which, for example, reaches as much as several hundreds V, only at the time of application of power, and after the lapse of the predetermined time, the main switching element can be turned on by a relatively low voltage, such as the divided voltage of the output voltage of the sub power-source circuit, which is, for example, as small as several tens V. Thus, it becomes possible to also reduce the power consumption of the first through third starting resistors that are voltage dividing resistors, and consequently to achieve higher efficiency.

Here, since the smoothing capacitor is affected by the value of the secondary-side output current, the charging voltage becomes higher as the secondary-side output current value increases. Therefore, when the load becomes large and the on-period of the main switching element is lengthened, causing the secondary-side output current value to become high, the voltage that is supplied from the sub power-source circuit so as to turn on the main switching element becomes high so that the on-timing of the main switching element becomes faster and the switching frequency also becomes high. In this manner, it is possible to properly respond to large load variations at the time of light load, and also to allow the sub power-source circuit to serve as one part of the construction for making a judgement as to the level of load. This makes it possible to further reduce costs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switching power source, which is a switching power source of a ringing choke converter system, comprising:
   a transformer for accumulating excited energy during an on-period of a main switching element;
   an output circuit for outputting the excited energy thus accumulated during an off-period of the main switching element, the output circuit being placed on the secondary side of the transformer;
   a first capacitor which is placed between a control coil of the transformer and the control terminal of the main switching element, and which feeds back a ringing pulse that occurs in the control coil upon completion of the output of the excited energy to the control terminal after cutting a dc component thereof so that the main switching element is on driven;
   a series circuit which is constituted by a reverse-bias voltage setting resistor and a control switching element for reducing switching frequency, and has a first end connected to a point between the first capacitor and the control terminal of the main switching element and a second end connected to the first capacitor through the control coil;
   a bias resistor that is interpolated between the first capacitor and the main switching element; and
   decision means for making a judgment as to whether or not load is light or heavy so that the control switching element is on-driven at the time of light load and the control switching element is off-driven at the time of heavy load, wherein:
      in the case when the control switching element for reducing the switching frequency is on-driven at the time of light load, during the on-period of the main switching element at the time of light load, a charge is accumulated in the first capacitor by a voltage induced in the control coil; and at the time of occurrence of the ringing pulse, a reverse bias is generated by the accumulated charge in the first capacitor so as to prevent the main switching element from being on-driven.

2. The switching power source as defined in claim 1, further comprising:
   a starter circuit that is constituted by a series circuit consisting of a capacitor and first through third starting resistors and that is interpolated between main power-source lines with a connecting point between the second and third starting resistors being connected to the control terminal of the main switching element;
   a sub power-source coil installed in the transformer;
   a sub power-source circuit for rectifying and smoothing an output of the sub power-source coil; and
   a reverse-current preventing diode for supplying an output of the sub power-source circuit to a connecting point between the first starting resistor and the second starting resistor,
      wherein during a lapse of predetermined time from power application, the main switching element is on-driven by a divided voltage of the main power-source voltage from the starter circuit and after the lapse of predetermined time from power application, the main switching element is on-driven by a divided voltage from the sub power-source circuit.

3. The switching power source as defined in claim 2, further comprising:
   a discharging diode that is placed in parallel with the first through third starting resistors so as to be aligned in a reverse bias direction.

4. The switching power source as defined in claim 1, further comprising:
   a starter circuit that is constituted by a series circuit consisting of a transistor and first through third starting resistors and that is interpolated between main power-source lines with a connecting point between the second and third starting resistors being connected to the control terminal of the main switching element;
   a series circuit consisting of a base resistor and a capacitor, the series circuit being placed between the base of the transistor and the main power-source line on the third starting resistor side;
   a discharging diode for connecting a connecting point between the base resistor and the capacitor to the main power-source line on the transistor side;
   a sub power-source coil installed in the transformer;
   a sub power-source circuit for rectifying and smoothing an output of the sub power-source coil; and
   a reverse-current preventing diode for supplying an output of the sub power-source circuit to a connecting point between the first starting resistor and the second starting resistor,
      wherein during a lapse of predetermined time from power application, the main switching element is on-driven by a divided voltage of the main power-source voltage from the starter circuit and after the lapse of predetermined time from power application, the main switching element is on-driven by a divided voltage from the sub power-source circuit.

5. The switching power source as defined in claim 1, further comprising:
   a starter circuit that is constituted by a series circuit consisting of a capacitor and first through third starting resistors and that is interpolated between main power-source lines with a connecting point between the second and third starting resistors being connected to the control terminal of the main switching element;
   a sub power-source circuit including a rectifying diode for drawing an output from one of terminals of the control coil of the transformer, a choke coil to which the output of the rectifying diode is supplied, a smoothing capacitor for smoothing a current flowing through the choke coil, and a fly-wheel diode for connecting a connecting point of the rectifying diode and the choke coil to the other terminal of the control coil; and
   a reverse-current preventing diode for supplying an output of the sub power-source circuit to a connecting point between the first starting resistor and the second starting resistor, wherein during a lapse of predetermined time from power application, the main switching element is on-driven by a divided voltage of the main power-source voltage from the starter circuit and after the lapse of predetermined time from power application, the main switching element is on-driven by a divided voltage from the sub power-source circuit.

6. The switching power source as defined in claim 5, further comprising:

a discharging diode that is placed in parallel with the first through third starting resistors so as to be aligned in a reverse bias direction.

7. The switching power source as defined in claim 5, wherein the control of the control switching element for reducing the switching frequency is carried out by using a charging voltage of the smoothing capacitor in the sub power-source circuit.

8. The switching power source as defined in claim 1, further comprising:

a starter circuit that is constituted by a series circuit consisting of a transistor and first through third starting resistors and that is interpolated between main power-source lines with a connecting point between the second and third starting resistors being connected to the control terminal of the main switching element;

a series circuit consisting of a base resistor and a capacitor, the series circuit being placed between the base of the transistor and the main power-source line on the third starting resistor side;

a discharging diode for connecting a connecting point between the base resistor and the capacitor to the main power-source line on the transistor side;

a sub power-source circuit including a rectifying diode for drawing an output from one of terminals of the control coil of the transformer, a choke coil to which the output of the rectifying diode is supplied, a smoothing capacitor for smoothing a current flowing through the choke coil, and a fly-wheel diode for connecting a connecting point of the rectifying diode and the choke coil to the other terminal of the control coil; and a reverse-current preventing diode for supplying an output of the sub power-source circuit to a connecting point between the first starting resistor and the second starting resistor, wherein during a lapse of predetermined time from power application, the main switching element is on-driven by a divided voltage of the main power-source voltage from the starter circuit and after the lapse of predetermined time from power application, the main switching element is on-driven by a divided voltage from the sub power-source circuit.

9. The switching power source as defined in claim 8, wherein the control of the control switching element for reducing the switching frequency is carried out by using a charging voltage of the smoothing capacitor in the sub power-source circuit.

10. The switching power source as defined in claim 1, wherein the first end of the series circuit is connected to a connecting point between the first capacitor and the bias resistor.

11. A switching power source comprising:

a voltage detection circuit for detecting a secondary-side output voltage of a transformer;

a main switching element for switching a primary current of the transformer in response to the result of detection so as to obtain a secondary current having a desired constant voltage;

a timing-control switching element that is placed between secondary-side output lines in series with the voltage detection circuit; and a bias circuit for supplying an output of a secondary sub coil of the transformer to a control terminal of the timing-control switching element.

* * * * *